US012290940B1

(12) United States Patent
Abate et al.

(10) Patent No.: US 12,290,940 B1
(45) Date of Patent: May 6, 2025

(54) TORSO PROTRUSION FOR ROBOTIC MANIPULATION OF OBJECTS AND RELATED TECHNOLOGY

(71) Applicant: Agility Robotics, Inc., Pittsburgh, PA (US)

(72) Inventors: Andrew Abate, Albany, OR (US); Jonathan Hurst, Albany, OR (US)

(73) Assignee: Agility Robotics, Inc., Pittsburgh, PA (US)

( * ) Notice: Subject to any disclaimer, the term of this patent is extended or adjusted under 35 U.S.C. 154(b) by 203 days.

(21) Appl. No.: 18/061,868

(22) Filed: Dec. 5, 2022

Related U.S. Application Data

(60) Provisional application No. 63/384,319, filed on Nov. 18, 2022.

(51) Int. Cl.
*B25J 9/16* (2006.01)
*B25J 9/00* (2006.01)
*B62D 57/032* (2006.01)

(52) U.S. Cl.
CPC ........... *B25J 9/1682* (2013.01); *B25J 9/0009* (2013.01); *B62D 57/032* (2013.01)

(58) Field of Classification Search
CPC ...... B25J 9/1682; B25J 9/0009; B62D 57/032
USPC ....................................................... 700/245
See application file for complete search history.

(56) References Cited

U.S. PATENT DOCUMENTS

| | | | |
|---|---|---|---|
| 4,095,367 A | 6/1978 | Ogawa | |
| 4,740,187 A | 4/1988 | Rasmussen et al. | |
| 6,064,167 A * | 5/2000 | Takenaka | B25J 19/005 901/1 |
| 8,244,402 B2 * | 8/2012 | Wells | H04N 13/204 318/568.13 |
| 8,918,209 B2 * | 12/2014 | Rosenstein | G05D 1/0246 700/250 |
| 11,116,269 B2 * | 9/2021 | Kanazawa | A44B 17/0088 |
| 11,542,135 B2 | 1/2023 | Kong et al. | |
| 2004/0003950 A1 * | 1/2004 | Ogawa | B62D 57/032 180/8.1 |
| 2008/0253613 A1 * | 10/2008 | Jones | G06V 40/20 704/E15.001 |
| 2009/0149993 A1 | 6/2009 | Neki et al. | |
| 2009/0248202 A1 * | 10/2009 | Osuka | A61H 1/0237 700/245 |

(Continued)

FOREIGN PATENT DOCUMENTS

| | | | | |
|---|---|---|---|---|
| CA | 2550748 C | * | 5/2009 | ............ B25J 19/005 |
| DE | 69734835 T2 | * | 7/2006 | ............. B62D 57/02 |

(Continued)

*Primary Examiner* — B M M Hannan

(57) ABSTRACT

A robot in accordance with at least some embodiments of the present technology includes a torso having a superior portion, an inferior portion, and an intermediate portion therebetween. The robot further includes two legs connected to the torso via the inferior portion of the torso, two arms connected to the torso via the superior portion of the torso, and a protrusion also connected to the torso via the inferior portion of the torso and extending anteriorly from the torso. The robot is configured to move an object toward the torso at least partially via contact between the object and at least one of the arms. The robot is further configured to support a weight of the object at least partially via the protrusion while the robot ambulates via the legs.

20 Claims, 36 Drawing Sheets

(56) References Cited

U.S. PATENT DOCUMENTS

| | | | |
|---|---|---|---|
| 2012/0197439 A1* | 8/2012 | Wang | B25J 9/1664 |
| | | | 901/1 |
| 2016/0052574 A1* | 2/2016 | Khripin | B25J 9/1694 |
| | | | 901/1 |
| 2016/0059412 A1* | 3/2016 | Oleynik | B25J 19/02 |
| | | | 700/250 |
| 2019/0283822 A1* | 9/2019 | Blankespoor | B62D 57/02 |
| 2020/0189110 A1* | 6/2020 | Yamagishi | B25J 9/1692 |
| 2021/0162602 A1* | 6/2021 | Kawaguchi | B25J 17/00 |
| 2021/0256709 A1* | 8/2021 | Madden | G06V 20/17 |
| 2021/0347041 A1* | 11/2021 | da Silva | B25J 9/162 |
| 2024/0181637 A1* | 6/2024 | Gillett | B25J 17/00 |

FOREIGN PATENT DOCUMENTS

| | | | | |
|---|---|---|---|---|
| JP | 3443077 B2 * | 9/2003 | | B25J 9/16 |
| JP | 2004114289 A * | 4/2004 | | B62D 57/032 |
| JP | 2020501918 A * | 6/2018 | | |
| JP | 2022020784 A * | 2/2022 | | B25J 9/162 |
| WO | WO-03002309 A1 * | 1/2003 | | A61B 5/1038 |
| WO | WO-2004091865 A1 * | 10/2004 | | B62D 57/032 |
| WO | WO-2005005108 A1 * | 1/2005 | | B62D 57/032 |
| WO | WO-2015/112018 | 7/2015 | | |
| WO | WO-2019017343 A1 * | 1/2019 | | A61F 2/68 |

* cited by examiner

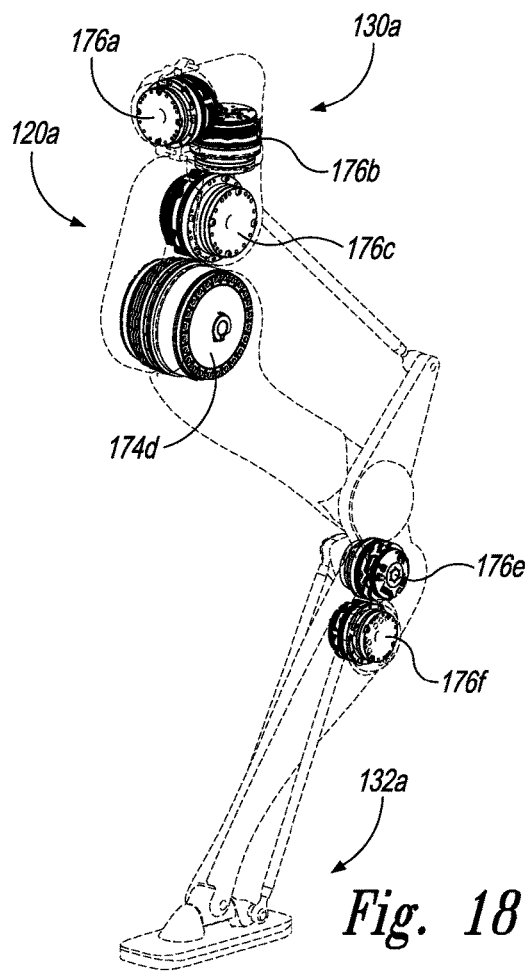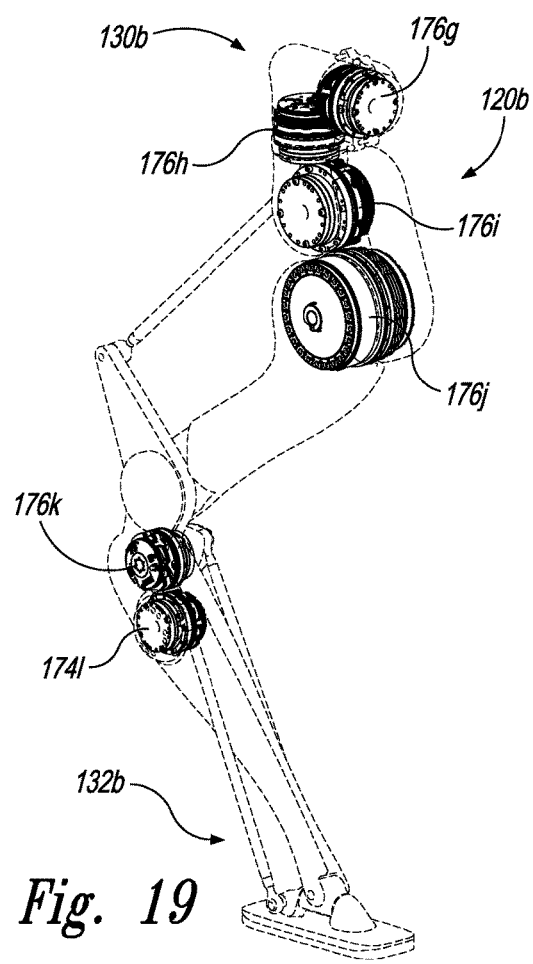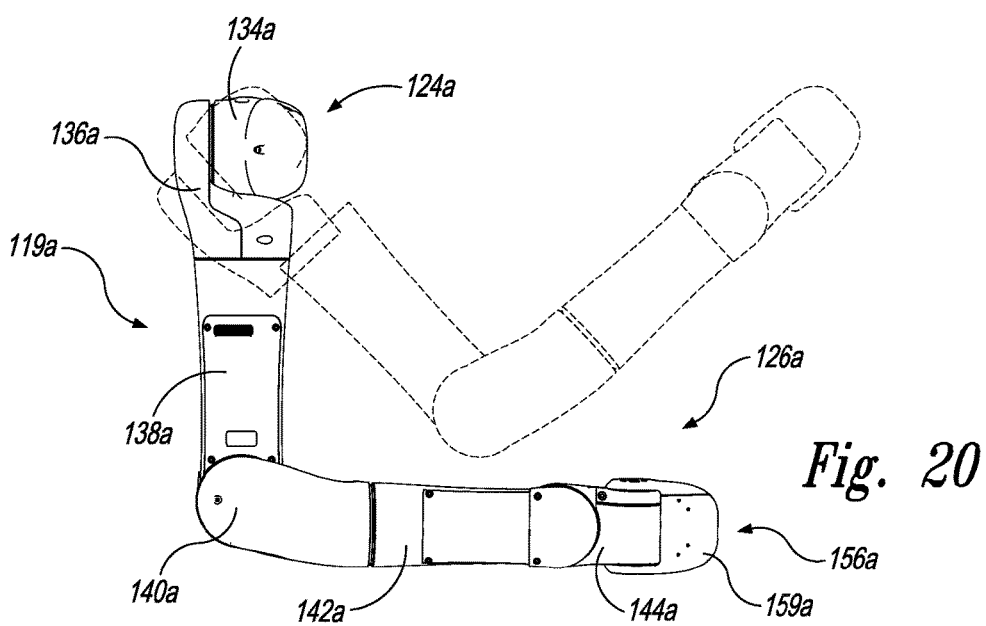

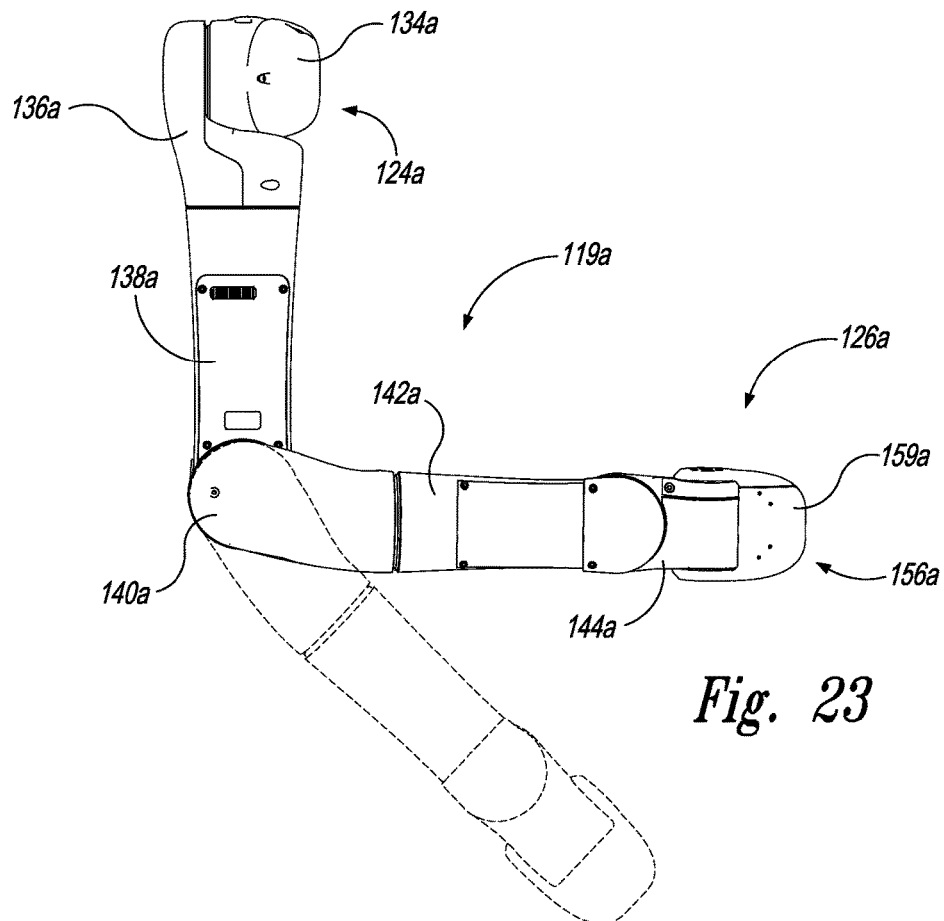
Fig. 23
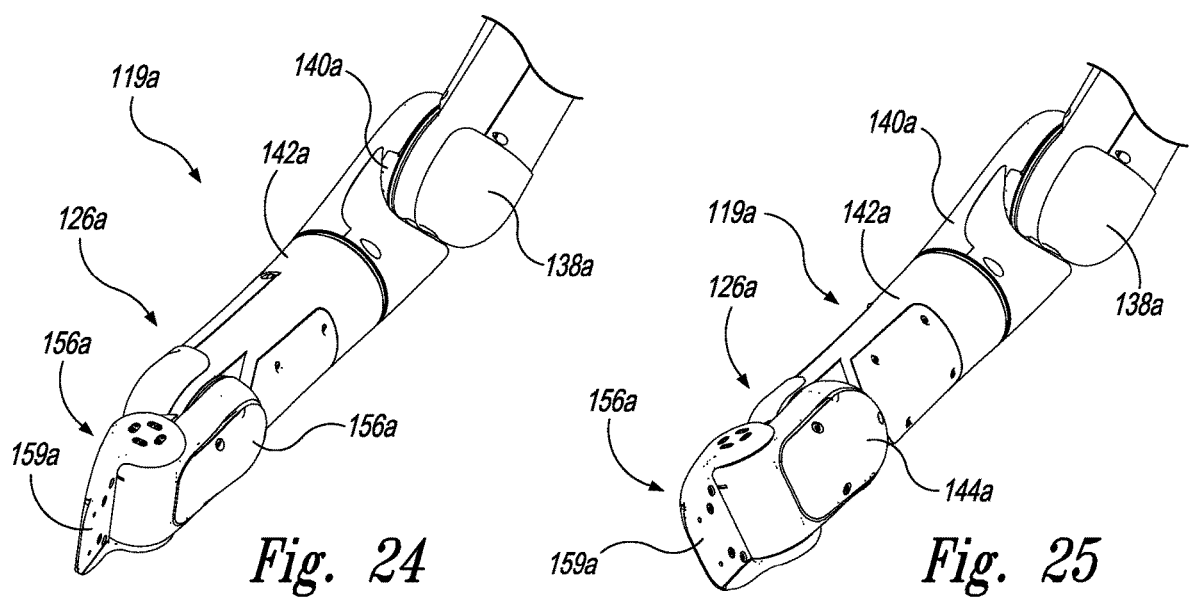
Fig. 24
Fig. 25

TORSO PROTRUSION FOR ROBOTIC MANIPULATION OF OBJECTS AND RELATED TECHNOLOGY

CROSS-REFERENCE TO RELATED APPLICATION

This claims the benefit of U.S. Provisional Application No. 63/384,319, filed Nov. 18, 2022. The foregoing application is incorporated herein by reference in its entirety. To the extent the foregoing application and/or any other material incorporated herein by reference conflicts with the present disclosure, the preset disclosure controls.

TECHNICAL FIELD

The present technology relates to robots that manipulate objects.

BACKGROUND

Many simple tasks that humans currently perform are amenable to automation using robotics. Among such tasks are those involving moving goods between locations within distribution centers. For example, after a trailer or pallet containing goods arrives at a distribution center, humans typically move the goods from the trailer or pallet onto a conveyor that carries the goods to other locations within the distribution center for further processing. Similarly, although a conveyor can be used to deliver outgoing goods to a loading dock or palletizing station, humans are still needed to move the goods from the conveyor to outgoing trailers or pallets. Despite the apparent simplicity of loading and unloading trailers and pallets, these tasks have conventionally been difficult or impossible to fully automate. As another example, humans at distribution centers that handle order fulfillment for electronic commerce are often tasked with picking and packing goods for last mile delivery. These distribution centers are massive in scale and handle a wide variety of goods. Even with the aid of sophisticated route optimization systems, locating and retrieving goods to fill orders as needed tends to be labor intensive.

In the forgoing examples and in other cases, the use of human labor to perform repetitive and time-consuming tasks is inefficient. Human labor would be far better applied to more complex tasks, particularly those involving creativity or advanced problem solving. Presently, however, the need for distribution centers and humans to operate them is large and increasing rapidly as consumers shift toward electronic commerce. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 16-19 are partially transparent perspective views of the first arm, the second arm, the first leg, and the second leg, respectively, of the robot shown in FIG. 1.

FIG. 20 is a side profile view of the first arm of the robot shown in FIG. 1 indicating isolated motion about an arm joint of the robot.

FIG. 23 is a side profile view of the first arm of the robot shown in FIG. 1 indicating isolated motion about an arm joint of the robot distal to the arm joint of FIG. 22 along the kinematic chain of FIG. 12.

FIGS. 24 and 25 are perspective views of a portion of the first arm of the robot shown in FIG. 1 indicating isolated motion about an arm joint of the robot distal to the arm joint of FIG. 23 along the kinematic chain of FIG. 12.

DETAILED DESCRIPTION

Figure 1:
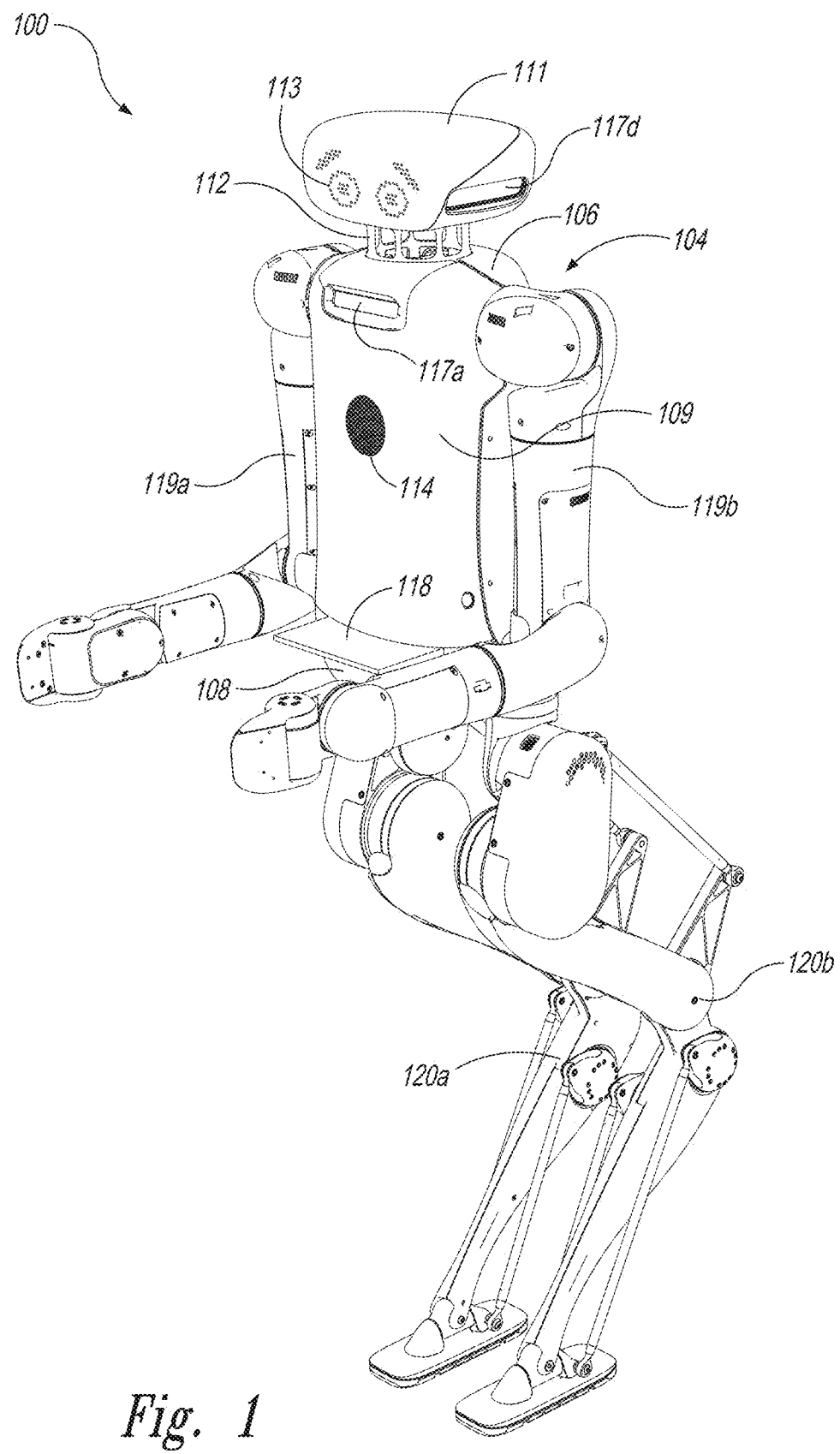
FIGS. 1 and 2 are different perspective views of a robot in accordance with at least some embodiments of the present technology with the robot being in a first state.

Disclosed herein are robots and associated devices, systems, and methods. Robots in accordance with at least some embodiments of the present technology include innovative features that facilitate supporting and/or manipulating objects at least partially from below the objects rather than only from the top and/or sides of the objects. This can be useful, for example, to increase the reliability, precision, and/or versatility of supporting and/or manipulating objects, to reduce or prevent damage to the objects, and/or for other reasons. In contrast to supporting and/or manipulating an object at least partially from below, supporting and/or manipulating an object from only the top or one side of the object (e.g., by suction) is far more prone to failure. Moreover, in contrast to supporting and/or manipulating an object at least partially from below, supporting and/or manipulating an object from only two sides of the object (e.g., by squeezing) is far more prone to damaging the object.

In the context of humanoid robotics and in other contexts, a challenge of supporting and/or manipulating objects at least partially from below is a lack of suitable structures to serve this purpose. Furthermore, even when such structures are available, use of the structures for this purpose may be suboptimal. For example, an end effector of an arm of a humanoid robot may be capable of contacting the bottom surface of an object and of maintaining this contact to support the weight of the object. It may be time consuming and inefficient, however, to move the end effector from a working position above or beside the object to a position below the object. Supporting the weight of an object via an end effector also may call for sustained work from one or more actuators associated with the end effector, undesirably consuming energy and generating heat for prolonged periods. Furthermore, the size, shape, material, and/or other features of an end effector may be advantageous for certain functions of the end effector, but disadvantageous for supporting and/or manipulating objects from below. For example, a small end effector may be more maneuverable than a larger end effector and therefore advantageous for retrieving objects in tight spaces while being less suitable than a larger end effector for distributing the weight of heavy objects while supporting such objects from below. Furthermore, using an end effector to at least partially support and/or manipulate an object from below may unduly interfere with using the end effector for other purposes. For example, while positioned below an object, an end effector may be unavailable to interact with the environment, such as to retrieve another object, to open a door, to remove an obstruction, etc. Robots in accordance with at least some embodiments of the present technology include features that at least partially address the foregoing and/or other problems.

A robot in accordance with at least some embodiments of the present technology includes a torso, two arms extending laterally from a superior portion of the torso, and a protrusion extending anteriorly from an inferior portion of the torso. Due to its position, shape, size, and/or for one or more other reasons, the protrusion can be well suited to supporting an object from below. While the protrusion provides this support, at least one of the arms can serve another useful purpose. For example, while the protrusion at least partially supports a weight of an object from below, an arm that would otherwise provide this support can contact a side of the object to at least partially inhibit lateral displacement of the object relative to the torso, contact a front of the object to at least partially inhibit forward displacement of the object relative to the torso, be occupied with a task unrelated to the object (e.g., retrieving a different object), and/or serve one or more other useful purposes. In this or another way, the protrusion can allow object-manipulation via the arms faster, more efficient, more reliable, etc. In addition or alternatively, the protrusion can provide other useful functions. For example, the protrusion can be movable relative to the torso to facilitate dispensing an object. These and other features of robots and associated devices, systems, and methods in accordance with various embodiments of the present technology are further described below with reference to FIGS. 1-75.

Although devices, systems, and methods may be described herein primarily or entirely in the context of robotic manipulation of boxes, other contexts are within the scope of the present technology. For example, suitable features of described devices, systems, and methods can be implemented in the context of robotically manipulating boxes using only one or more than two robotic arms. As another example, suitable features of described devices, systems, and methods can be implemented in the context of robotically manipulating objects other than boxes, such as totes, crates, non-packaged hard goods, irregularly shaped objects, etc. Furthermore, it should be understood, in general, that other devices, systems, and methods in addition to those disclosed herein are within the scope of the present disclosure. For example, devices, systems, and methods in accordance with embodiments of the present technology can have different and/or additional configurations, components, procedures, etc. than those disclosed herein. Moreover, devices, systems, and methods in accordance with embodiments of the present disclosure can be without one or more of the configurations, components, procedures, etc. disclosed herein without deviating from the present technology.

Robot Systems

Figure 2:
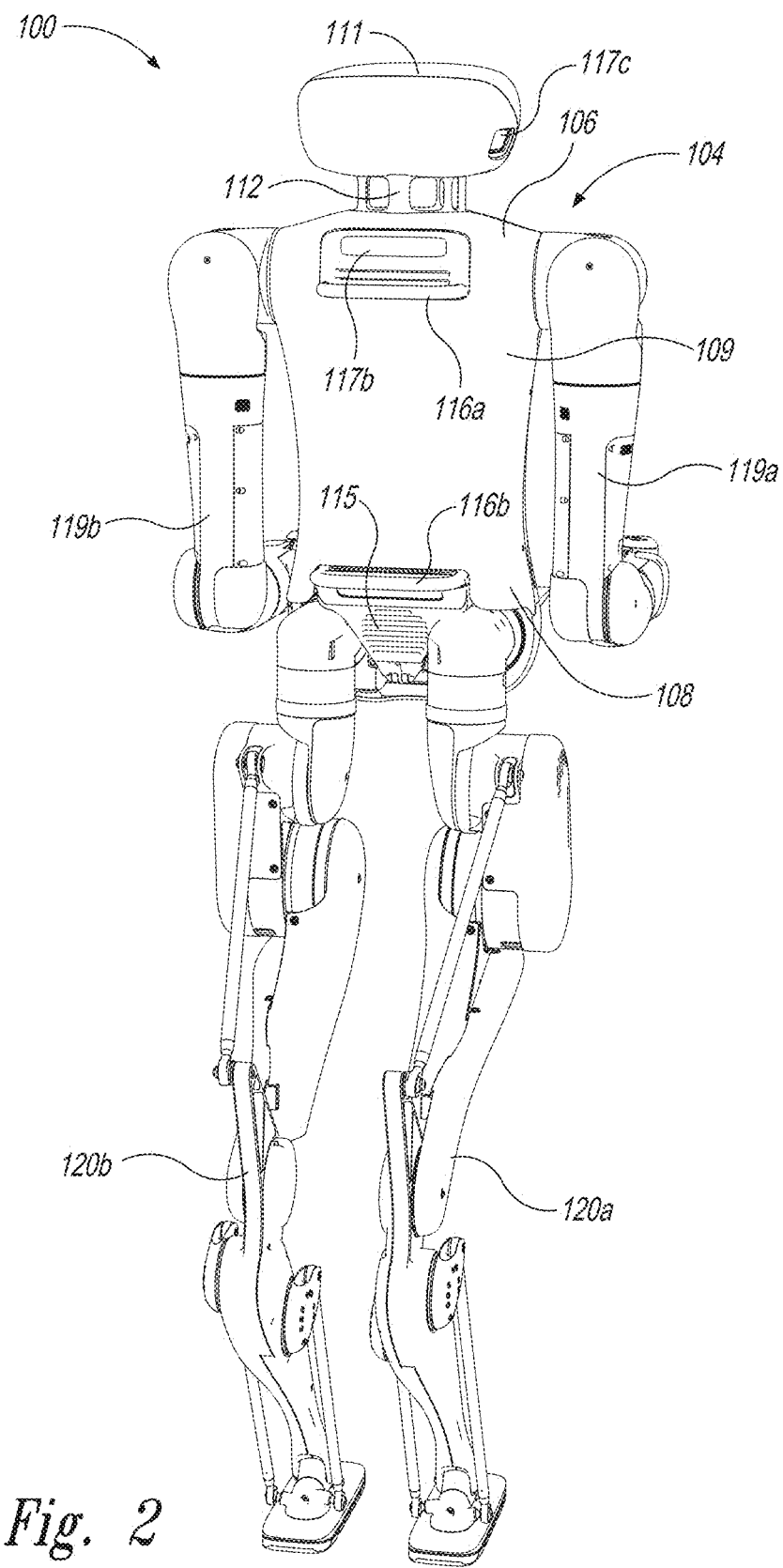
Figure 3:
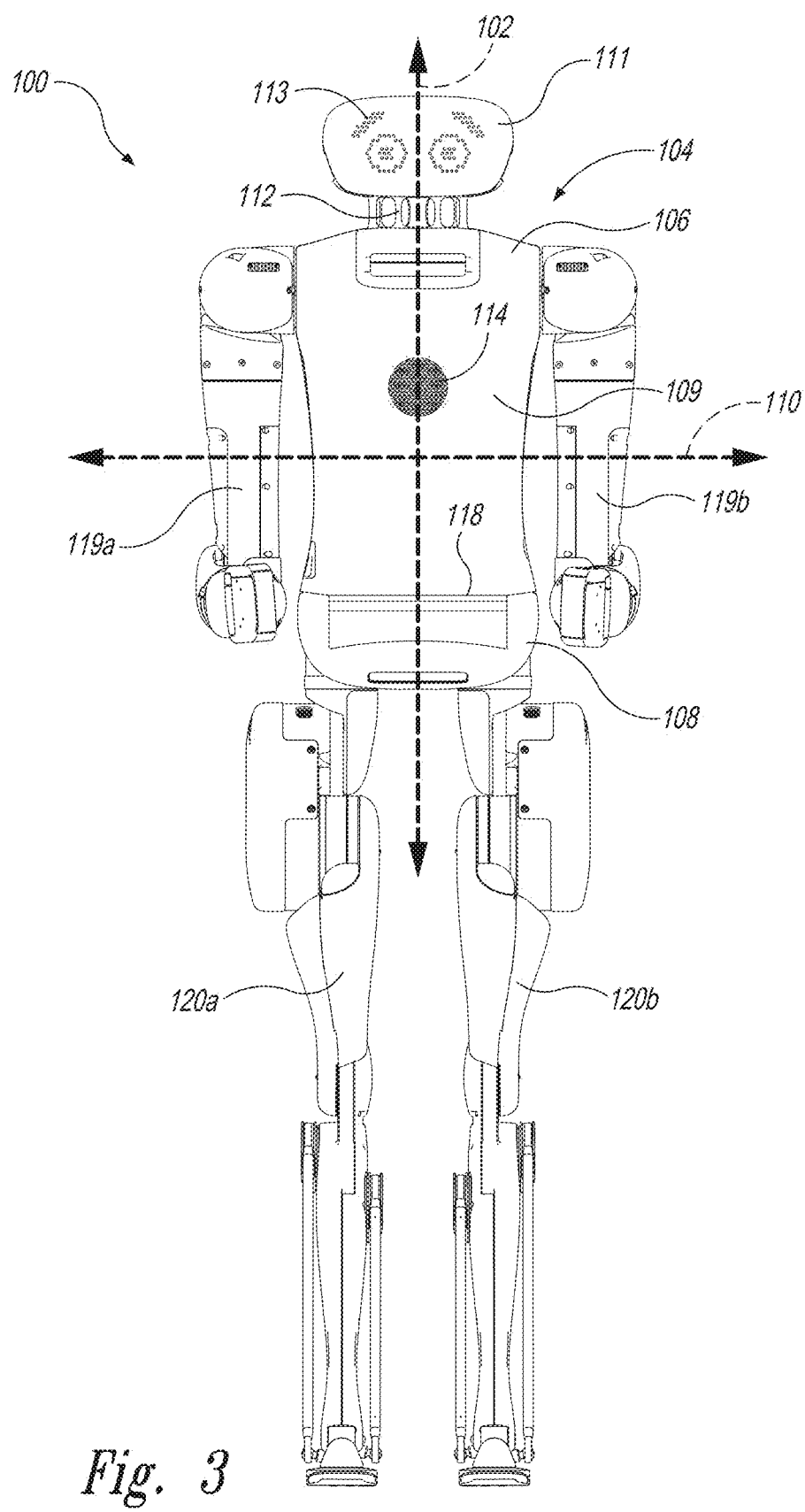
FIG. 3 is a front profile view of the robot in the first state shown in FIG. 1.
Figure 4:
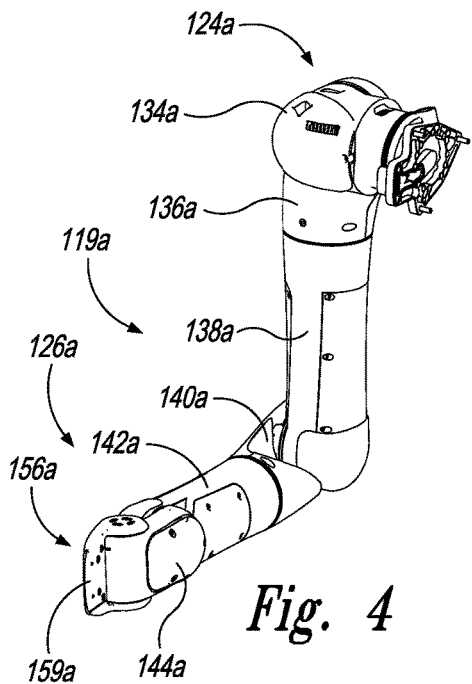
FIGS. 4-7 are perspective views of a first arm, a second arm, a first leg, and a second leg, respectively, of the robot shown in FIG. 1.
Figure 5:
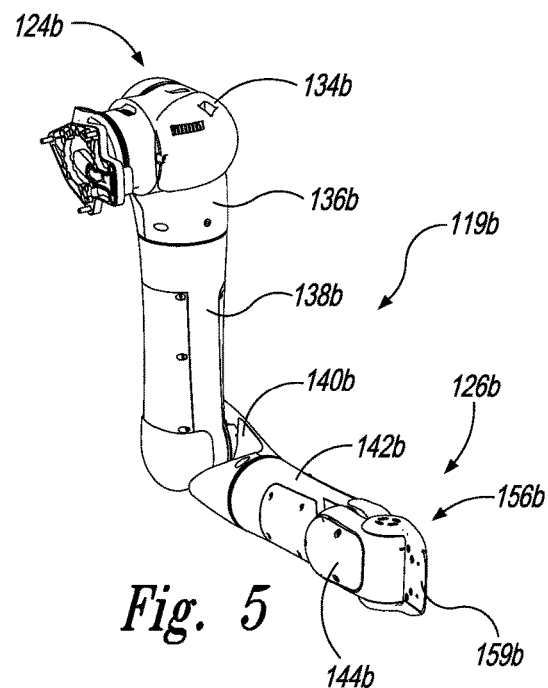
Figure 6:
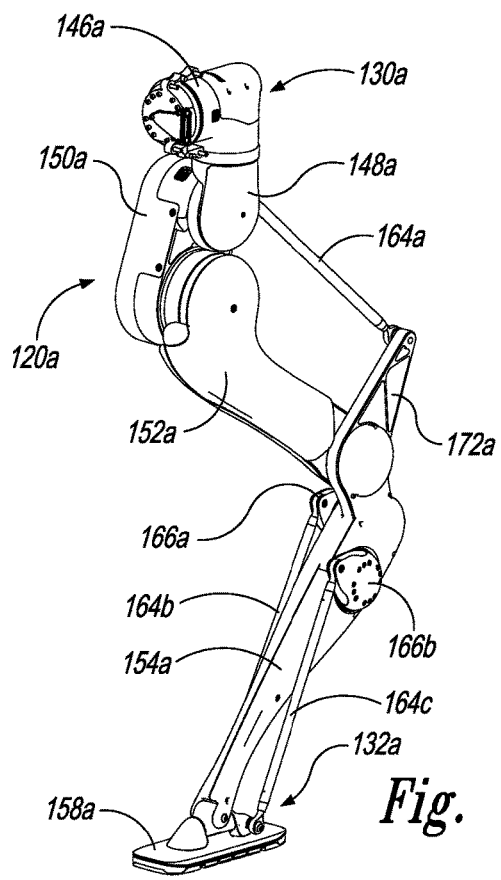
Figure 7:
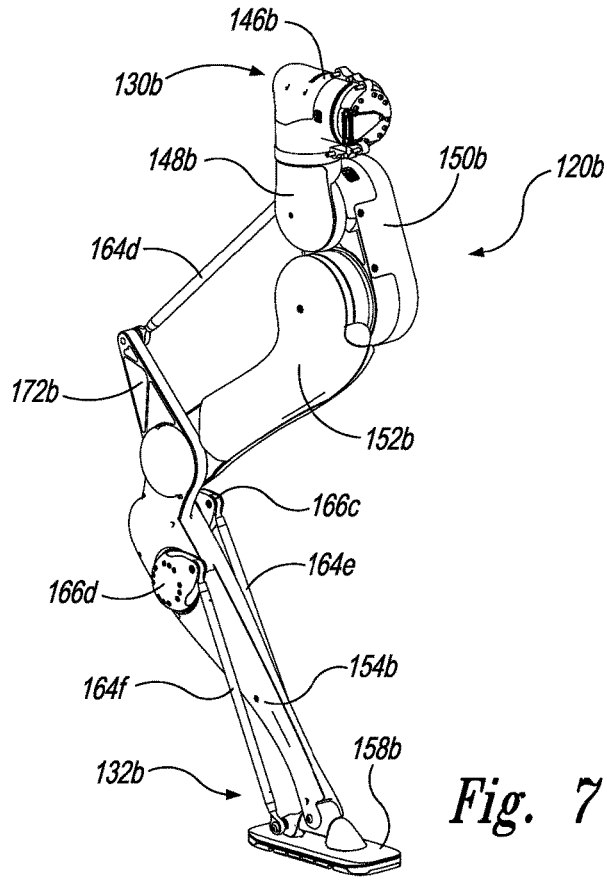
Figure 8:
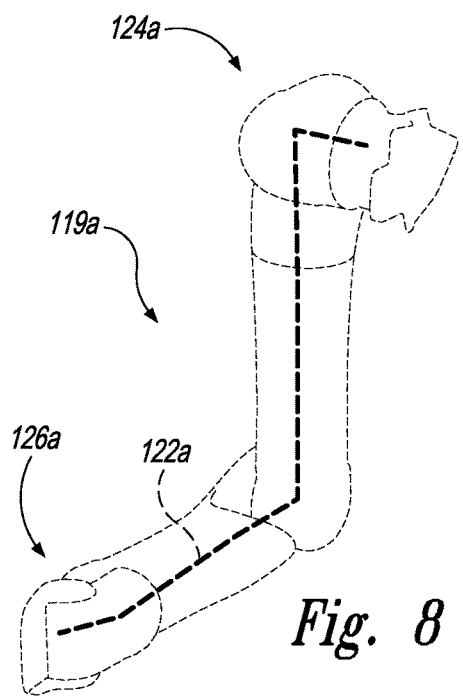
FIGS. 8-11 are silhouette views of the first arm, the second arm, the first leg, and the second leg of the robot shown in FIG. 1.
Figure 9:
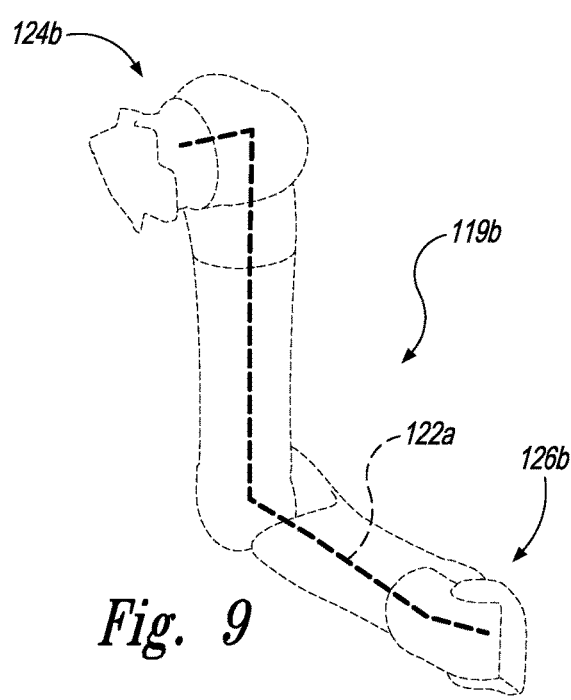
Figure 10:
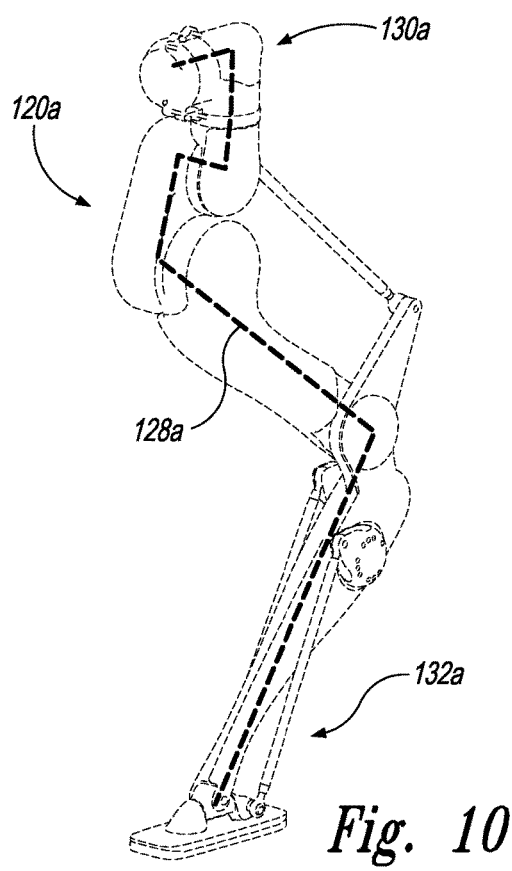
Figure 11:
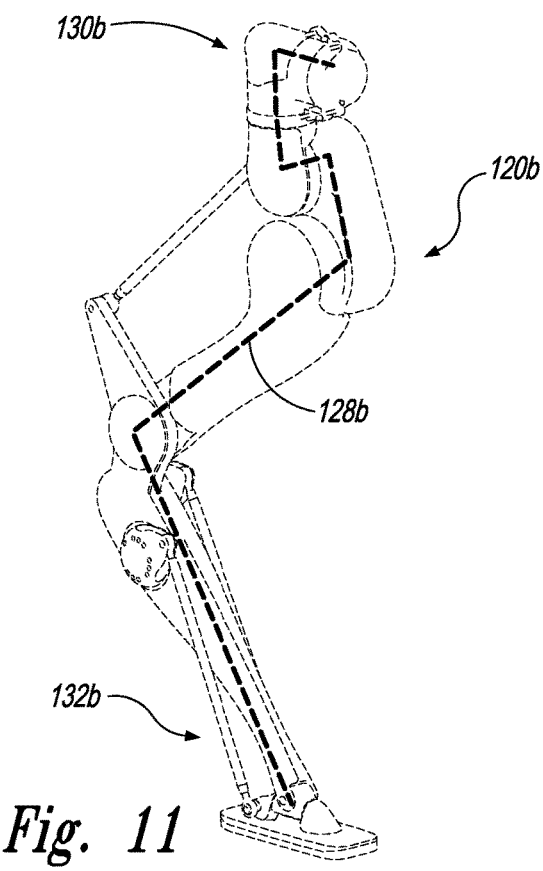
Figure 12:
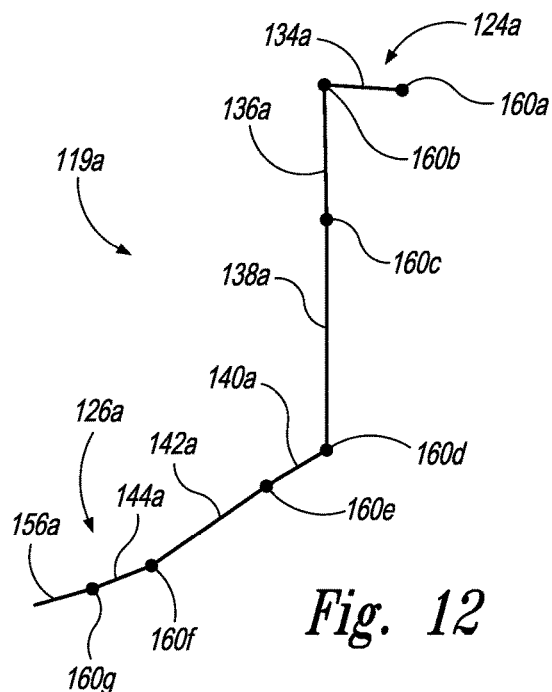
FIGS. 12-15 are partially schematic diagrams showing kinematic chains corresponding to the first arm, the second arm, the first leg, and the second leg of the robot shown in FIG. 1.
Figure 13:
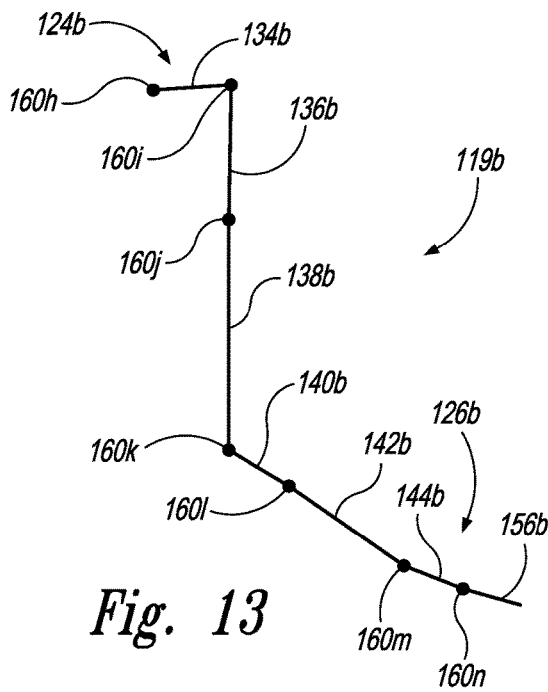
Figure 14:
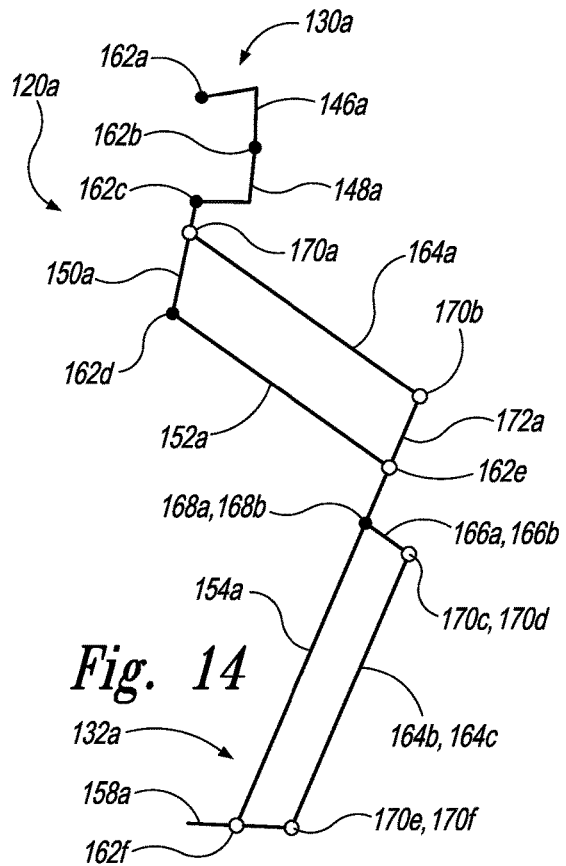
Figure 15:
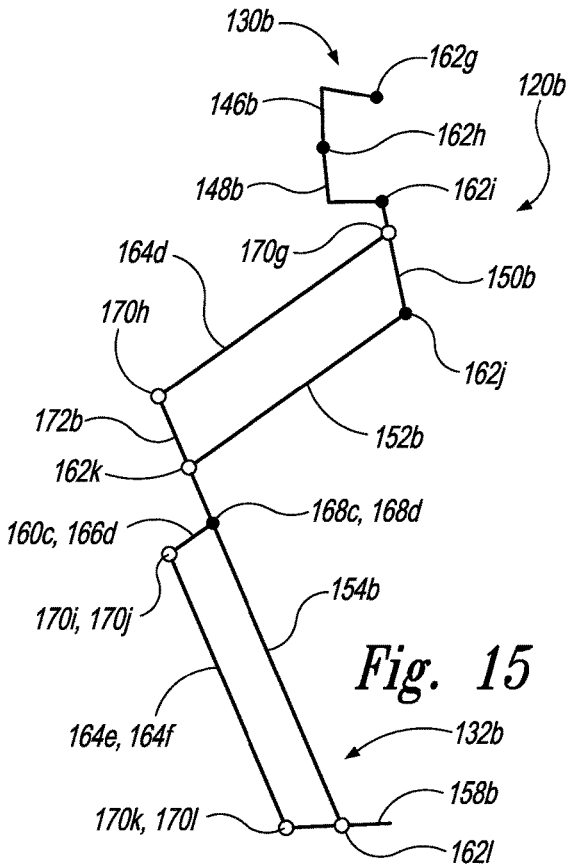

FIGS. 1 and 2 are different perspective views of a robot 100 in accordance with at least some embodiments of the present technology. FIG. 3 is a front profile view of the robot 100. As shown in FIGS. 1-3, the robot 100 can have a humanoid form. The robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body through which other structures of the robot 100 are interconnected. As all or a portion of the body, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113 including light-emitting diodes selectively controllable to create a composite, pixelated image evocative of human facial expression. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104. The robot 100 can still further include sensor arrays 117 (individually identified as sensor arrays 117a-117d) carried by the torso 104 and the head 111. The sensor arrays 117a, 117b can be at the superior portion 106 of the torso 104 and anteriorly and posteriorly directed, respectively. The sensor arrays 117c, 117d can be at opposite respective sides of the head 111 and can be directed in opposite respective lateral directions.

The robot 100 can further include a protrusion 118 extending anteriorly from the torso 104. In at least some cases, the robot 100 is configured to support a weight of an object at least partially via the protrusion 118. The robot 100 can further include articulated appendages carried by the torso 104. Among these articulated appendages, the robot 100 can include arms 119a, 119b and legs 120a, 120b. In at least some cases, the robot 100 is configured to manipulate objects via the arms 119a, 119b, such as bimanually. In these and other cases, the robot 100 can be configured to ambulate via the legs 120a, 120b, such as bipedally. FIGS. 4-15 show selected features of the arms 119a, 119b and legs 120a, 120b in greater detail. In particular, FIGS. 4-7 are perspective views of the arms 119a, 119b and legs 120a, 120b, respectively. FIGS. 8-11 are silhouette views of the arms 119a, 119b and legs 120a, 120b, respectively. Finally, FIGS. 12-15 are partially schematic diagrams showing kinematic chains corresponding to the arms 119a, 119b and legs 120a, 120b, respectively. In FIGS. 12-15, lines represent links, filled circles represent active joints, and open circles represent inactive joints.

With reference to FIGS. 1-15 together, the arms 119a, 119b can define respective arm lengths 122a, 122b extending from the torso 104. For clarity of illustration, the arm lengths 122a, 122b are only indicated in FIGS. 8 and 9, respectively. The arms 119a, 119b can have respective proximal end portions 124a, 124b and respective distal end portions 126a, 126b at opposite ends of the respective arm lengths 122a, 122b. The arms 119a, 119b can be connected to the torso 104 via the respective proximal end portions 124a, 124b thereof and the superior portion 106 of the torso 104. Similar to the arms 119a, 119b, the legs 120a, 120b can define respective leg lengths 128a, 128b extending from the torso 104. For clarity of illustration, the leg lengths 128a, 128b are only indicated in FIGS. 10 and 11, respectively. The legs 120a, 120b can have respective proximal end portions 130a, 130b and respective distal end portions 132a, 132b at opposite ends of the respective leg lengths 128a, 128b. The legs 120a, 120b can be connected to the torso 104 via the respective proximal end portions 130a, 130b thereof and the inferior portion 108 of the torso 104.

The arms 119a, 119b and the legs 120a, 120b can define kinematic chains. In at least some cases, the kinematic chains corresponding to the arms 119a, 119b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. The robot 100 can include links at progressively more distal (i.e., lower) levels within the kinematic chains corresponding to the arms 119a, 119b and the legs 120a, 120b and at progressively more distal (i.e., farther) positions along the arm lengths 122a, 122b and the leg lengths 128a, 128b. As parts of the arms 119a, 119b, the robot 100 can include proximal shoulder links 134*a*, 134*b*, distal shoulder links 136*a*, 136*b*, upper arm links 138*a*, 138*b*, elbow links 140*a*, 140*b*, lower arm links 142*a*, 142*b*, and wrist links 144*a*, 144*b*. Similarly, as parts of the legs 120*a*, 120*b*, the robot 100 can include proximal hip links 146*a*, 146*b*, distal hip links 148*a*, 148*b*, proximal thigh links 150*a*, 150*b*, distal thigh links 152*a*, 152*b*, and calf links 154*a*, 154*b*.

As further parts of the arms 119*a*, 119*b*, the robot 100 can include end effectors 156*a*, 156*b* opposite to the proximal end portions 124*a*, 124*b* along the arm lengths 122*a*, 122*b* and distal to the wrist links 144*a*, 144*b*. As further parts of the legs 120*a*, 120*b*, the robot 100 can include feet 158*a*, 158*b* opposite to the proximal end portions 130*a*, 130*b* along the leg lengths 128*a*, 128*b* and distal to the calf links 154*a*, 154*b*. The end effectors 156*a*, 156*b* can be at distalmost positions along the arm lengths 122*a*, 122*b*. Similarly, the feet 158*a*, 158*b* can be at distalmost positions along the leg lengths 128*a*, 128*b*. In at least some cases, the end effectors 156*a*, 156*b* include paddles 159*a*, 159*b* configured to interact with objects. In the illustrated embodiment, the end effectors 156*a*, 156*b* and the feet 158*a*, 158*b* are not articulated. In other embodiments, counterparts of some or all of the end effectors 156*a*, 156*b* and the feet 158*a*, 158*b* can be articulated, such as with one or more movable fingers or toes.

With reference again to FIGS. 1-15, the robot 100 can include arm joints 160 (individually identified as arm joints 160*a*-160*n*) as parts of the arms 119*a*, 119*b*. The arm joints 160*a*-160*n* can be disposed between neighboring links within the kinematic chains corresponding to the arms 119*a*, 119*b* and at opposite ends of these kinematic chains. For clarity of illustration, the arm joints 160 are only indicated in FIGS. 12 and 13. The robot 100 can further include leg joints 162 (individually identified as leg joints 162*a*-162*l*) as parts of the legs 120*a*, 120*b*. Similar to the arm joints 160*a*-160*n*, the leg joints 162*a*-162*l* can be disposed between neighboring links within the kinematic chains corresponding to the legs 120*a*, 120*b* and at opposite ends of these kinematic chains. For clarity of illustration, the leg joints 162 are only indicated in FIGS. 14 and 15. The arm joints 160*a*-160*n* and the leg joints 162*a*-162*l* may be referenced herein in connection with the distally neighboring link along the kinematic chain of the corresponding one of the arms 119*a*, 119*b* and the legs 120*a*, 120*b*. For example, the arm joints 160*f*, 160*m* may be referenced herein as the wrist joints 160*f*, 160*m*.

In FIGS. 1-3, the robot 100 is shown in a first state, which can correspond to a home pose, a neutral pose, etc. well-suited to an object handling task. In the first state, the proximal shoulder links 134*a*, 134*b* can extend laterally from the torso 104. Also, in the first state, the distal shoulder links 136*a*, 136*b* and the upper arm links 138*a*, 138*b* can extend inferiorly from the proximal shoulder links 134*a*, 134*b*. Also, in the first state, the elbow links 140*a*, 140*b*, the lower arm links 142*a*, 142*b*, and the wrist links 144*a*, 144*b* can extend anteriorly from the upper arm links 138*a*, 138*b*. Also, in the first state, the proximal hip links 146*a*, 146*b* can extend posteriorly from the torso 104. Also, in the first state, the distal hip links 148*a*, 148*b* and the proximal thigh links 150*a*, 150*b* can extend inferiorly from the proximal hip links 146*a*, 146*b*. Also, in the first state, the distal thigh links 152*a*, 152*b* can extend inferiorly and posteriorly from the proximal thigh links 150*a*, 150*b*. Finally, in the first state, the calf links 154*a*, 154*b* can extend inferiorly and anteriorly from the distal thigh links 152*a*, 152*b*.

In at least some cases, the calf joints 162*e*, 162*k* and the foot joints 162*f*, 162*l* are passive. As additional parts of the legs 120*a*, 120*b*, the robot 100 can include connection shafts 164 (individually identified as connection shafts 164*a*-164*f*), cranks 166 (individually identified as cranks 166*a*-166*d*), ancillary active joints 168 (individually identified as ancillary active joints 168*a*-168*d*), and ancillary passive joints 170 (individually identified as ancillary passive joints 170*a*-170*l*). The connection shafts 164*a*, 164*d* can extend between the proximal thigh links 150*a*, 150*b* and the calf links 154*a*, 154*b*. When the robot 100 is in the first state, the connection shafts 164*a*, 164*d* can be posteriorly spaced apart from the distal thigh links 152*a*, 152*b* and within 10 degrees of parallel to (e.g., within 5 degrees of parallel to and/or substantially parallel to) corresponding portions of the leg lengths 128*a*, 128*b*. Moving the distal thigh joints 162*d*, 162*j* from their positions when the robot 100 is in the first state can cause the connection shafts 164*a*, 164*d* to move increasingly off parallel from the corresponding portions of the leg lengths 128*a*, 128*b*.

The calf links 154*a*, 154*b* can include projections 172*a*, 172*b* extending posteriorly and superiorly from the calf joints 162*e*, 162*k*. The ancillary passive joints 170*a*, 170*b* can be at opposite ends of the connection shaft 164*a*. Similarly, the ancillary passive joints 170*g*, 170*h* can be at opposite ends of the connection shaft 164*d*. Due to their kinematic arrangement, an actuated position of the distal thigh joint 162*d* can dictate positions of the calf joint 162*e* and of the ancillary passive joints 170*a*, 170*b*. Similarly, due to their kinematic arrangement, an actuated position of the distal thigh joint 162*j* can dictate positions of the calf joint 162*k* and of the ancillary passive joints 170*g*, 170*h*. The calf links 154*a*, 155*b* can carry the cranks 166*a*, 166*c* laterally. The calf links 154*a*, 155*b* can further carry the cranks 166*b*, 166*d* medially. The ancillary active joints 168*a*, 168*b* can be between the cranks 166*a*, 166*b* and the calf link 154*a*. Similarly, the ancillary active joints 168*c*, 168*d* can be between the cranks 166*c*, 166*d* and the calf link 154*b*.

The connection shafts 164*b*, 164*c* can extend between the cranks 166*a*, 166*b* and the foot 158*a* and can be spaced apart laterally and medially, respectively, from the calf link 154*a*. Similarly, the connection shafts 164*e*, 164*f* can extend between the cranks 166*c*, 166*d* and the foot 158*b* and can be spaced apart laterally and medially, respectively, from the calf link 154*b*. The ancillary passive joints 170*c*, 170*e* can be at opposite ends of the connection shaft 164*b*. The ancillary passive joints 170*d*, 170*f* can be at opposite ends of the connection shaft 164*c*. The ancillary passive joints 170*i*, 170*k* can be at opposite ends of the connection shaft 164*e*. Finally, the ancillary passive joints 170*j*, 170*l* can be at opposite ends of the connection shaft 164*f*. The ancillary active joints 168*a*, 168*b* can be configured to operate in concert with one another to move the foot 158*a* relative to the calf link 154*a*. Due to their kinematic arrangement, actuated positions of the ancillary active joints 168*a*, 168*b* can dictate positions of the foot joint 162*f* and of the ancillary passive joints 170*c*-170*f*. Similarly, the ancillary active joints 168*c*, 168*d* can be configured to operate in concert with one another to move the foot 158*b* relative to the calf link 154*b*. Due to their kinematic arrangement, actuated positions of the ancillary active joints 168*c*, 168*d* can dictate positions of the foot joint 162*l* and of the ancillary passive joints 170*i*-170*l*.

The relative orientations of the arm joints 160*a*-160*l*, the relative positions of the arm joints 160*a*-160*l*, the dimensions of the links within the kinematic chains corresponding to the arms 119*a*, 119*b*, the shapes of these links, and/or other features of the arms 119*a*, 119*b* can provide advantages over conventional alternatives. Examples of these advantages include enhanced maneuverability, enhanced range of motion, enhanced economy of motion, reduced occurrence of kinematic singularities during certain operations (e.g., object lifting, object carrying, etc.), closer emulation of human arm kinematics, and closer emulation of human arm conformation, among others. Furthermore, the relative orientations of the leg joints 162a-162l, the relative positions of the leg joints 162a-162l, the dimensions of the links within the kinematic chains corresponding to the legs 120a, 120b, the shapes of these links, and/or other features of the legs 120a, 120b can provide advantages over conventional alternatives. Examples of these advantages include enhanced maneuverability, enhanced range of motion, enhanced economy of motion, reduced occurrence of kinematic singularities during certain operations (e.g., walking, running, etc.), closer emulation of human leg kinematics, and closer emulation of human leg conformation, among others.

Figures 16, 17:
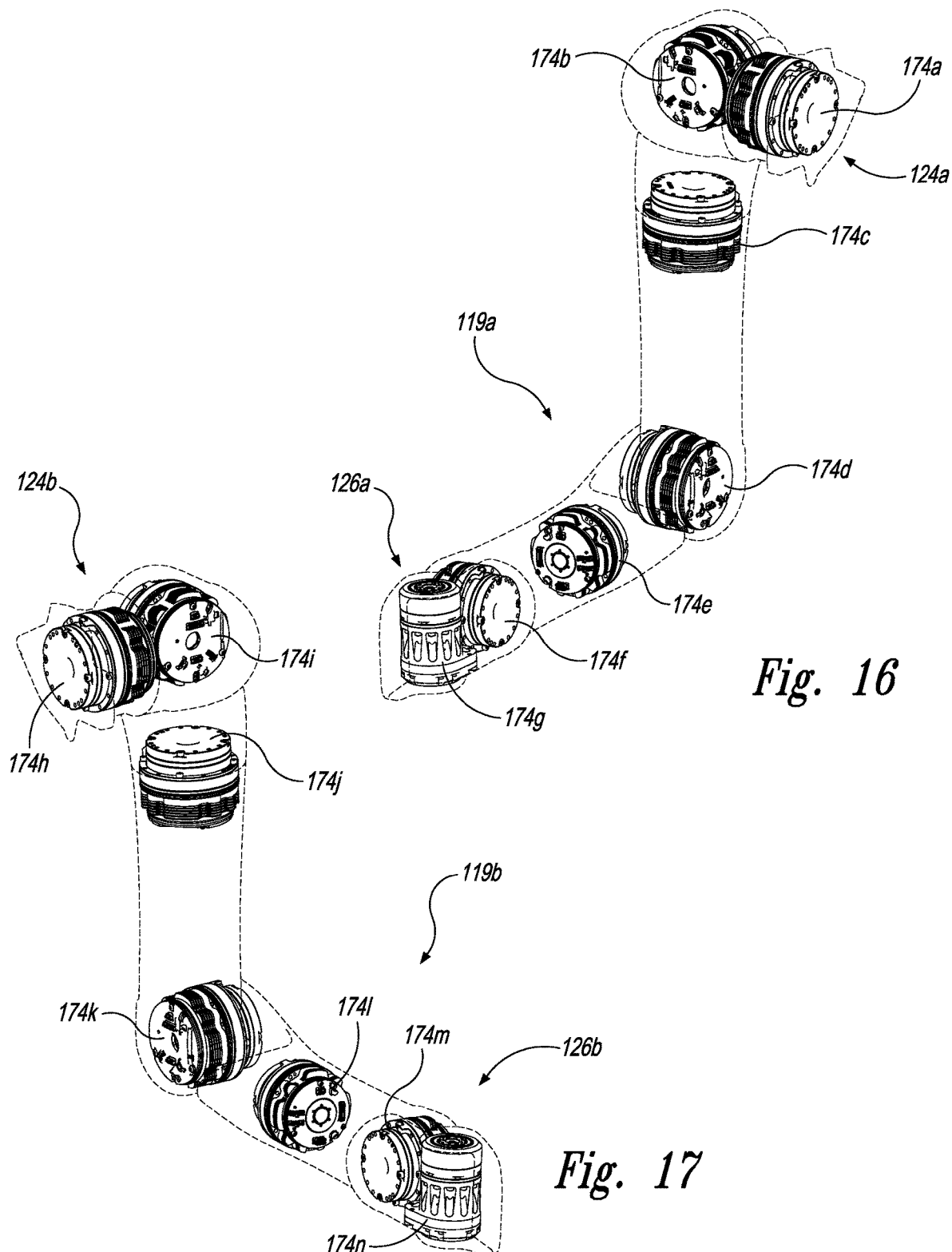
Figure 21:
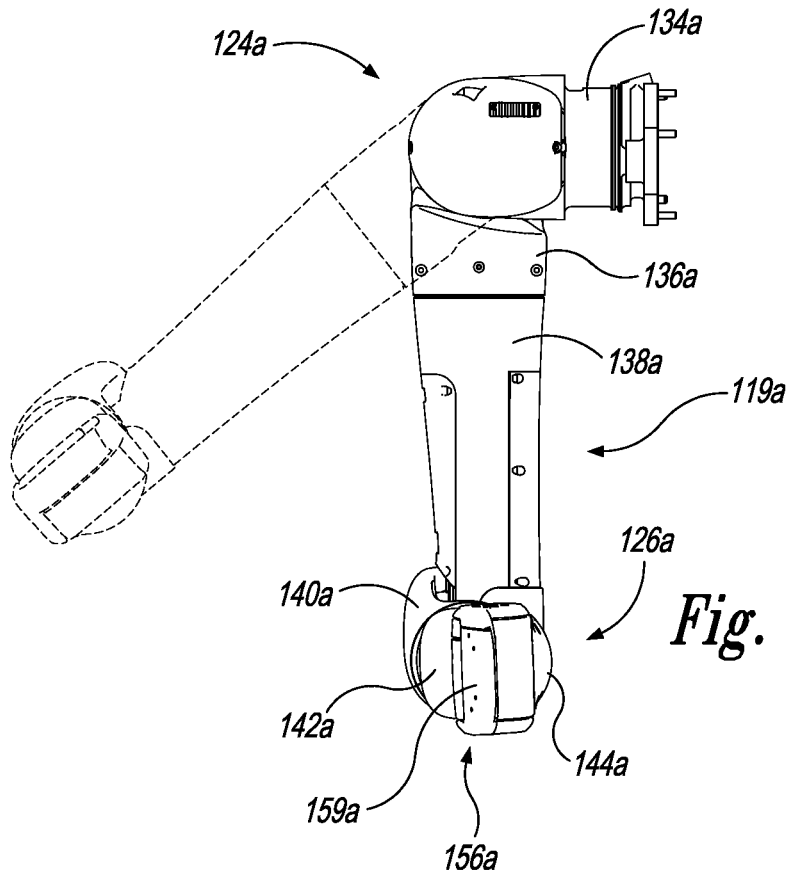
FIG. 21 is a front profile view of the first arm of the robot shown in FIG. 1 indicating isolated motion about an arm joint of the robot distal to the arm joint of FIG. 20 along the kinematic chain of FIG. 12.
Figure 22:
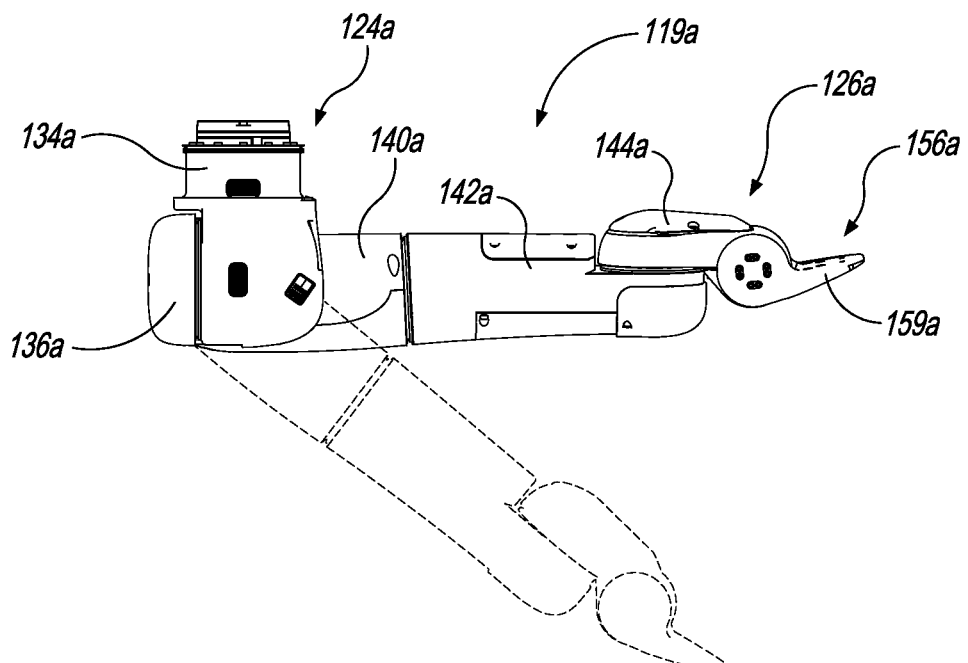
FIG. 22 is a top plan view of the first arm of the robot shown in FIG. 1 indicating isolated motion about an arm joint of the robot distal to the arm joint of FIG. 21 along the kinematic chain of FIG. 12.

FIGS. 16 and 17 are partially transparent perspective views of the arms 119a, 119b, respectively. As shown in FIGS. 16 and 17, the robot 100 can include arm actuators 174 (individually identified as arm actuators 174a-174n) as parts of the arms 119a, 119b. The arm actuators 174a-174n can be embedded within, mounted to, or otherwise carried by the links within the kinematic chains corresponding to the arms 119a, 119b. In the illustrated embodiment, the arm actuators 174a-174n are incorporated into the arms 119a, 119b in the following manner. The arm actuators 174a, 174h are embedded within portions of the proximal shoulder links 134a, 134b at the proximal shoulder joints 160a, 160h. The arm actuators 174b, 174i are embedded within portions of the proximal shoulder links 134a, 134b at the distal shoulder joints 160b, 160i. The arm actuators 174c, 174j are embedded within portions of the upper arm links 138a, 138b at the upper arm joints 160c, 160j. The arm actuators 174d, 174k are embedded within portions of the upper arm links 138a, 138b at the elbow joints 160d, 160k. The arm actuators 174e, 174l are embedded within portions of the lower arm links 142a, 142b at the lower arm joints 160e, 160l. The arm actuators 174f, 174m are embedded within portions of the lower arm links 142a, 142b at the wrist joints 160f, 160m. Finally, the arm actuators 174g, 174n are embedded within portions of the wrist links 144a, 144b at the end effector joints 160g, 160n.

FIGS. 18 and 19 are partially transparent perspective views of the legs 120a, 120b, respectively. As shown in FIGS. 18 and 19, the robot 100 can include leg actuators 176 (individually identified as leg actuators 176a-176l) as parts of the legs 120a, 120b. The leg actuators 176a-176l can be embedded within, mounted to, or otherwise carried by the links within the kinematic chains corresponding to the legs 120a, 120b. In the illustrated embodiment, the leg actuators 176a-176l are incorporated into the legs 120a, 120b in the following manner. The leg actuators 176a, 176g are embedded within portions of the proximal hip links 146a, 146b at the proximal hip joints 162a, 162g. The leg actuators 176b, 176h are embedded within portions of the proximal hip links 146a, 146b at the distal hip joints 162b, 162h. The leg actuators 176c, 176i are embedded within portions of the proximal thigh links 150a, 150b at the proximal thigh joints 162c, 162i. The leg actuators 176d, 176j are embedded within portions of the proximal thigh links 150a, 150b at the distal thigh joints 162d, 162j. The leg actuators 176e, 176k are embedded within portions of the calf links 154a, 154b spaced apart from the foot joints 162f, 162l along the corresponding leg lengths 128a, 128b and are operably connected to the foot joints 162f, 162l via the cranks 166a, 166c and the connection shafts 164a, 164c. Finally, the leg actuators 176f, 176l are embedded within portions of the calf links 154a, 154b spaced apart from the foot joints 162f, 162l and distal to the leg actuators 176e, 176k along the corresponding leg lengths 128a, 128b and are operably connected to the foot joints 162f, 162l via the cranks 166b, 166d and the connection shafts 164b, 164d.

In the illustrated embodiment, the arm actuators 174a-174n and the leg actuators 176a-176c, 176e-176i, 176k-176l are rotary actuators including electric servo motors and corresponding harmonic gear units. This combination can be characterized by relatively high torque density, compact size, and low backlash, among other potentially advantageous features. Suitable actuators include those available from Harmonic Drive LLC (Beverly, Massachusetts). Also in the illustrated embodiment, the leg actuators 176d, 176j are rotary actuators including electric servo motors and corresponding cycloidal gear units. This combination can likewise be characterized by relatively compact size and low backlash, and can be further characterized by even higher torque density than harmonic gear units. The very high torque density of cycloidal gear units can be useful, for example, to support very high loads on the leg actuators 176d, 176j during bipedal locomotion of the robot 100. Leverage via the projections 172a, 172b can further support these very high loads. In other embodiments, counterparts of some or all of the arm actuators 174 and the leg actuators 176 can be pneumatic or hydraulic rather than electric, be linear rather than rotary, be stepper-type rather than servo-type, be direct drive rather than geared, and/or have different gearing than in the illustrated embodiment (e.g., harmonic for the leg actuators 176d, 176j, cycloidal for the arm actuators 174a-174n and the leg actuators 176a-176c, 176e-176i, 176k-176l, spur, helical, miter, worm, rack, bevel, screw, etc.).

Figure 26:
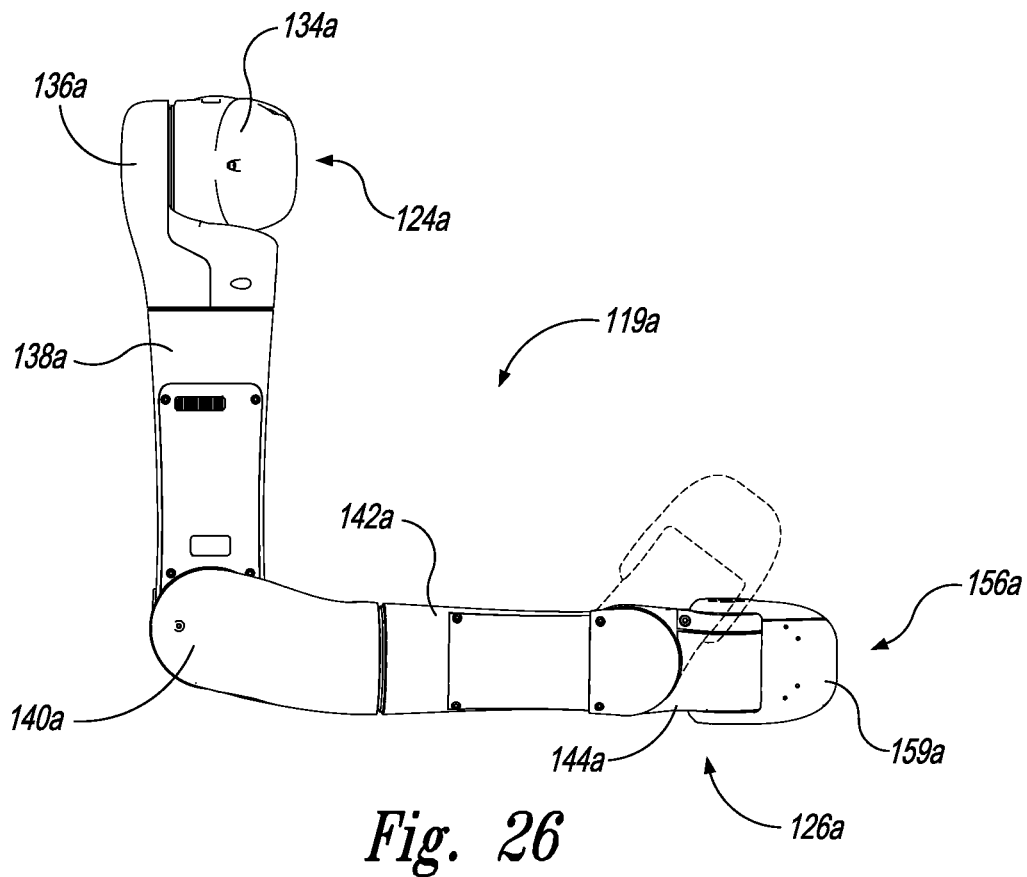
FIG. 26 is a side profile view of the first arm of the robot shown in FIG. 1 indicating isolated motion about an arm joint of the robot distal to the arm joint of FIGS. 24 and 25 along the kinematic chain of FIG. 12.
Figure 27:
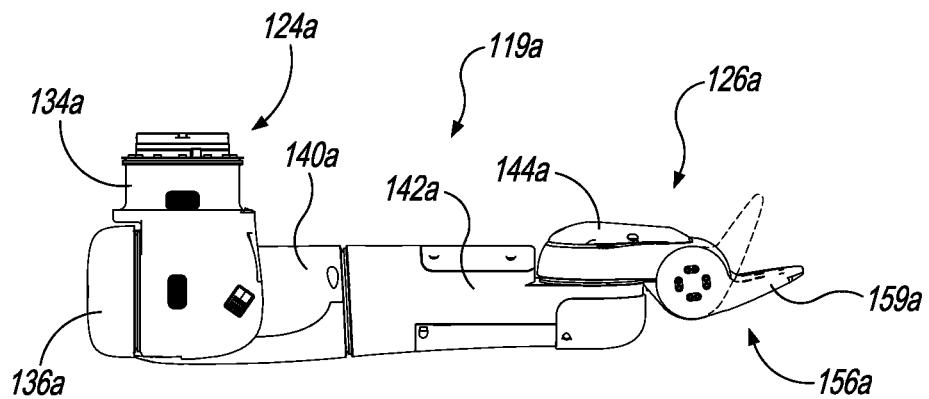
FIG. 27 is a top plan view of the first arm of the robot shown in FIG. 1 indicating isolated motion about an arm joint of the robot distal to the arm joint of FIG. 26 along the kinematic chain of FIG. 12.

FIGS. 20-23 are various views of the arm 119a indicating isolated motion about the proximal shoulder joint 160a, the distal shoulder joint 160b, the upper arm joint 160c, and the elbow joint 160d, respectively. FIGS. 24 and 25 are perspective views of a portion of the arm 119a indicating isolated motion about the lower arm joint 160e. FIGS. 26 and 27 are a side profile view and a top plan view, respectively, of the arm 119a indicating isolated motion about the wrist joint 160f and the end effector joint 160g, respectively. Motion about the arm joints 160h-160n of the arm 119b can correspond symmetrically about the midsagittal plane 102 (FIG. 3) to the motion about the arm joints 160a-160g of the arm 119a shown in FIGS. 20-27. In at least some cases, the proximal shoulder joints 160a, 160h, the upper arm joints 160c, 160j, and the lower arm joints 160e, 160l are configured to rotate about respective axes parallel to the corresponding arm lengths 122a, 122b. In these and other cases, the distal shoulder joints 160b, 160i, the elbow joints 160d, 160k, the wrist joints 160f, 160m, and the end effector joints 160g, 160n can be configured to rotate about respective axes off-parallel to (e.g., within 10 degrees of perpendicular to, within 5 degrees of perpendicular to and/or substantially perpendicular to) the corresponding arm lengths 122a, 122b.

Figure 28:
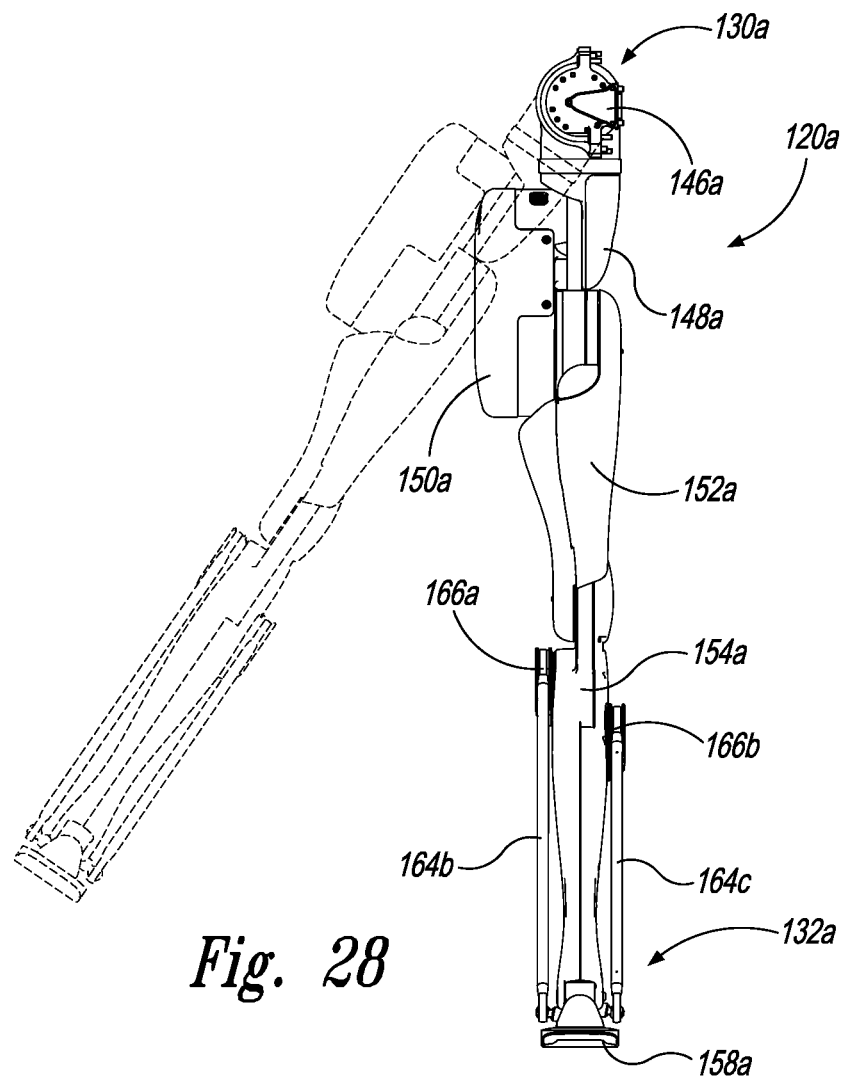
FIG. 28 is a front profile view of the first leg of the robot shown in FIG. 1 indicating isolated motion about a leg joint of the robot along the kinematic chain of FIG. 14.
Figure 29:
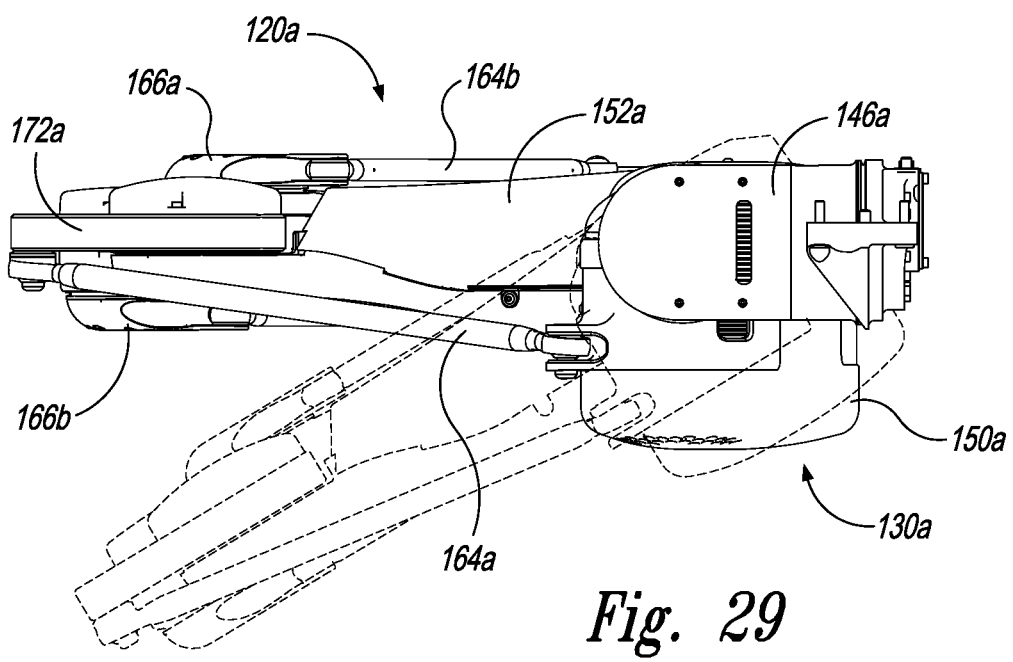
FIG. 29 is a top plan view of the first leg of the robot shown in FIG. 1 indicating isolated motion about a leg joint of the robot distal to the leg joint of FIG. 28 along the kinematic chain of FIG. 14.
Figure 30:
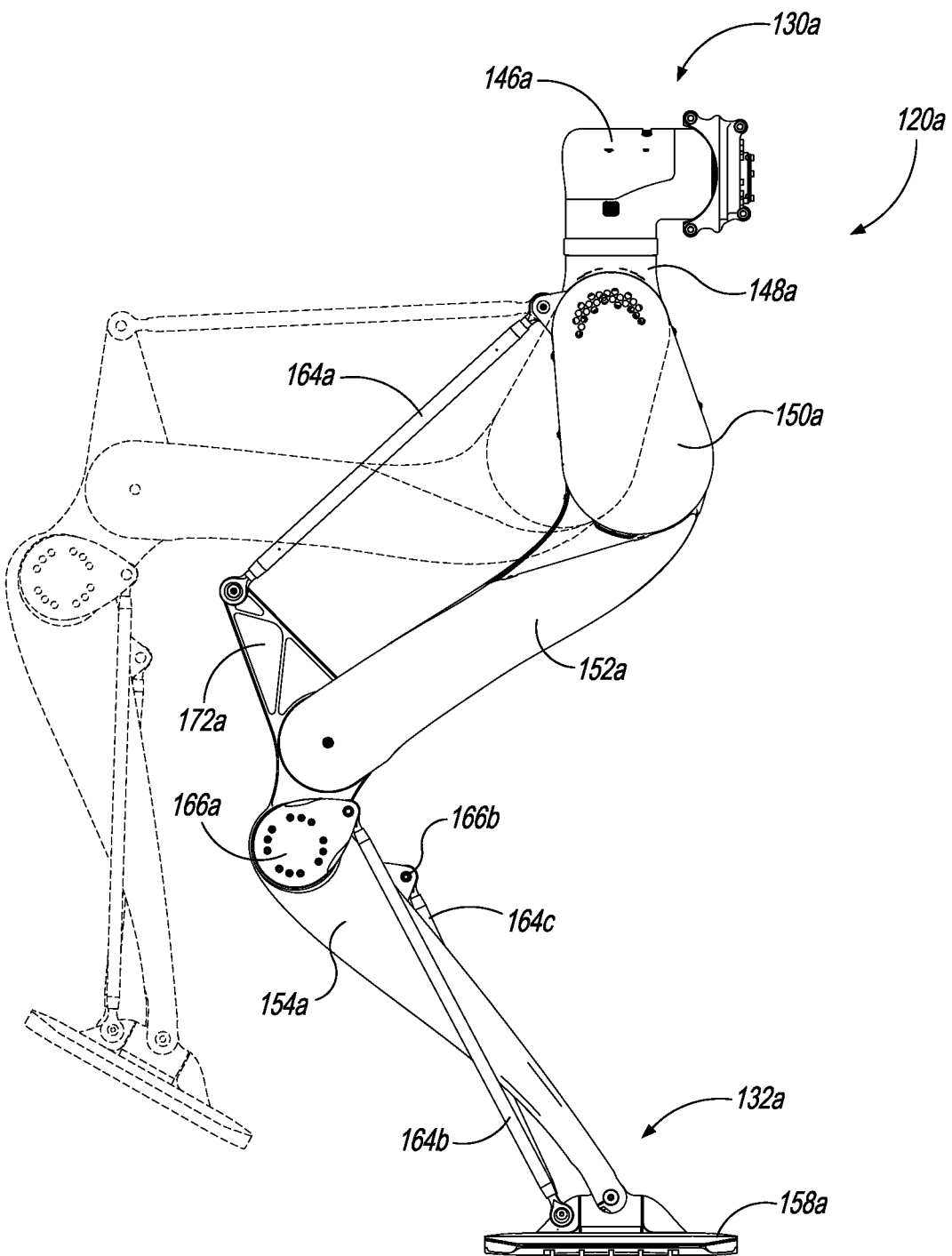
FIG. 30 is a side profile view of the first leg of the robot shown in FIG. 1 indicating isolated motion about a leg joint of the robot distal to the leg joint of FIG. 29 along the kinematic chain of FIG. 14.
Figure 31:
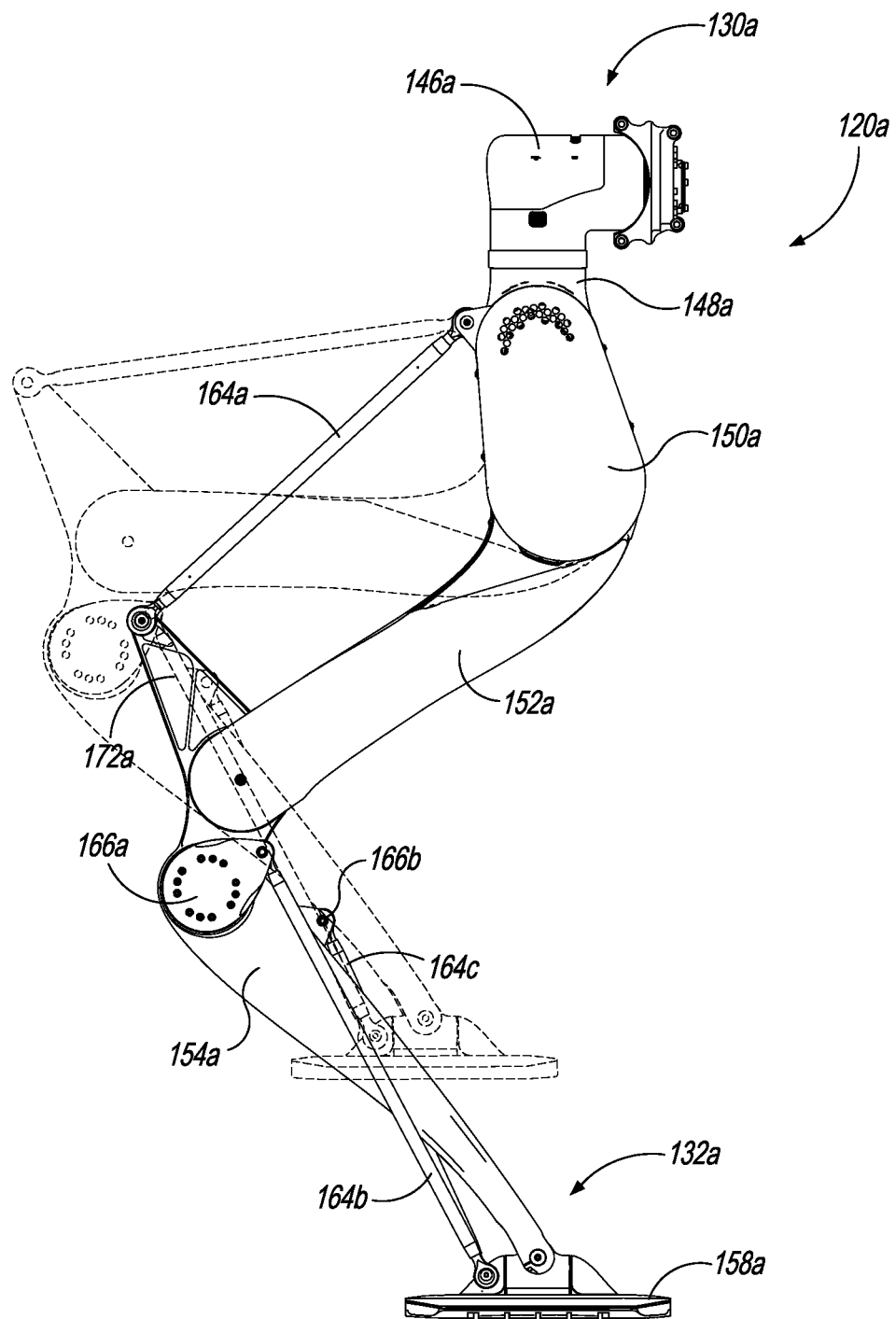
FIG. 31 is a side profile view of the first leg of the robot shown in FIG. 1 indicating isolated motion about two leg joints of the robot distal to the leg joint of FIG. 30 along the kinematic chain of FIG. 14.
Figure 32:
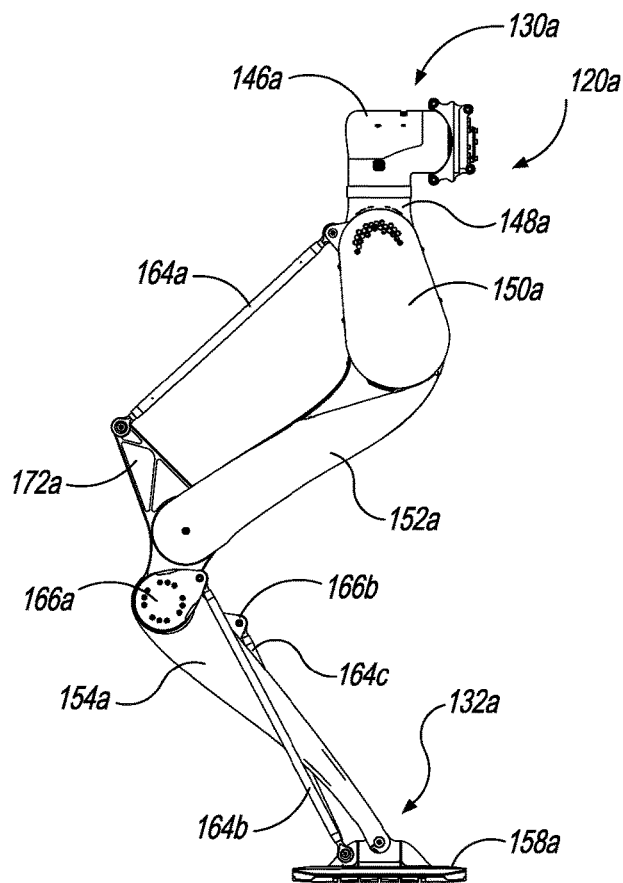
FIGS. 32 and 33 are side profile views of the first leg of the robot shown in FIG. 1 indicating isolated motion about a leg joint of the robot distal to the leg joints of FIG. 31 along the kinematic chain of FIG. 14.
Figure 33:
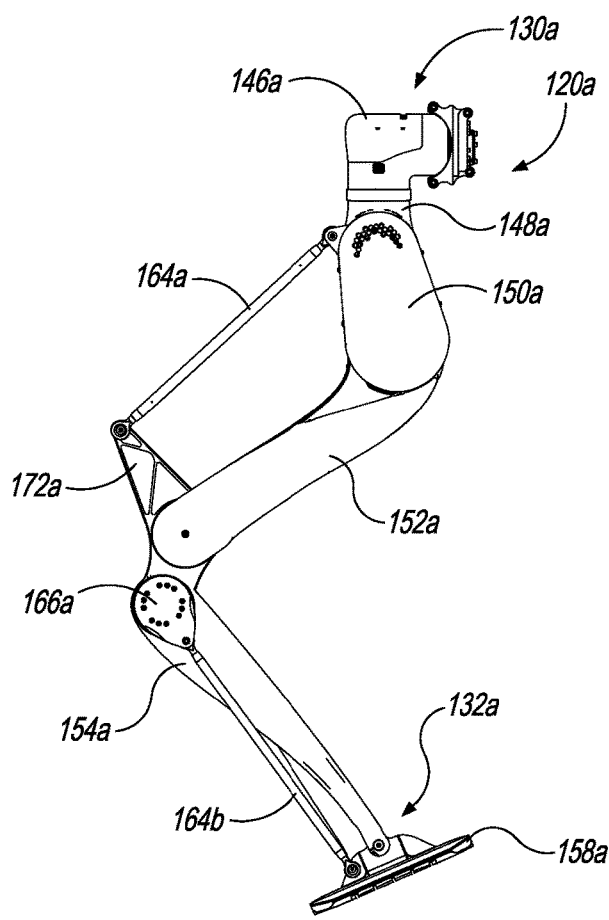

FIGS. 28-30 are various views of the leg 120a indicating isolated motion about the proximal hip joint 162a, the distal hip joint 162b, and the proximal thigh joint 162c, respectively. FIG. 31 is a side profile view of the leg 120a indicating isolated motion about both the distal thigh joint 162d and the calf joint 162e. FIGS. 32 and 33 are side profile views of the leg 120a indicating isolated motion about the foot joint 162f. Motion about the leg joints 162g-162l of the leg 120b can correspond symmetrically about the midsagittal plane 102 (FIG. 3) to the motion about the leg joints 162a-160f of the leg 120a shown in FIGS. 28-33. In at least some cases, the proximal hip joints 162a, 162g and the distal hip joints 162b, 162h are configured to rotate about respective axes parallel to the corresponding leg lengths 128a, 128b. In these and other cases, proximal thigh joints 162c, 162i, the distal thigh joints 162d, 162j, the calf joints 162e, 162k, and the foot joints 162f, 162l can be configured to rotate about respective axes off-parallel to (e.g., within 10 degrees of perpendicular to, within 5 degrees of perpendicular to and/or substantially perpendicular to) the corresponding leg lengths 128a, 128b.

Electrical and Computer Systems

Figure 34:
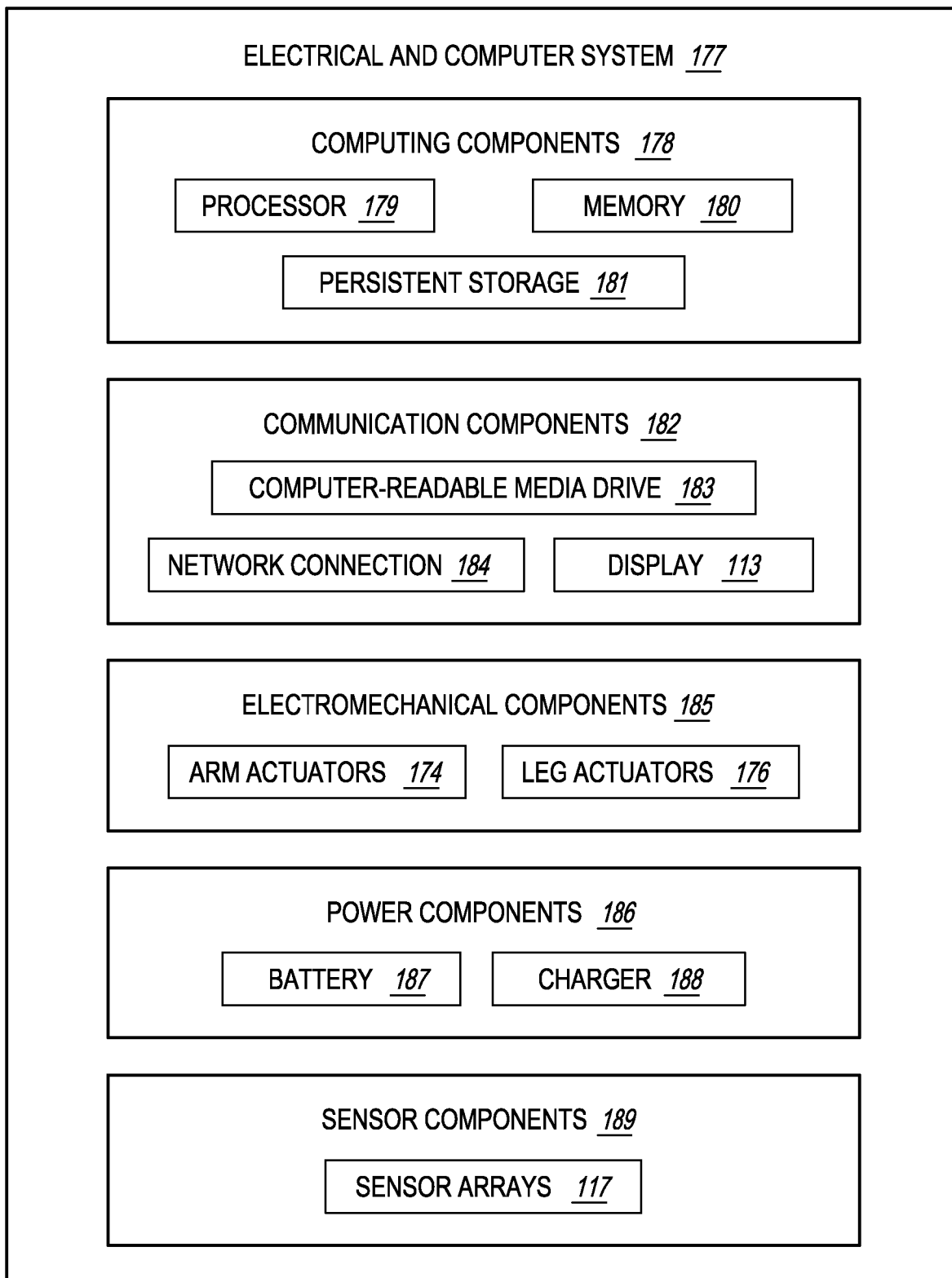
FIG. 34 is a block diagram illustrating an electrical and computer system of the robot shown in FIG. 1.
Figure 35:
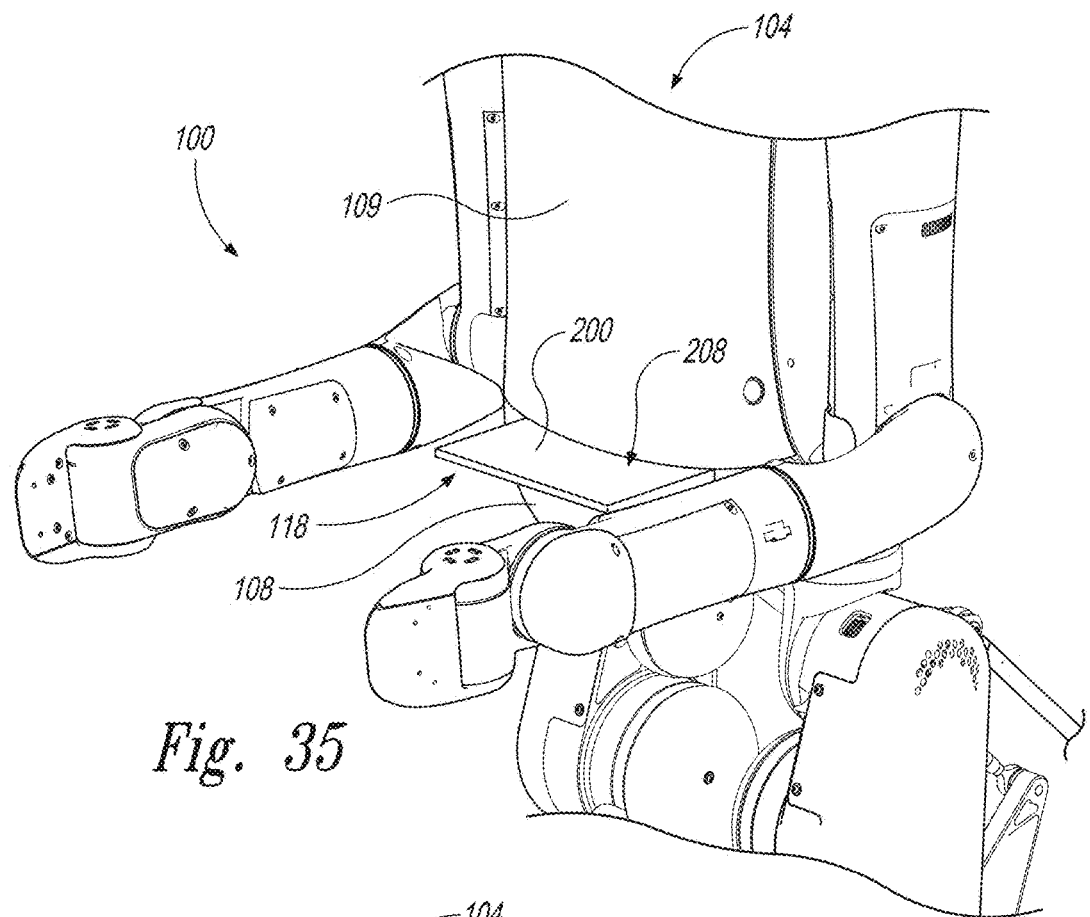
FIGS. 35-38 are a partial perspective view, a partial front profile view, a partial side profile view, and a partial top plan view, respectively, of the robot shown in FIG. 1.
Figure 36:
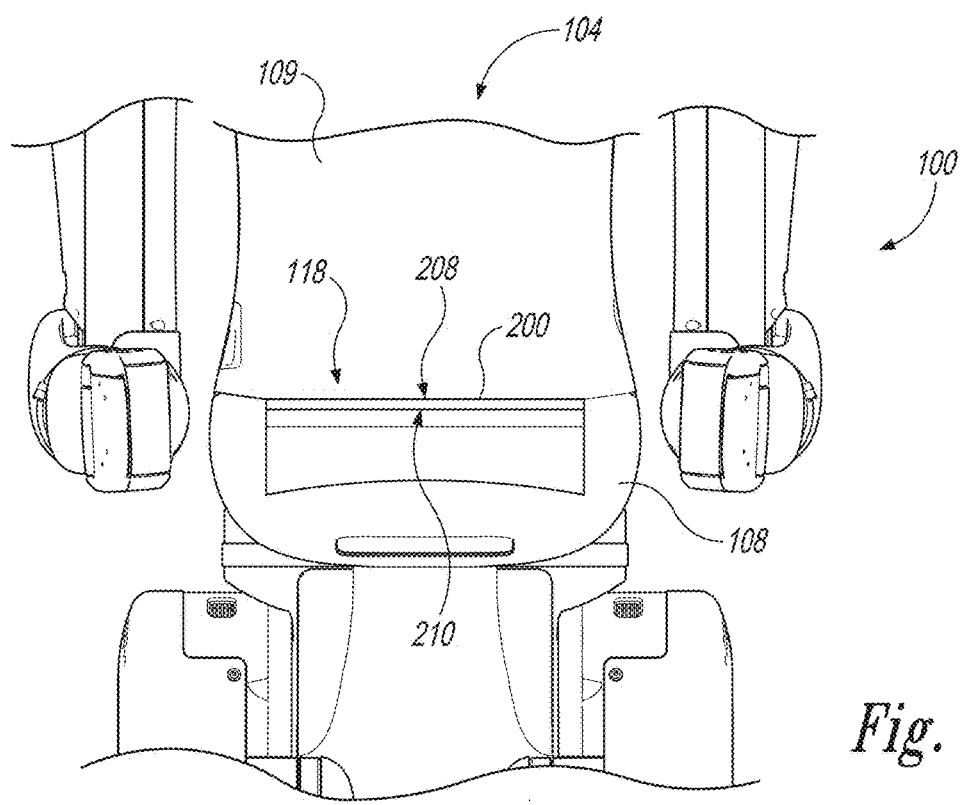
Figure 37:
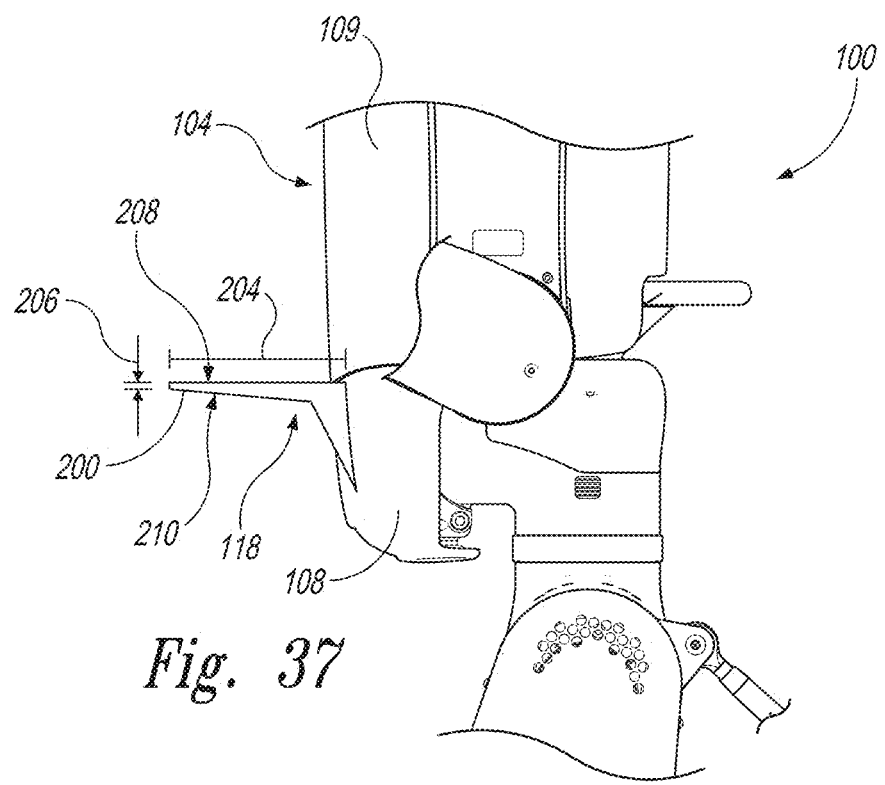
Figure 38:
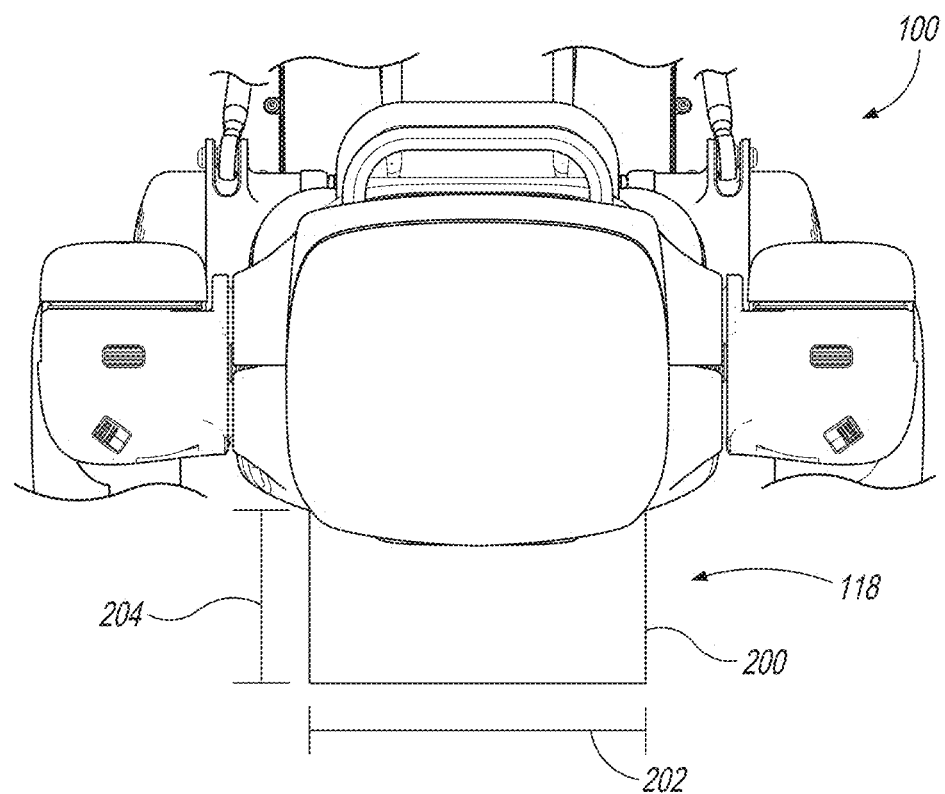

FIG. 34 is a block diagram illustrating an electrical and computer system 177 of the robot 100. When suitable, operations described elsewhere in this disclosure (e.g., movements of the robot 100) can be implemented via this electrical and computer system 177 autonomously and/or in response to instructions from a user. As shown in FIG. 34, the electrical and computer system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the electrical and computer system 177.

The electrical and computer system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The electrical and computer system 177 can further include electromechanical components 185. The electromechanical components 185 can include the arm actuators 174 and the leg actuators 176 discussed above and/or other suitable components for implementing mechanical action within the robot 100. The electrical and computer system 177 can further include power components 186. The power components 186 can include a battery 187 and a charger 188. The battery 187 can be a lithium-ion battery, a lead-acid battery, or another suitable type. The charger 188 can include a connector (not shown) compatible with a power source (e.g., a wall outlet) and leads (also not shown) extending between the connector and the battery 187.

Finally, the electrical and computer system 177 can include sensor components 189 for capturing, providing, and/or analyzing information about the robot 100 itself and/or the environment in which the robot 100 is operating. The sensor components 189 can include the sensor arrays 117 discussed above. At the sensor arrays 117 or at one or more other suitable locations, the robot 100 can include among the sensor components 189 a light sensor (e.g., a photoresistor), a sound sensor (e.g., a microphone), an accelerometer, a gyroscope, a tilt sensor, a location sensor (e.g., using the Global Positioning System), a distance sensor, a contact sensor, and/or a proximity sensor, among other examples. The robot 100 can include one or more sensors in a sensor system, such as a vision system, a light detection and ranging (LIDAR) system, a sound navigation and ranging (SONAR) system, etc. In at least some cases, the robot 100 monitors itself and/or its environment in real-time or in near real-time. Moreover, the robot 100 may use acquired sensor data as a basis for decision-making via the computing components 178.

Components of the electrical and computer system 177 can be connected to one another and/or to other components of the robot 100 via suitable conductors, transmitters, receivers, circuitry, etc. While the electrical and computer system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the electrical and computer system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python. The functionality of the program modules may be combined or distributed in various embodiments, including cloud-based implementations, web applications, mobile applications for mobile devices, etc.

Furthermore certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a Local Area Network (LAN), Wide Area Network (WAN), or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave, etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques. Additionally, elements of the robot 100 may be distributed rather than located in a single monolithic entity. Accordingly, the disclosed systems and techniques may operate in one or more examples other than the examples provided above.

Support Protrusions

FIGS. 35-38 are a partial perspective view, a partial front profile view, a partial side profile view, and a partial top plan view, respectively, of the robot 100. In particular, FIGS. 35-38 show a portion of the robot 100 around the protrusion 118. With reference to FIGS. 1-38 together, the protrusion 118 can be connected to the torso 104 via the inferior portion 108 of the torso 104. In at least some cases, it is useful for the protrusion 118 to have a relatively inferior position. This can be the case, for example, when the protrusion 118 is configured to contact a bottom surface of an object while the superior portion 106 of the torso 104 and/or the intermediate portion 109 of the torso 104 contact a rear surface of the object. In these and other cases, a maximum distance between the protrusion 118 and a superiormost portion of the torso 104 can be greater than (e.g., at least 50% greater than) a maximum distance between the protrusion 118 and an inferiormost portion of the torso 104.

The protrusion 118 can include a shelf 200 extending anteriorly from the torso 104. The shelf 200 can define a shelf width 202 perpendicular to the midsagittal plane 102, a shelf depth 204 parallel to the midsagittal plane 102 and perpendicular to the shelf width 202, and a shelf thickness 206 perpendicular to the shelf width 202 and perpendicular to the shelf depth 204. The shelf 200 can include a superior major surface 208 and an inferior major surface 210 opposite to one another and spaced apart from one another along the shelf thickness 206. The robot 100 can be configured to support an object at least partially via an interface between the object and the superior major surface 208 of the shelf 200 while the robot 100 ambulates via the legs 120a, 120b. In at least some cases, the midsagittal plane 102 extends through the protrusion 118. For example, the protrusion 118 can be substantially symmetrical about the midsagittal plane 102. In these and other cases, it can be useful for the protrusion 118 to have a relatively central position relative to the torso 104. This can be useful, for example, to reduce or prevent the object from tipping laterally unintentionally. The shape and size of the protrusion 118 can be selected to distribute force from a supported object over a relatively large area without unduly obstructing movement of other portions of the robot 100. The shelf width 202 can be greater than the shelf depth 204, such as at least 25% or at least 50% greater. For greater resistance to vertical loads or for other reasons, the shelf thickness 206 can decrease distally.

Figure 39:
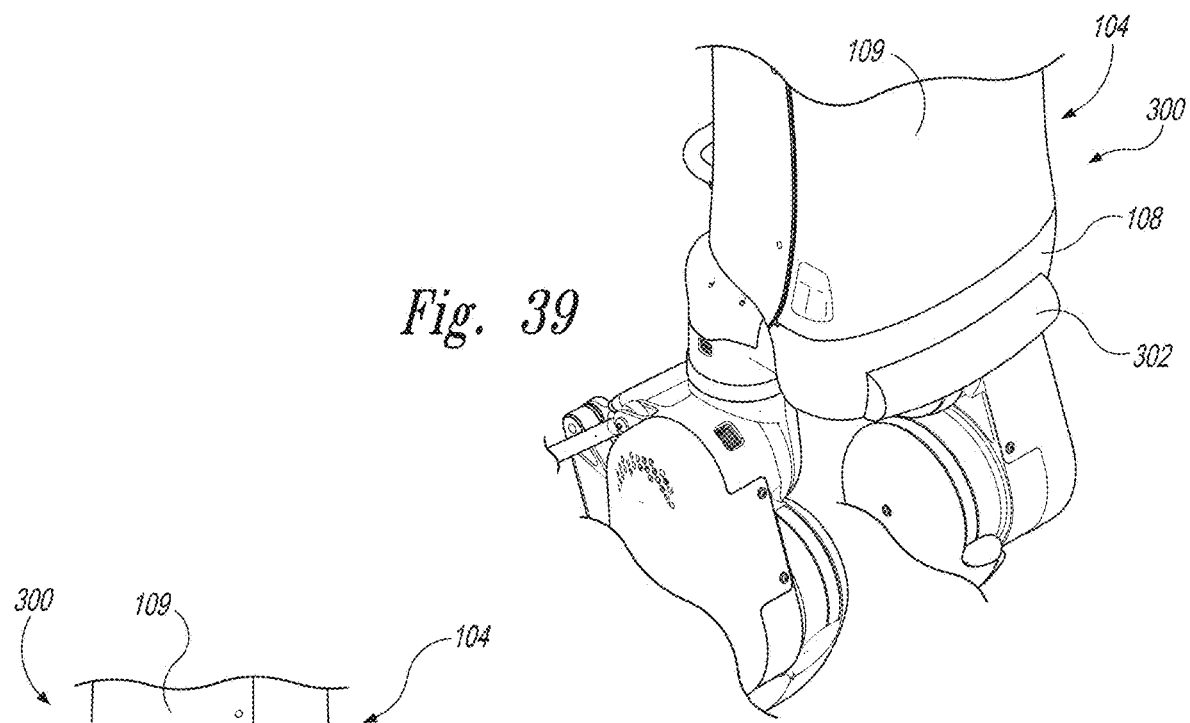
FIG. 39 is a partial perspective view of a robot in accordance with at least some embodiments of the present technology.

FIG. 39 is a partial perspective view of a robot 300 in accordance with at least some embodiments of the present technology. The robot 300 can include a protrusion 302 different than the protrusion 118 of the robot 100. The protrusion 302 can have an anterior major surface 304 that is elongate in a direction perpendicular to the midsagittal plane 102 (FIG. 3) and is curved about an axis perpendicular to the midsagittal plane 102. For example, the protrusion 302 can have the form of a semicylinder extending laterally along at least 40% (e.g., at least 60%) of a total width of the inferior portion 108 of the torso 104. The protrusion 302 can define a convex anterior profile at the midsagittal plane 102. The shape, position, and/or other other features of the protrusion 302 can be useful to guide an object toward a desirable position relative to the torso 104 even when the object approaches the torso out of alignment with this position. In addition or alternatively, the shape, position, and/or other features of the protrusion 302 can be selected to enhance impact protection for the robot 300. For example, when the robot 300 falls forward or impacts a wall or other obstruction, the protrusion 302 can help to protect more delicate features of the robot 300, such as sensors at the inferior portion 108 of the torso 104.

Figure 40:
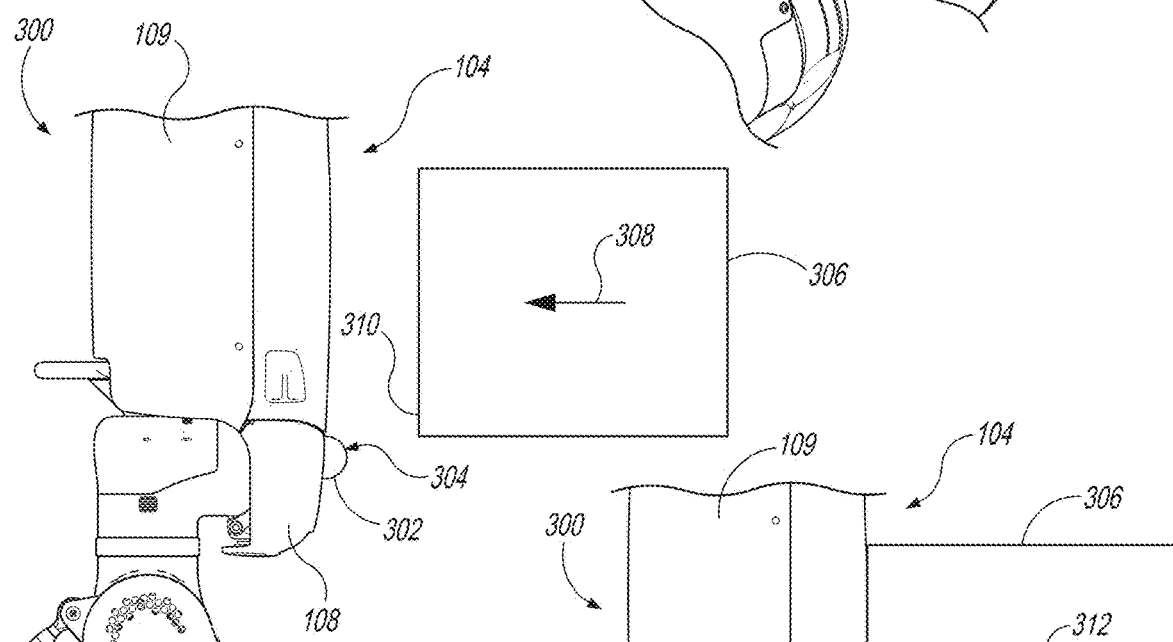
FIGS. 40 and 41 are partial side profile views of the robot shown in FIG. 39 and a box-shaped object at different respective times during an object-manipulating method in accordance with at least some embodiments of the present technology.
Figure 41:
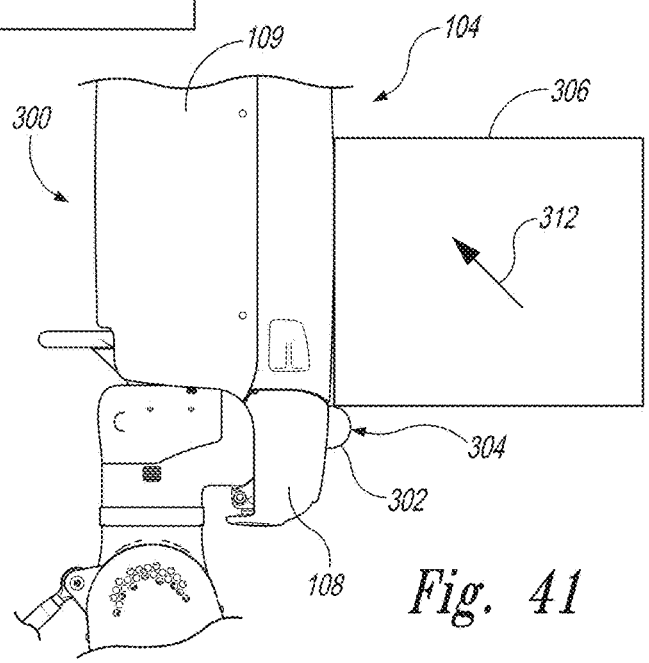

FIGS. 40 and 41 are partial side profile views showing the robot 300 and a box-shaped object 306 at different respective times during an object-manipulating method in accordance with at least some embodiments of the present technology. As shown in FIG. 40, the method can include moving the box-shaped object 306 toward the torso 104 in the direction of arrow 308. This can be done via the arms 119a, 119b, for example, which are not shown in FIGS. 40 and 41 for clarity of illustration. By its shape and/or in another way, the protrusion 302 can be configured to deflect the box-shaped object 306 superiorly relative to the torso 104 during this movement. For example, the box-shaped object 306 can include a rear lower corner 310 that contacts the protrusion 302 and redirects force moving the box-shaped object 306 toward the torso 104 to be in the direction of the arrow 312. In these and other cases, the protrusion 302 can be low friction to facilitate smooth sliding contact with the box-shaped object 306. For example, the protrusion 302 can include a low friction material (e.g., metal) at the anterior major surface 304. Alternatively, the protrusion 302 can be high friction. This can be useful, for example, when guiding the box-shaped object 306 to a desirable position relative to the torso 104 is less important than reducing or preventing unintentional displacement of the box-shaped object 306 from that position. In these and other cases, the protrusion 302 can include a high friction material (e.g., rubber) at the anterior major surface 304.

In the embodiments illustrated in FIGS. 1-41, the protrusions 118, 302 are fixed to the torsos 104 of the robots 100, 300. In other embodiments, counterparts of the protrusions 118, 302 can be movable relative to the associated torsos 104. FIGS. 42-54 illustrate several examples of movable protrusions. As discussed below, robots in accordance with at least some embodiments of the present technology include protrusions movable to dispense objects, to reposition objects (e.g., to make room for additional objects), to facilitate object retrieval (e.g., by moving closer to the objects), and/or for one or more other purposes. Examples of dispensing an object include dropping or placing an object onto a conveyor, into a bin, onto a shelving unit, onto the ground, etc. In these and other contexts, a robot in accordance with at least embodiments of the present technology can be configured to dispense one object via a movable protrusion while retaining another object via contact between the object and one or more arms of the robot.

Figure 42:
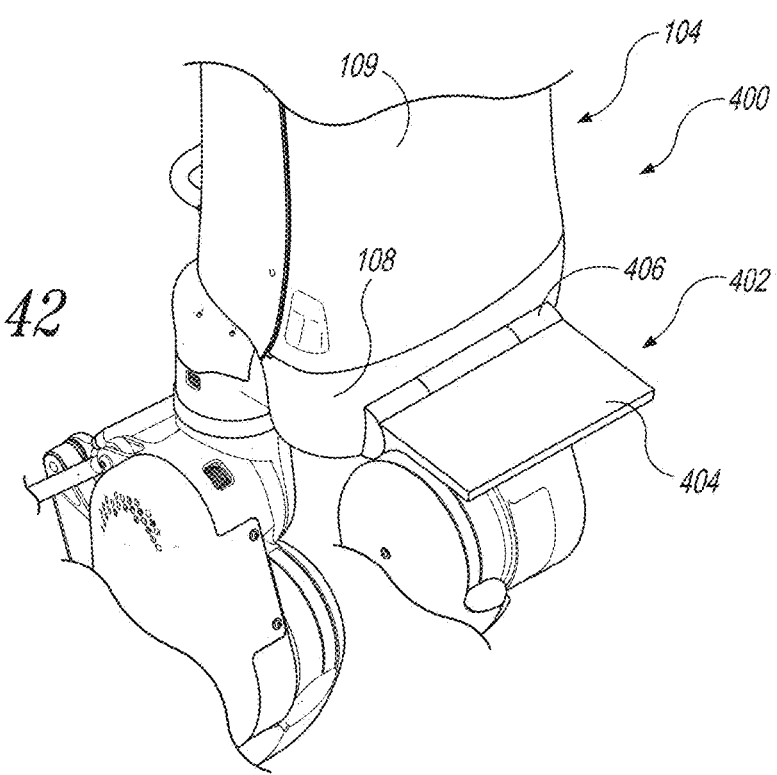
FIG. 42 is a partial perspective view of a robot in accordance with at least some embodiments of the present technology.
Figure 43:
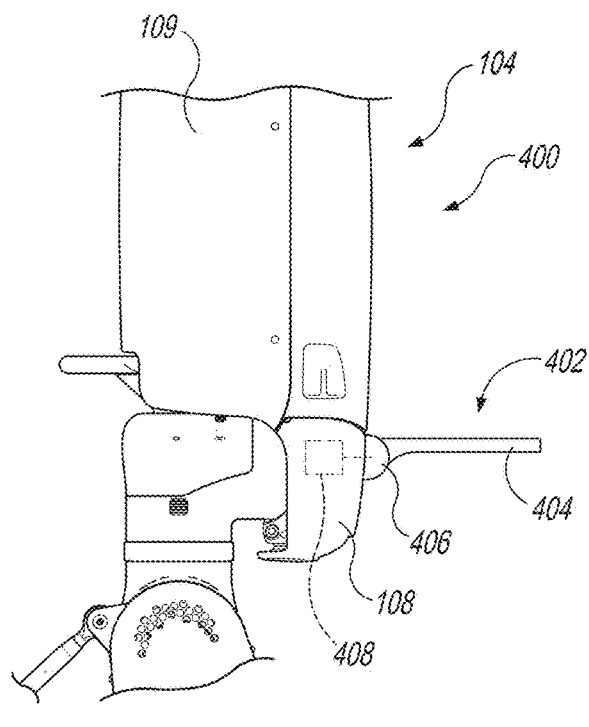
FIGS. 43 and 44 are partial side profile views of the robot shown in FIG. 42 with a protrusion of the robot in different respective states.
Figure 44:
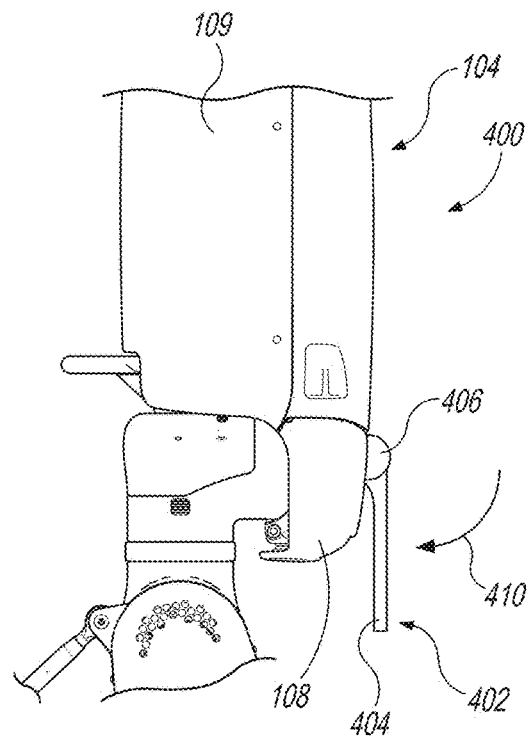

FIG. 42 is a partial perspective view of a robot 400 in accordance with at least some embodiments of the present technology. The robot 400 can include a protrusion 402 having a shelf 404. FIGS. 43 and 44 are partial side profile views of the robot 400 with the protrusion 402 in different respective states. With reference to FIGS. 42-44, the robot 400 can further include a joint 406 through which the shelf 404 is connected to the torso 104. The protrusion 402 can be configured to rotate relative to the torso 104 via the joint 406, such as about an axis within 10 degrees of perpendicular to (e.g., within 5 degrees of perpendicular to and/or substantially perpendicular to) the midsagittal plane 102. By this rotation or in another suitable manner, the protrusion 402 can be configured to move relative to the torso 104 to at least partially cause an object to move downward relative to the torso 104 in response to gravity. For example, when the protrusion 402 is in the state shown in FIG. 43, the shelf 404 can be well positioned to support an object. The robot 400 can include an actuator 408 (shown schematically) operably connected to the joint 406. Actuating the joint 406 via the actuator 408 can cause the protrusion 402 to rotate in the direction of arrow 410 thereby reducing support for the object via the shelf 404. When sufficiently reduced, the object can fall downward relative to the torso 104.

Figure 45:
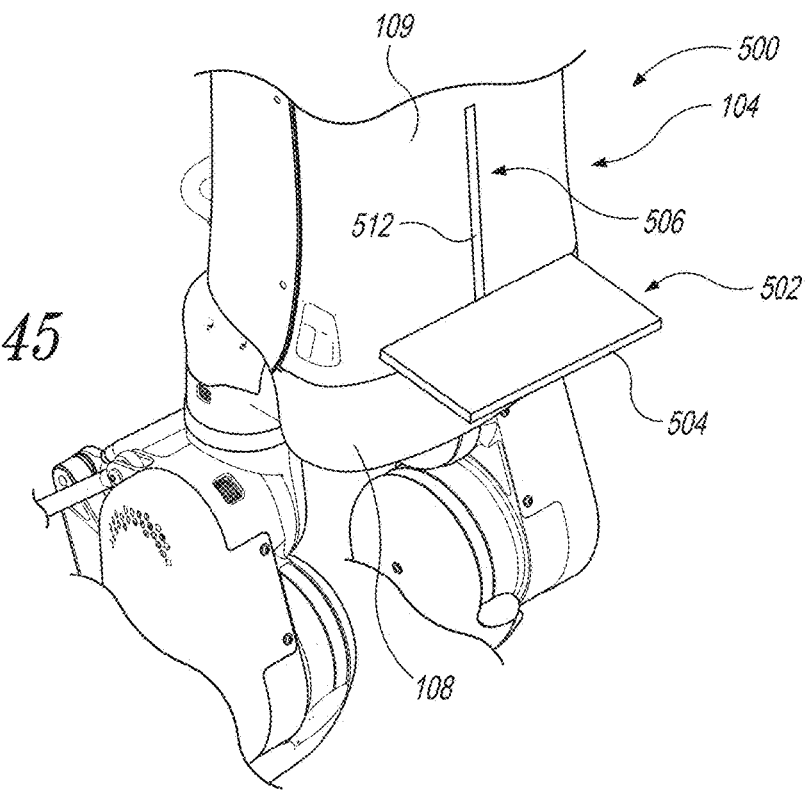
FIG. 45 is a partial perspective view of a robot in accordance with at least some embodiments of the present technology.
Figure 46:
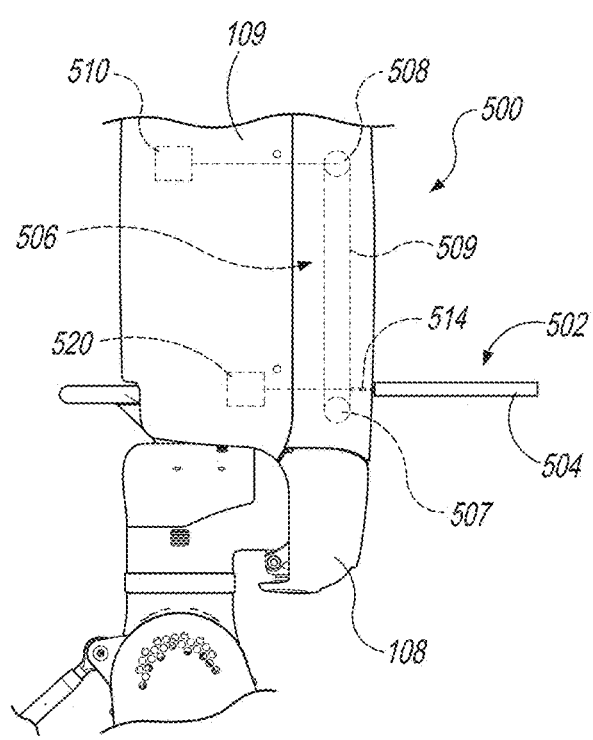
FIGS. 46 and 47 are partial side profile views of the robot shown in FIG. 45 with a protrusion of the robot in different respective states.
Figure 47:
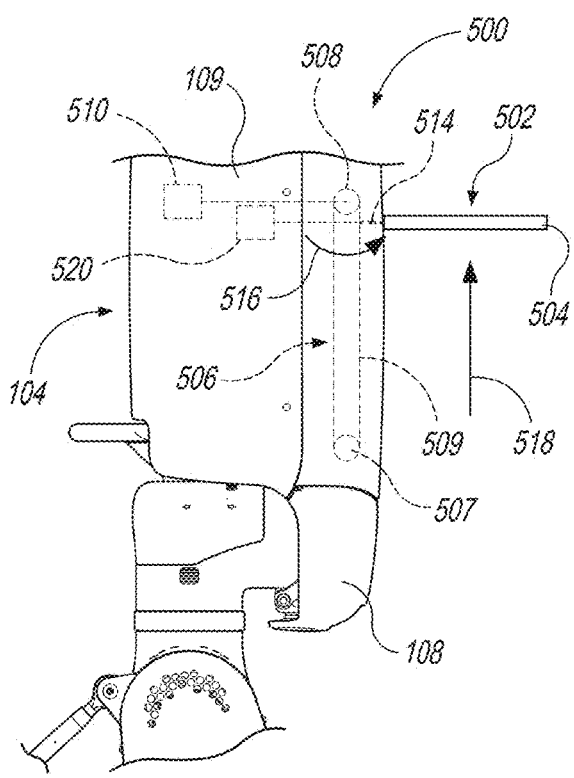

FIG. 45 is a partial perspective view of a robot 500 in accordance with at least some embodiments of the present technology. Similar to the robot 400, the robot 500 can include a protrusion 502 having a shelf 504. FIGS. 46 and 47 are partial side profile views of the robot 500 with the protrusion 502 in different respective states. With reference to FIGS. 45-47, the robot 500 can further include a track 506 through which the shelf 504 is connected to the torso 104. The protrusion 502 can be configured to move superiorly and inferiorly relative to the torso 104 via the track 506. In this or another suitable manner, the protrusion 502 can be configured to move an object superiorly and inferiorly relative to the torso 104 while the robot 500 supports a weight of the object via the protrusion 502. This can be useful to facilitate dispensing an object via the arms 119a, 119b. For example, the protrusion 502 can move an object into alignment with an empty space within a shelving unit and the arms 119a, 119b can then push the object directly from the protrusion 502 into that space. This can be faster, more efficient, and/or have other advantages over moving the object from the protrusion 502 without first moving the protrusion 502 to stage the object.

The track 506 can include two rollers 507, 508 and a chain 509 extending around the rollers 507, 508. The robot 500 can include an actuator 510 (shown schematically) operably connected to the roller 508 to actuate movement of the chain 509. The torso 104 can include a slot 512 aligned with the chain 509. The protrusion 502 can include a pin 514 extending through the slot 512. The shelf 504 can be connected to the chain 509 via the pin 514. As shown in FIGS. 46 and 47, operating the actuator 510 to rotate the chain 509 around the rollers 507, 508 in the direction of arrow 516 can cause the shelf 504 to move superiorly relative to the torso 104 in the direction of arrow 518. In at least some cases, the protrusion 502 is configured to rotate relative to the torso 104 in addition to moving superiorly and inferiorly relative to the torso 104. For example, the robot 500 can include an actuator 520 (shown schematically) operably connected to the pin 514. Rotating the pin 514 via the actuator 520 can cause the protrusion 502 to rotate relative to the torso 104 as further described below.

Figure 48:
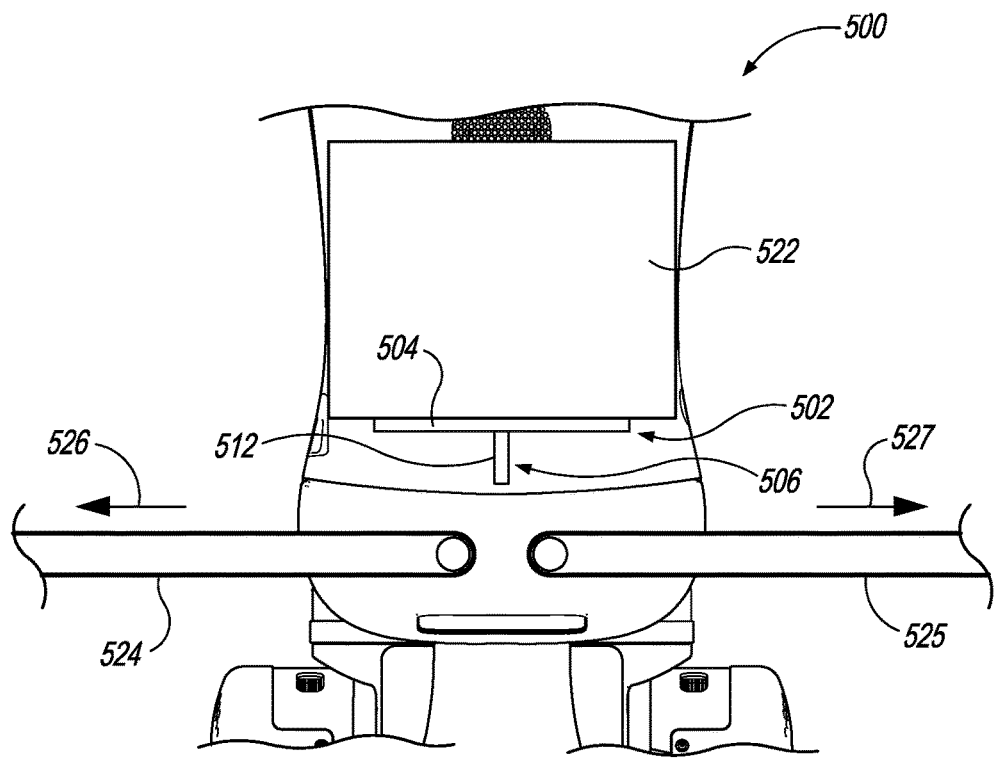
FIGS. 48 and 49 are partial front profile views of the robot shown in FIG. 45 and associated structures at different respective times during an object-manipulating method in accordance with at least some embodiments of the present technology.
Figure 49:
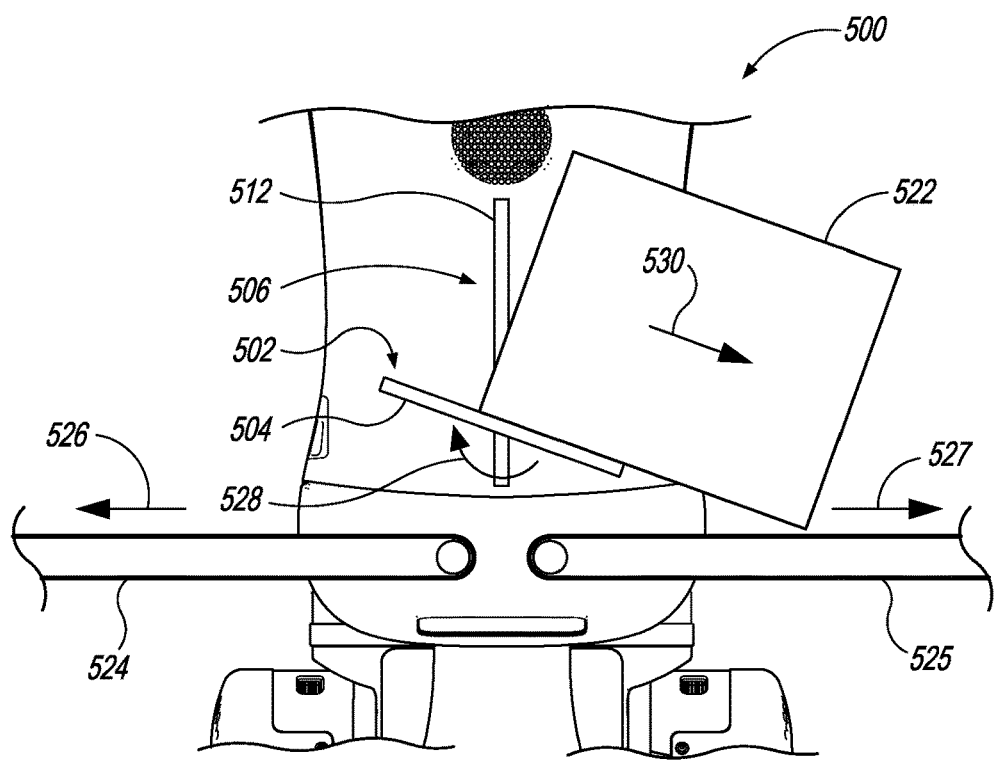

FIGS. 48 and 49 are partial front profile views of the robot 500 and associated structures at different respective times during an object-manipulating method in accordance with at least some embodiments of the present technology. The protrusion 502 can be configured to move relative to the torso 104 to at least partially cause an object 522 to move laterally relative to the torso 104 in response to gravity. This can be useful, for example, to alternately dispense the object 522 onto one of two conveyors 524, 525 moving in different respective directions indicated by arrows 526, 527. As shown in FIGS. 48 and 49, the protrusion 502 can be configured to rotate in the direction of arrow 528 about an axis within 10 degrees of parallel to (e.g., within 5 degrees of parallel to and/or substantially parallel to) the midsagittal plane 102. By this rotation or in another suitable manner, the protrusion 502 can be configured to at least partially cause the object 522 to move in the direction of arrow 530 thereby reducing support for the object 522 via the shelf 504. When the support is sufficiently reduced, the object 522 can fall laterally and downward relative to the torso 104 onto one of the conveyors 524, 525. The robot 500 can be configured to control a direction in which the protrusion 502 rotates relative to the torso 104 to control a lateral direction in which the object 522 is dispensed.

Figure 50:
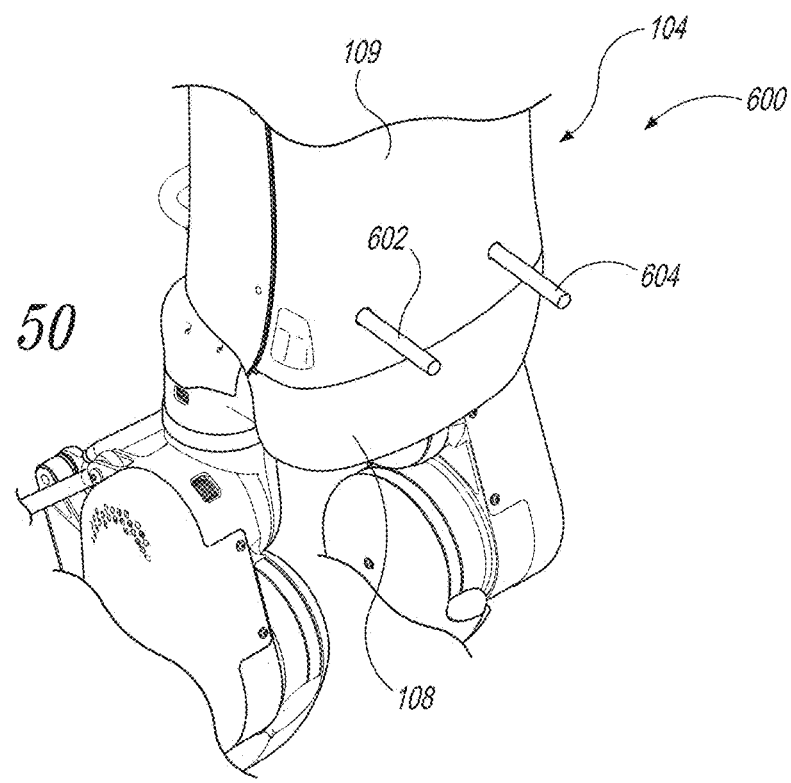
FIG. 50 is a partial perspective view of a robot in accordance with at least some embodiments of the present technology.
Figure 51:
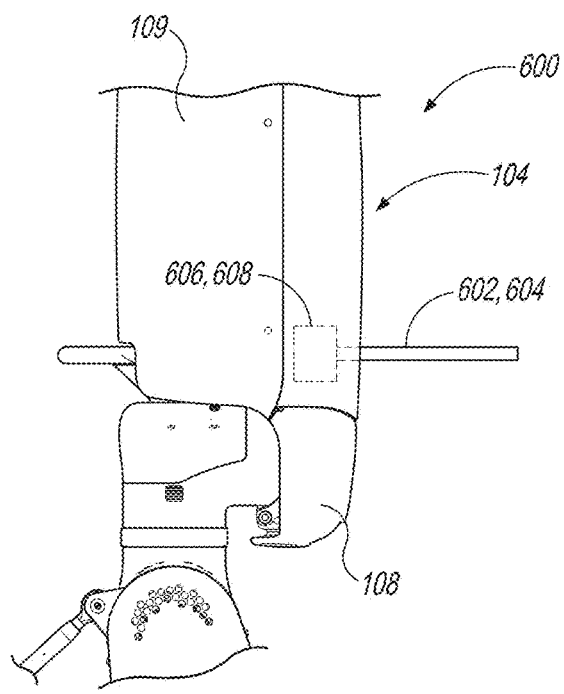
FIGS. 51 and 52 are partial side profile views of the robot shown in FIG. 50 with protrusions of the robot in different respective states.
Figure 52:
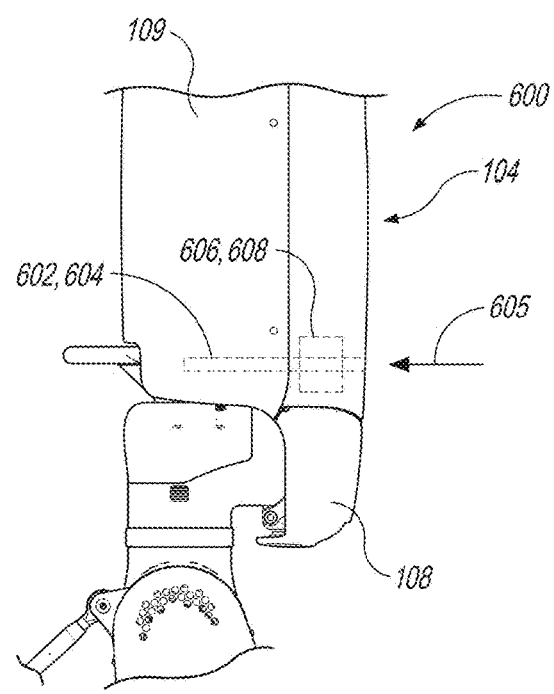

FIG. 50 is a partial perspective view of a robot 600 in accordance with at least some embodiments of the present technology. Rather than a single protrusion, the robot 600 can include a first protrusion 602 and a second protrusion 604 laterally spaced apart from one another and extending anteriorly from the torso 104. FIGS. 51 and 52 are partial side profile views of the robot 600 with the first and second protrusions 602, 604 in different respective states. As shown in FIGS. 51 and 52, the first and second protrusions 602, 604 can be configured to retract posteriorly at least partially into the torso 104 in the direction of arrow 605. The robot 600 can include actuators 606, 608 operably associated with the first and second protrusions 602, 604 configured to drive this retraction and corresponding extension of the first and second protrusions 602, 604.

Figure 53:
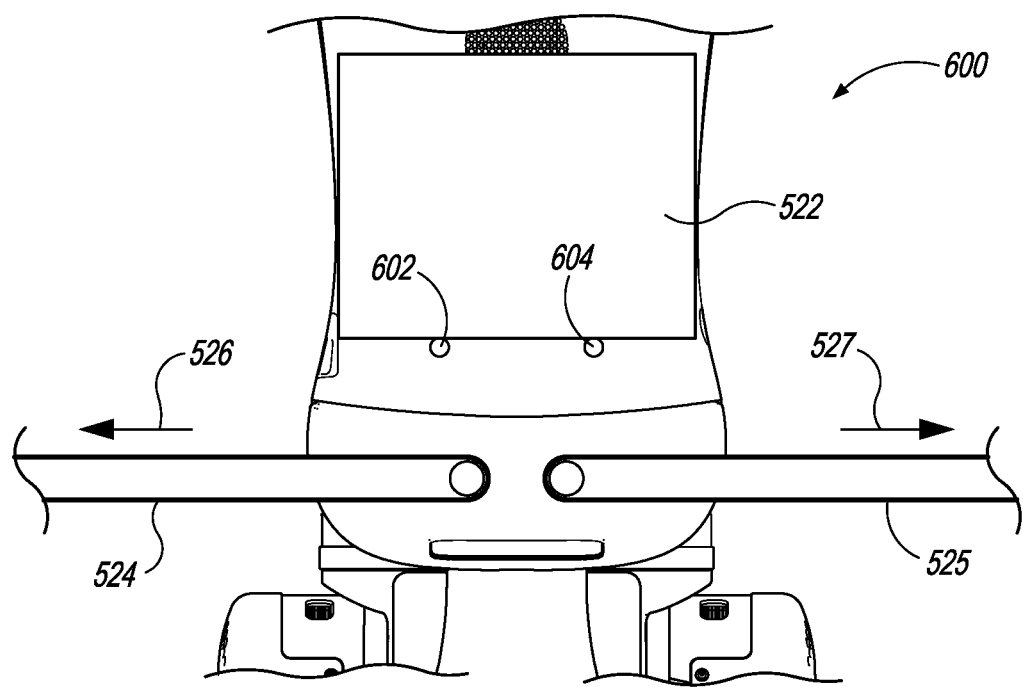
FIGS. 53 and 54 are partial front profile views of the robot shown in FIG. 50 and associated structures at different respective times during an object-manipulating method in accordance with at least some embodiments of the present technology.
Figure 54:
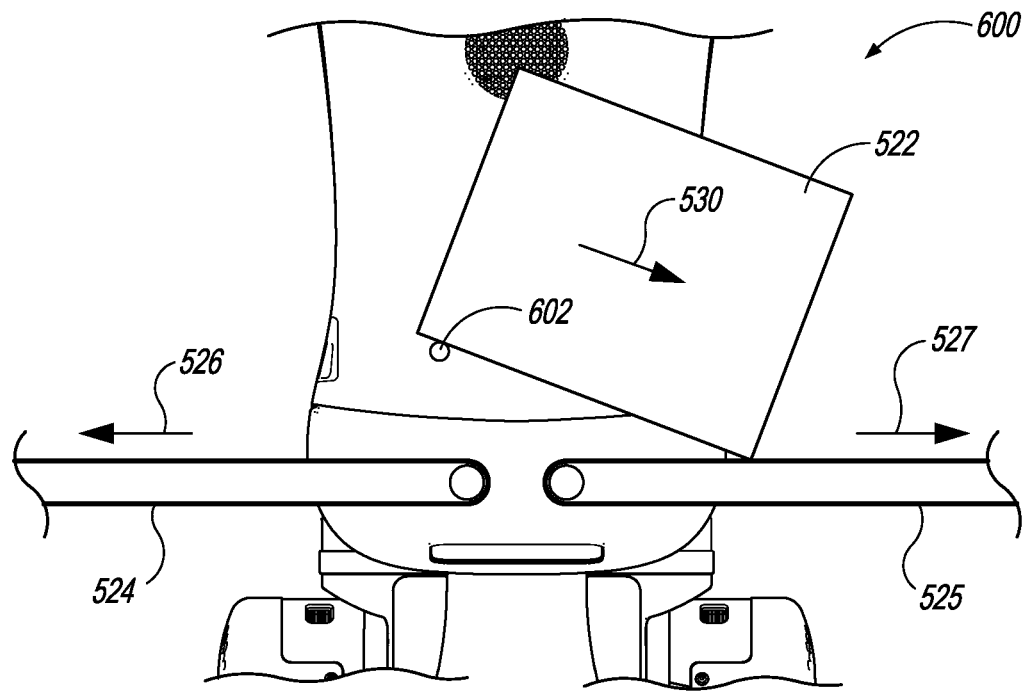

FIGS. 53 and 54 are partial front profile views of the robot 600, the object 522, and the conveyors 524, 525 at different respective times during an object-manipulating method in accordance with at least some embodiments of the present technology. By retracting together or in another suitable manner, the first and second protrusions 602, 604 can be configured to cause the object 522 to fall downward relative to the torso 104. Alternatively, as shown in FIGS. 53 and 54, by retracting asynchronously or on another suitable manner, the first and second protrusions 602, 604 can be configured to cause the object 522 to fall downward and laterally relative to the torso 104 (e.g., in the direction of arrow 530) onto one of the conveyors 524, 525. The robot 600 can be configured to control retraction of the first and second protrusions 602, 604 to control a direction in which the object 522 is dispensed.

Other examples of protrusions, joints, tracks, etc. and associated structures in accordance with various embodiments of the present technology are also possible. For example, a counterpart of the protrusion 502 can be without the rotational movement feature shown in FIGS. 48 and 49. In this example and in other cases, the actuator 510 can be omitted. As another example, a counterpart of the protrusion 502 can include the rotational movement feature shown in FIGS. 43 and 44 for the protrusion 402. In this example and in other cases, a counterpart of the pin 514 can be articulated and be operably associated with a counterpart of the actuator 408. In another example, counterparts of at least one of the first and second protrusions 602, 604 can be fixedly connected to the torso 104 rather than being at least partially retractable into the torso 104. In this example and in other cases, at least one of the actuators 606, 608 can be omitted. In another example, counterparts of at least one of the first and second protrusions 602, 604 can include the superior and inferior movement feature shown in FIGS. 46 and 47 for the protrusion 502. In this example and in other cases, counterparts of at least one of the first and second protrusions 602, 604 can be operably associated with counterparts of the track 506, the rollers 508, the chain 509, and the actuator 510. In yet another example, counterparts of at least one of the first and second protrusions 602, 604 can include the rotational movement feature shown in FIGS. 43 and 44 for the protrusion 402. In this example and in other cases, counterparts of the first and second protrusions 602, 604 can be articulated and be operably associated with counterparts of the actuator 408.

Carrying Poses

Figure 55:
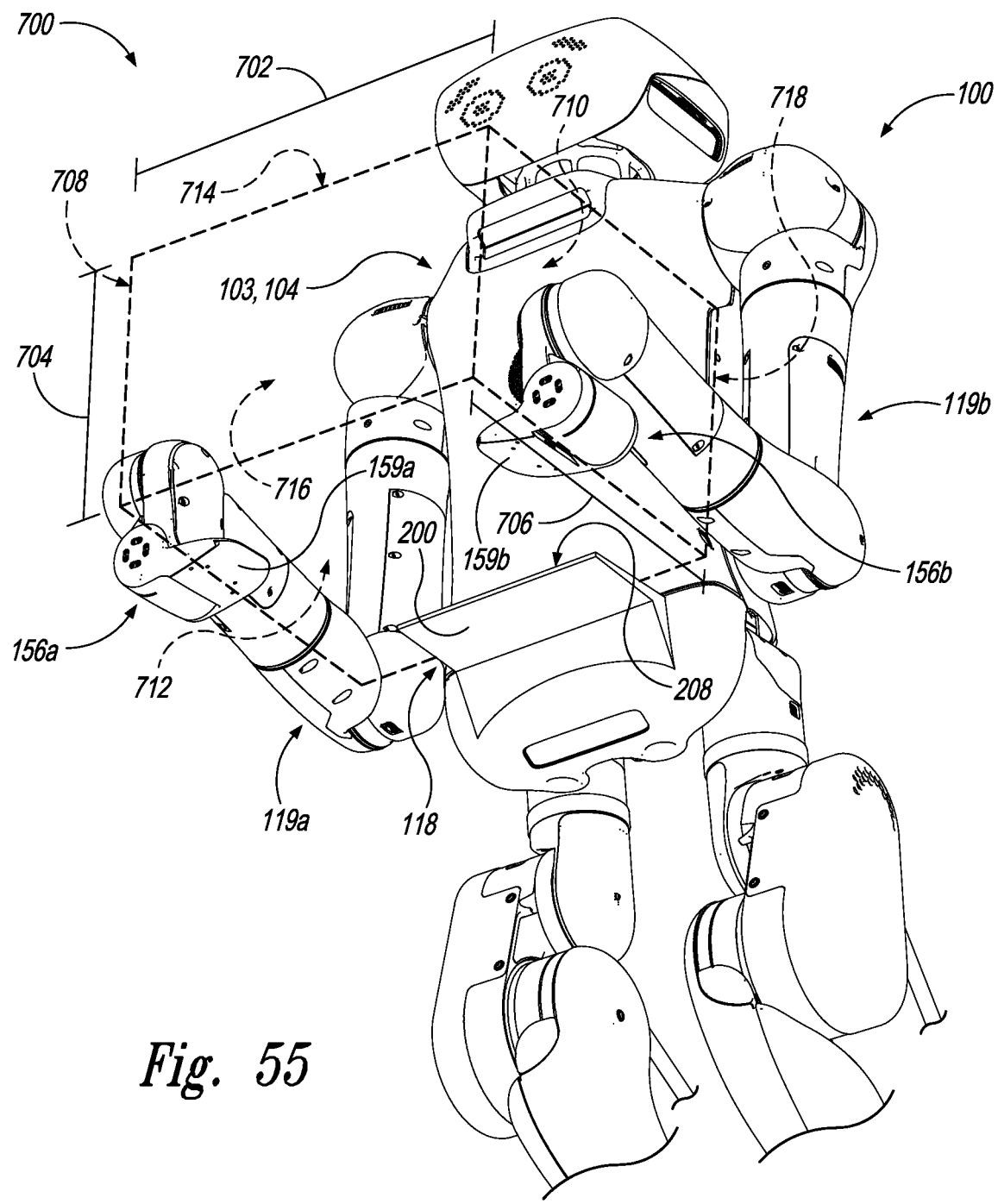
FIGS. 55-57 are partial perspective views of the robot shown in FIG. 1 and an object with the robot in different respective carrying poses.
Figure 56:
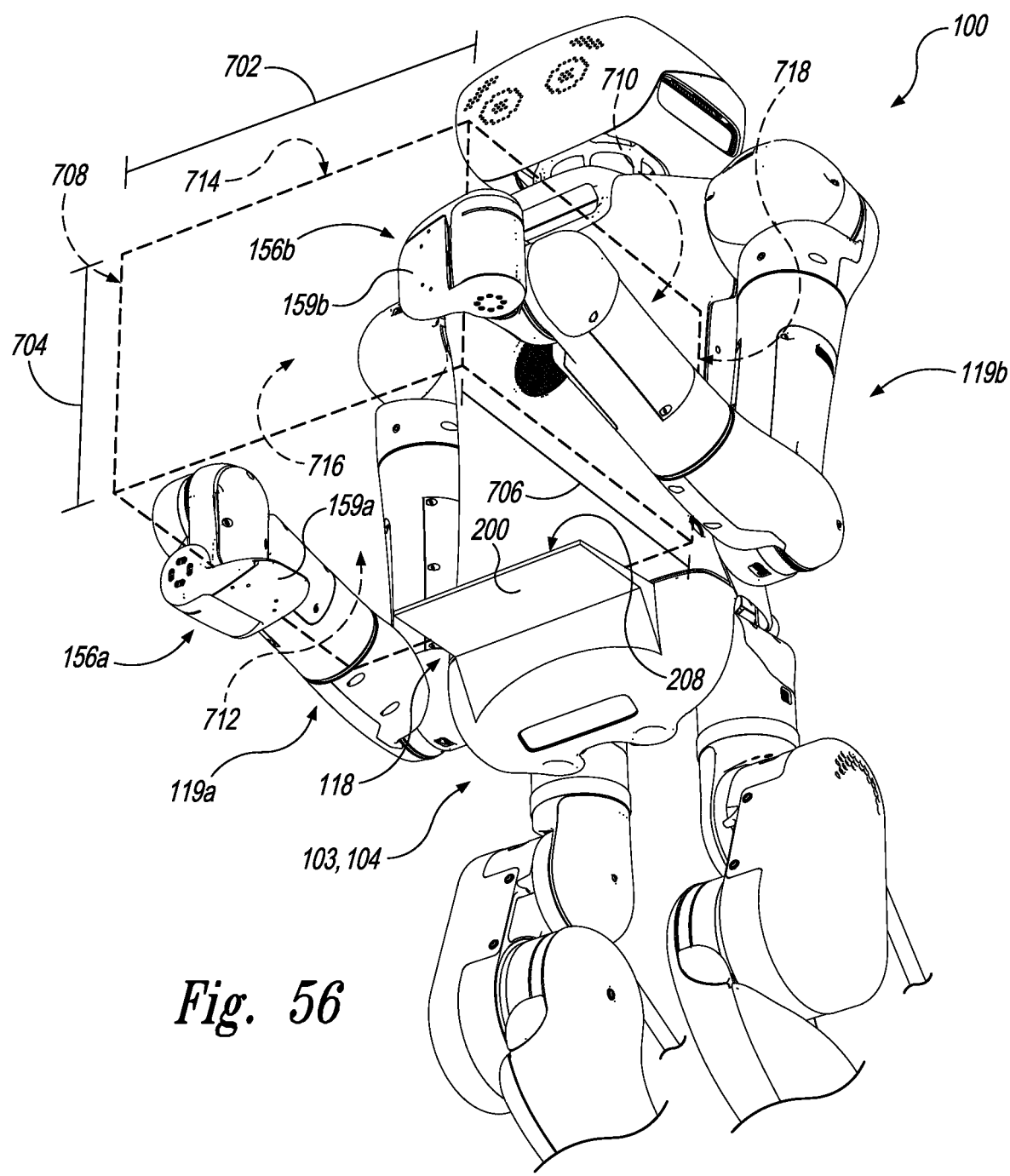
Figure 57:
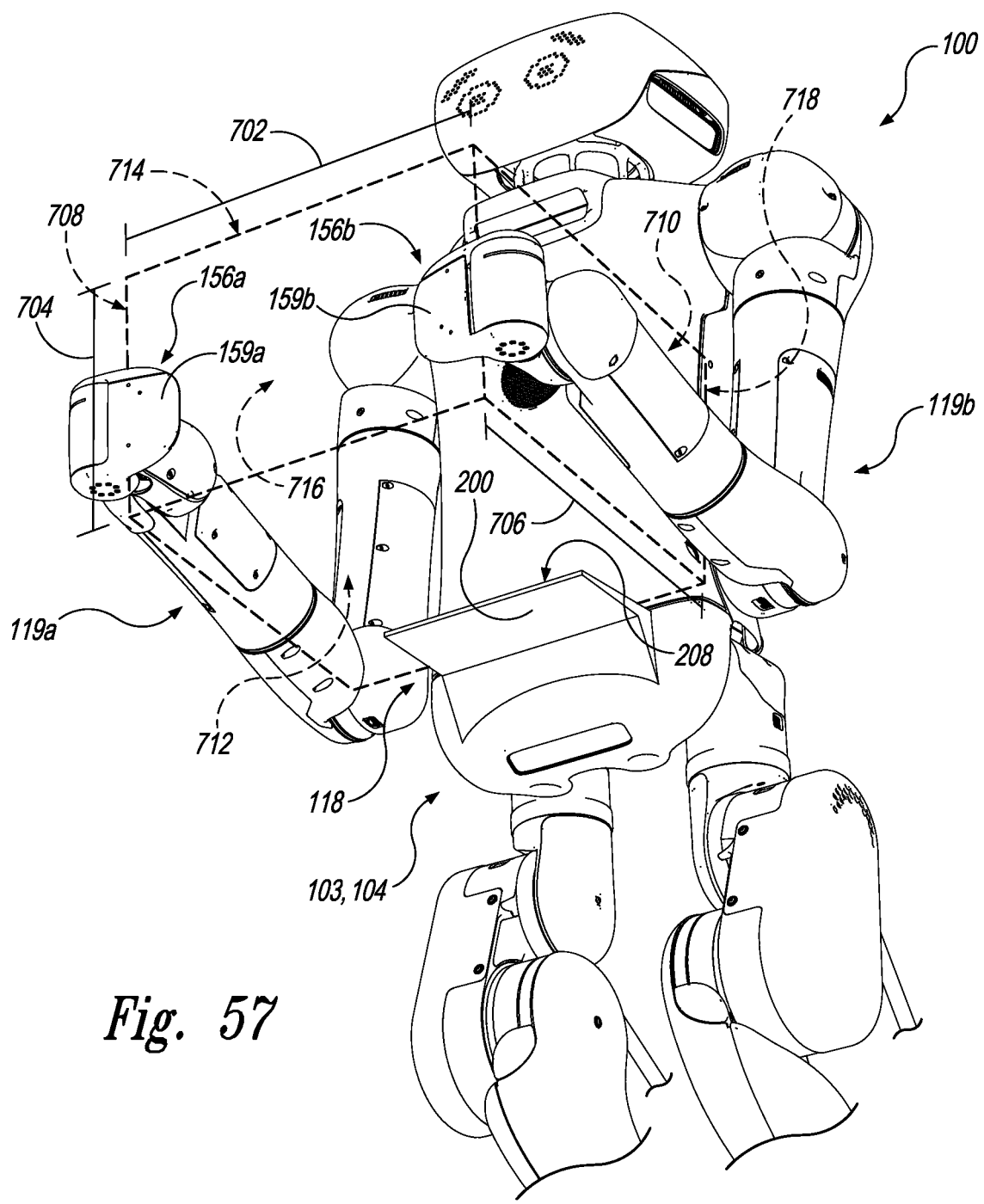

The protrusions 118, 302, 402, 502, 602, 604 and other features of the robots 100, 300, 400, 500, 600 discussed above with reference to FIGS. 1-54 can facilitate useful poses for carrying objects, such as box-shaped objects. In at least some cases, the robots 100, 300, 400, 500, 600 are configured to be in contact with an object simultaneously via respective interfaces between the object and at least one of the paddles 159a, 159b and between the object and the corresponding one or ones of the protrusions 118, 302, 402, 502, 602, 604. FIGS. 55-57 are partial perspective views of the robot 100 and an object 700 with the robot 100 in different respective carrying poses. The object 700 can define an object width 702, an object height 704, and an object depth 706 perpendicular to one another. The object 700 can have a first side surface 708 and a second side surface 710 opposite to one another and spaced apart from one another along the object width 702. The object 700 can have a bottom surface 712 and a top surface 714 opposite to one another and spaced apart from one another along the object height 704. Finally, the object 700 can have a front surface 716 and a rear surface 718 opposite to one another and spaced apart from one another along the object depth 706. It should be understood that the carrying poses shown in FIGS. 55-57 are merely examples. Numerous other carrying poses in accordance with at least some embodiments of the present technology are also possible.

As shown in FIG. 55, in a first example of a carrying pose, the end effectors 156a, 156b are in contact with the bottom surface 712 of the object 700 via the paddles 159a, 159b and the protrusion 118 is in contact with the bottom surface 712 of the object 700 via the superior major surface 208 of the shelf 200. In at least some cases, the paddles 159a, 159b contact a portion (e.g., a half) of the bottom surface 712 of the object 700 farther from the torso 104 whereas the protrusion 118 contacts a portion (e.g., a half) of the bottom surface 712 of the object 700 closer to the torso 104. In this or another way, a weight of the object 700 can be well distributed among the paddles 159a, 159b and the shelf 200. A potential advantage of the carrying pose shown in FIG. 55 is that it may cause the object 700 to be relatively well supported against unintentional downward displacement. A potential disadvantage of the carrying pose shown in FIG. 55 is that it may cause the object 700 to be relatively poorly supported against unintentional forward displacement. Another potential disadvantage of the carrying pose shown in FIG. 55 is that it may occupy the arms 119a, 119b for prolonged periods of time when the arms 119a, 119b could be more productively engaged in other useful tasks.

As shown in FIG. 56, in a second example of a carrying pose, the end effector 156a is in contact with the bottom surface 712 of the object 700 via the paddle 159a, the end effector 156b is in contact with the front surface 716 of the object 700 via the paddle 159b, the protrusion 118 is in contact with the bottom surface 712 of the object 700 via the superior major surface 208 of the shelf 200, and the torso 104 is in contact with the rear surface 718 of the object 700. A potential advantage of the carrying pose shown in FIG. 56 is that it may cause the object 700 to be relatively well supported against both unintentional forward displacement and unintentional downward displacement. A potential disadvantage of the carrying pose shown in FIG. 56 is that it may occupy the arm 119b for prolonged periods of time when the arm 119b could be more productively engaged in other useful tasks. In contrast, the arm 119a can be relatively free to engage in other useful tasks without unduly interfering with the stability of the object 700.

As shown in FIG. 57, in a third example of a carrying pose, the end effectors 156a, 156b are in contact with the front surface 716 of the object 700 via the paddles 159a, 159b, the protrusion 118 is in contact with the bottom surface 712 of the object 700 via the superior major surface 208 of the shelf 200, and the torso 104 is in contact with the rear surface 718 of the object 700. A potential advantage of the carrying pose shown in FIG. 57 is that it may cause the object 700 to be relatively well supported against both unintentional forward displacement and unintentional downward displacement. Another potential advantage of the carrying pose shown in FIG. 56 is that it may allow both of the arms 119a, 119b to be relatively free to engage in other useful tasks without unduly interfering with the stability of the object 700.

With reference to FIGS. 1-57 together, the robots 100, 300, 400, 500, 600 can be configured to support a weight of the object 700 at least partially via the corresponding one or more of the protrusions 118, 302, 402, 502, 602, 604 while ambulating via the legs 120a, 120b. This support can occur while the robots 100, 300, 400, 500, 600 are in one of the carrying poses shown in FIGS. 55-57 or another suitable carrying pose. Furthermore, the robots 100, 300, 400, 500, 600 can be configured to at least partially inhibit lateral displacement of the object 700 relative to the torso 104 via at least one of the arms 119a, 119b while supporting the weight of the object 700 at least partially via the corresponding one or more of the protrusions 118, 302, 402, 502, 602, 604 and while ambulating via the legs 120*a*, 120*b*. This support can likewise occur while the robots 100, 300, 400, 500, 600 are in one of the carrying poses shown in FIGS. 55-57 or another suitable carrying pose. Still further, the robots 100, 300, 400, 500, 600 can be configured to at least partially inhibit forward displacement of the object 700 relative to the torso 104 via contact between the object 700 and at least one of the paddles 159*a*, 159*b* while supporting the weight of the object 700 at least partially via the corresponding one or more of the protrusions 118, 302, 402, 502, 602, 604 and while ambulating via the legs 120*a*, 120*b*. This support can occur while the robots 100, 300, 400, 500, 600 are in one of the carrying poses shown in FIGS. 56 and 57 or another suitable carrying pose.

Robotically Moving Objects

FIGS. 58-73 are top plan views and corresponding side profile views of the robot 100 and associated structures at different respective times during a method for robotically moving a first object 800 and a second object 802 in accordance with at least some embodiments of the present technology. In the illustrated embodiment, the first and second objects 800, 802 are cardboard boxes. In other embodiments, counterparts of the first and second objects 800, 802 can have other suitable forms. For example, a counterpart of the first object 800, the second object 802, or both can be a box made of a material other than cardboard, a tote, a crate, a non-packaged hard good, an irregularly shaped object, etc. Furthermore, counterparts of the first and second objects 800, 802 can be the same or different in shape, material, size, weight, etc. in methods in accordance with at least some embodiments of the present technology.

With reference to FIGS. 58-73 together, the first object 800 can define a first object width 804, a first object height 806, and a first object depth 808 perpendicular to one another. The first object 800 can have a first side surface 810 and a second side surface 812 opposite to one another and spaced apart from one another along the first object width 804. The first object 800 can have a bottom surface 814 and a top surface 816 opposite to one another and spaced apart from one another along the first object height 806. Finally, the first object 800 can have a front surface 818 and a rear surface 820 opposite to one another and spaced apart from one another along the first object depth 808. The second object 802 can define a second object width 822, a second object height 824, and a second object depth 826 perpendicular to one another. The second object 802 can have a first side surface 828 and a second side surface 830 opposite to one another and spaced apart from one another along the second object width 822. The second object 802 can have a bottom surface 832 and a top surface 834 opposite to one another and spaced apart from one another along the second object height 824. Finally, the second object 802 can have a front surface 836 and a rear surface 838 opposite to one another and spaced apart from one another along the second object depth 826. For clarity of illustration, reference numbers of the surfaces and dimensions of the first and second objects 800, 802 are shown in FIGS. 58 and 59 only.

FIGS. 58-73 also show a shelving unit 840 that initially supports the first and second objects 800, 802 during the method. The shelving unit 840 can include an upper support surface 842 and a lower support surface 844. For simplicity, aspects of the method are described herein primarily in the context of the robot 100. It should be understood, however, that the method and other methods in accordance with at least some embodiments of the present technology can likewise be practiced, when suitable, with the robots 300, 400, 500, 600 and/or in other contexts. The method shown in FIGS. 58-73 can, among other things, be a method for using the robot 100 to retrieve the first and second objects 800, 802 from the shelving unit 840 and to carry the first and second objects 800, 802 away from the shelving unit 840. The robot 100 can be configured to move the first and second objects 800, 802 toward the torso 104 at least partially via contact between the first and second objects 800, 802 and at least one of the arms 119*a*, 119*b*. The protrusion 118 can be configured to at least partially support a weight of the first and second objects 800, 802 once retrieved in this or another manner. FIGS. 58-73 are further described below with occasional reference to features shown in FIGS. 1-57.

Figure 58:
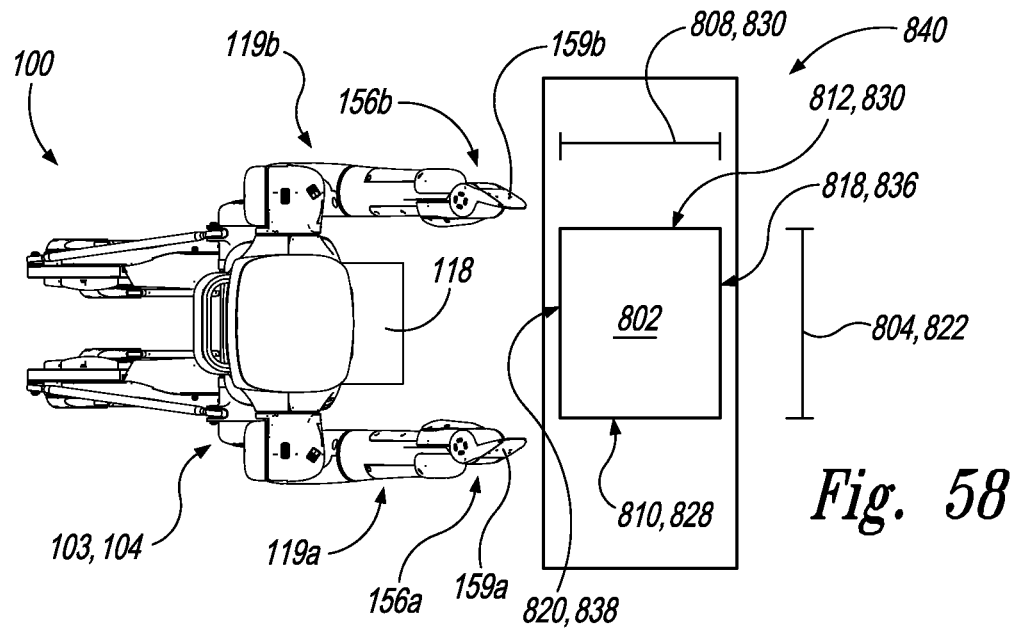
FIGS. 58-73 are top plan views and corresponding side profile views of the robot shown in FIG. 1 and associated structures at different respective times during a method for robotically moving multiple objects in accordance with at least some embodiments of the present technology.
Figure 59:
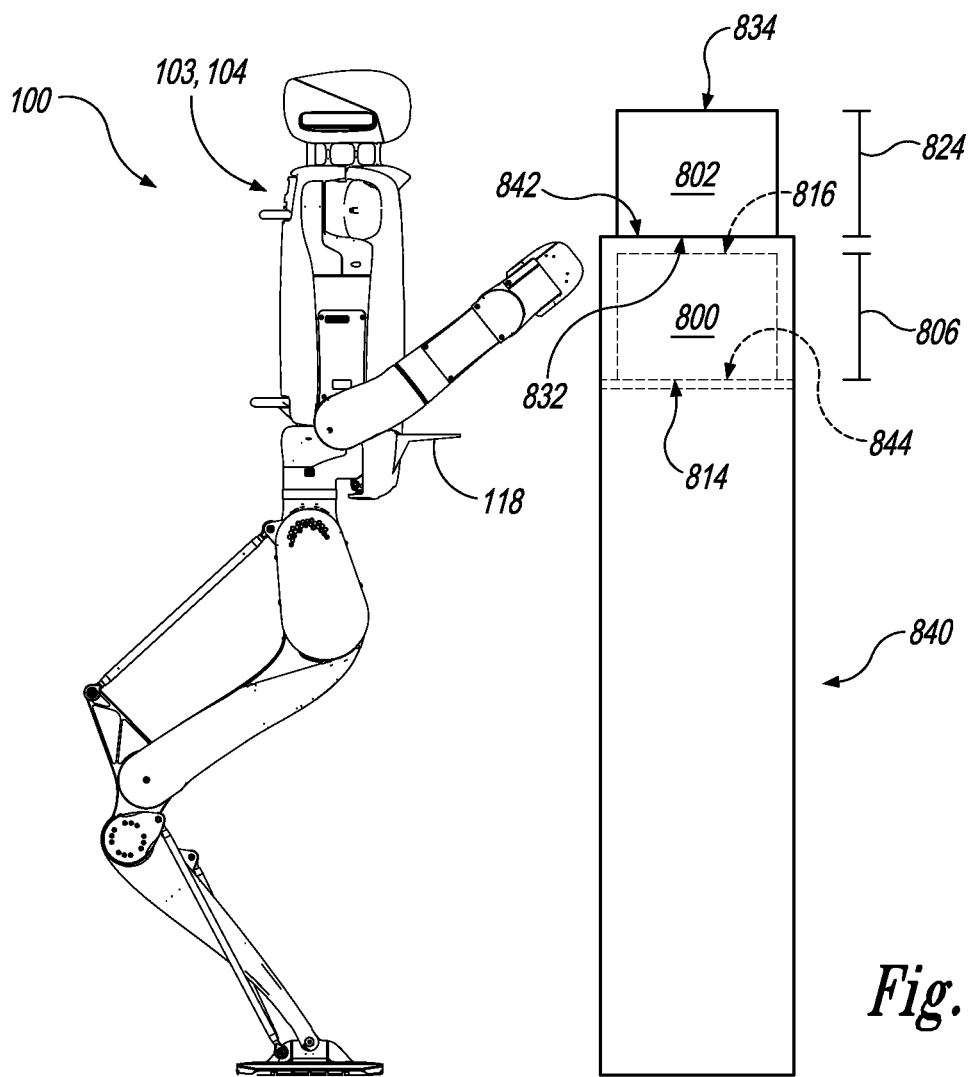
Figure 60:
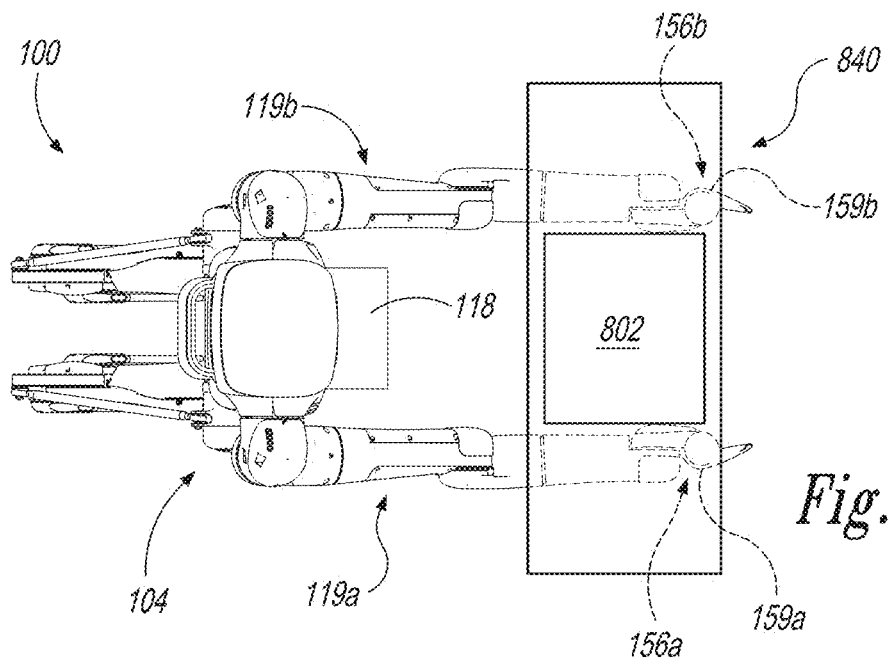
Figure 61:
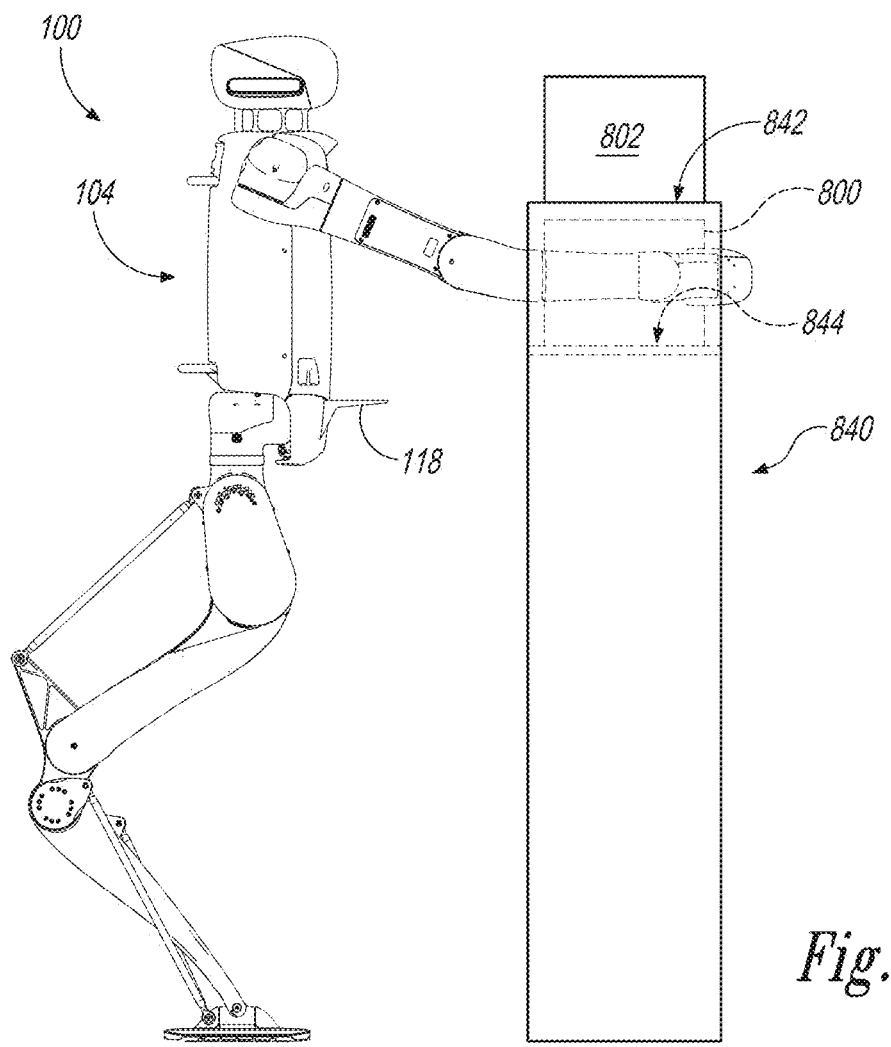
Figure 62:
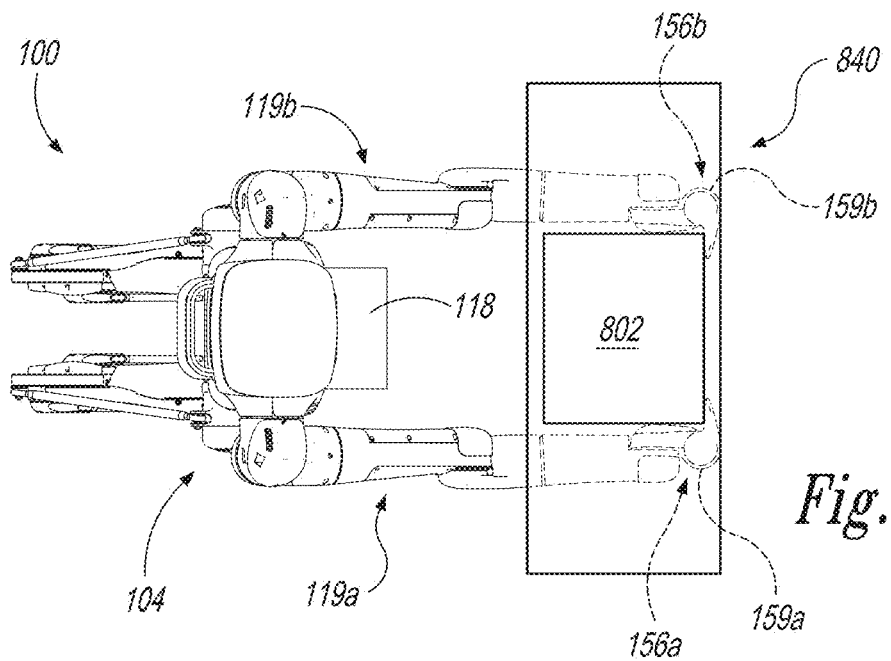
Figure 63:
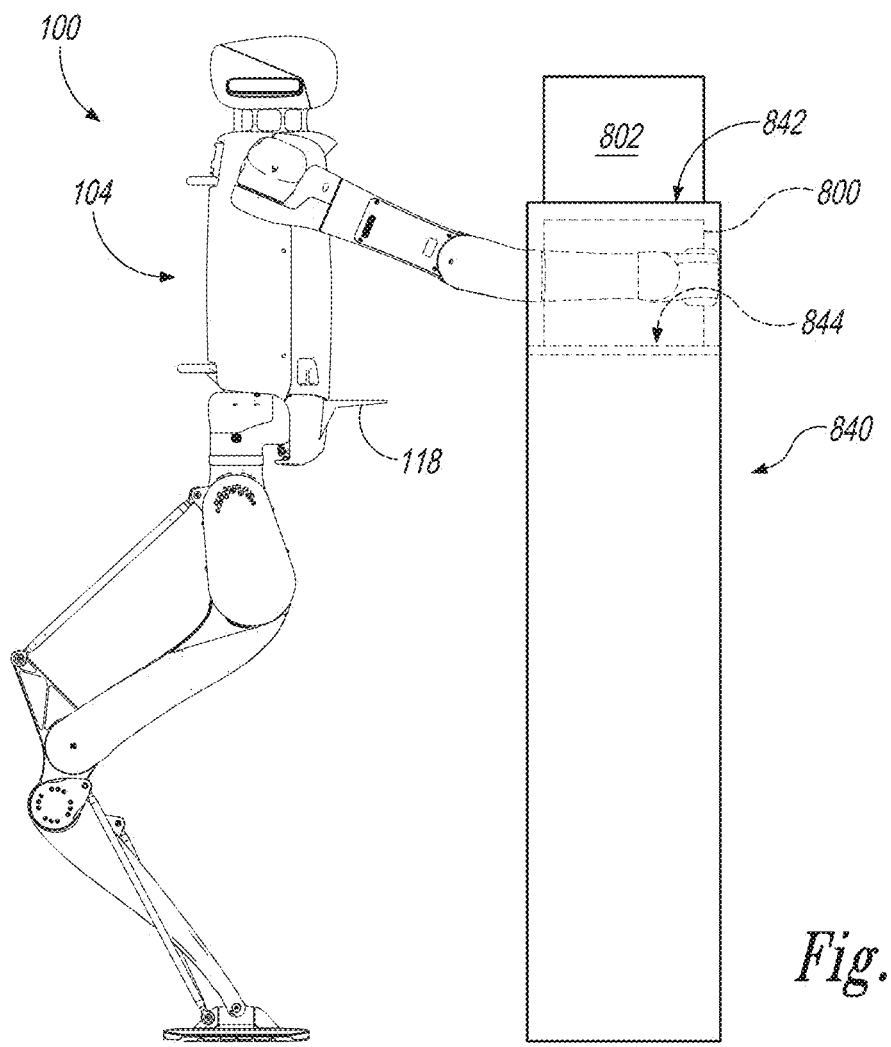
Figure 64:
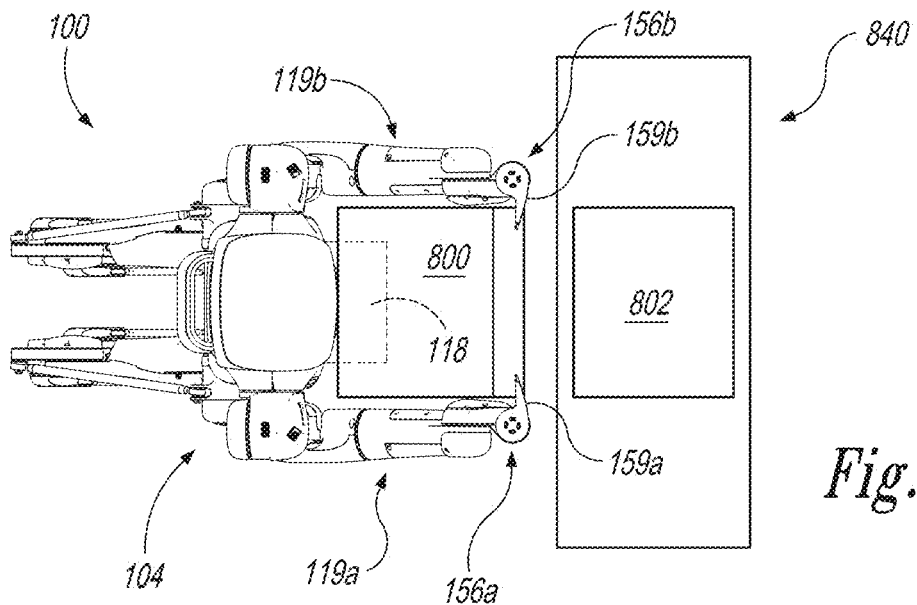
Figure 65:
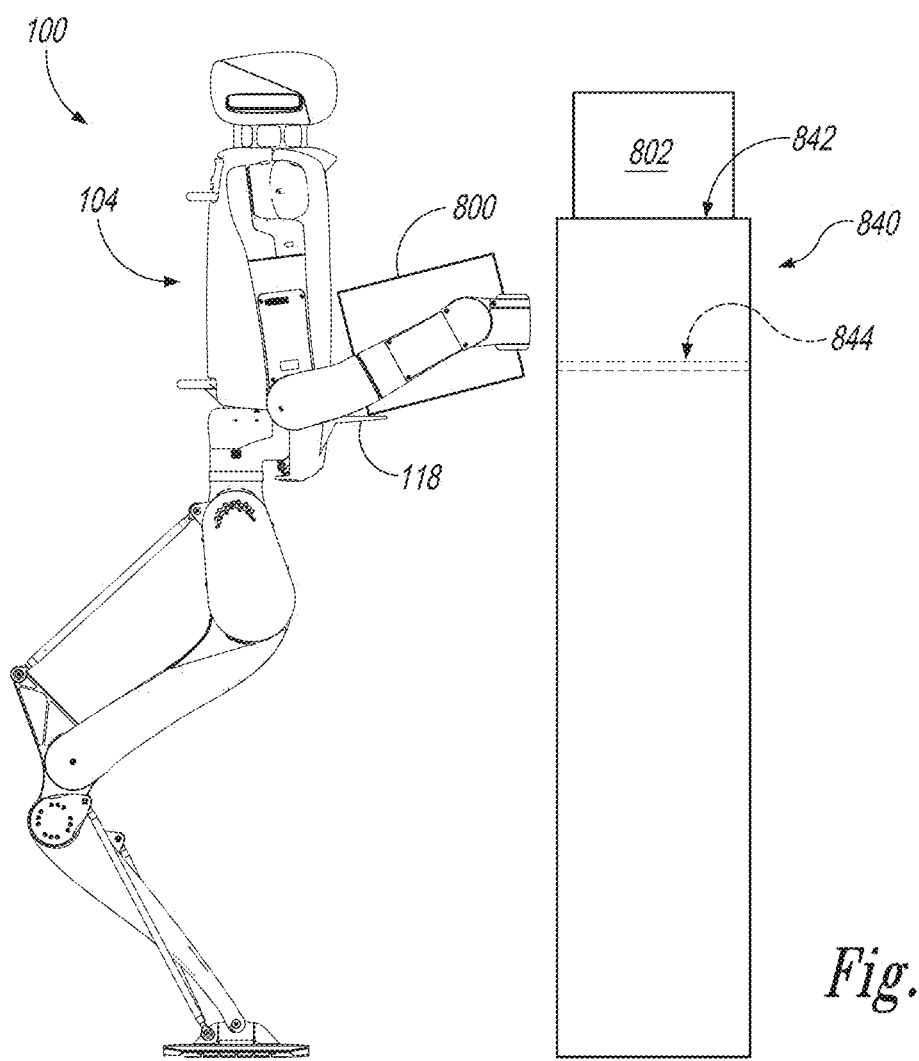

As shown in FIGS. 58 and 59, the method can begin with the robot 100 facing the shelving unit 840 while the first and second objects 800, 802 are at rest on the shelving unit 840. The upper support surface 842 can be in contact with the bottom surface 832 of the second object 802. Similarly, the lower support surface 844 can be in contact with the bottom surface 814 of the first object 800. As shown in FIGS. 60 and 61, the method can include extending the arms 119*a*, 119*b* along the first and second side surfaces 810, 812 of the first object 800. In the illustrated embodiment, no adjustment of the height of the arms 119*a*, 119*b* is needed for the arms 119*a*, 119*b* to access the first object 800. In other embodiments, the robot 100 can lower or raise the torso 104 and the arms 119*a*, 119*b* as needed to align the arms 119*a*, 119*b* with a counterpart of the first object 800. This can include bending or straightening the calf joints 162*e*, 162*k* and the distal thigh joints 162*d*, 162*j* via the leg actuators 176*d*, 176*j*, adjusting another suitable combination of the leg joints 162*a*-162*l*, and/or in another suitable manner. As shown in FIGS. 62 and 63, the method can further include rotating the end effector joints 160*g*, 160*n* via the arm actuators 174*g*, 174*n* to move the paddles 159*a*, 159*b* into contact with the rear surface 820 of the first object 800. As shown in FIGS. 64 and 65, the method can further include moving the arms 119*a*, 119*b* to at least partially cause the first object 800 to move toward the torso 104. As the first object 800 moves toward the torso 104, it can tilt downward slightly and slide onto the protrusion 118.

Figure 66:
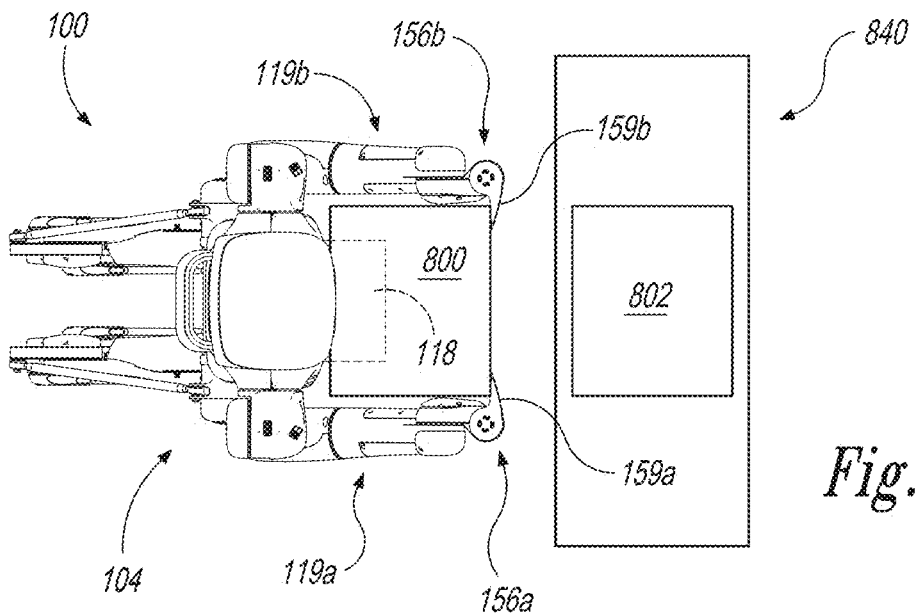
Figure 67:
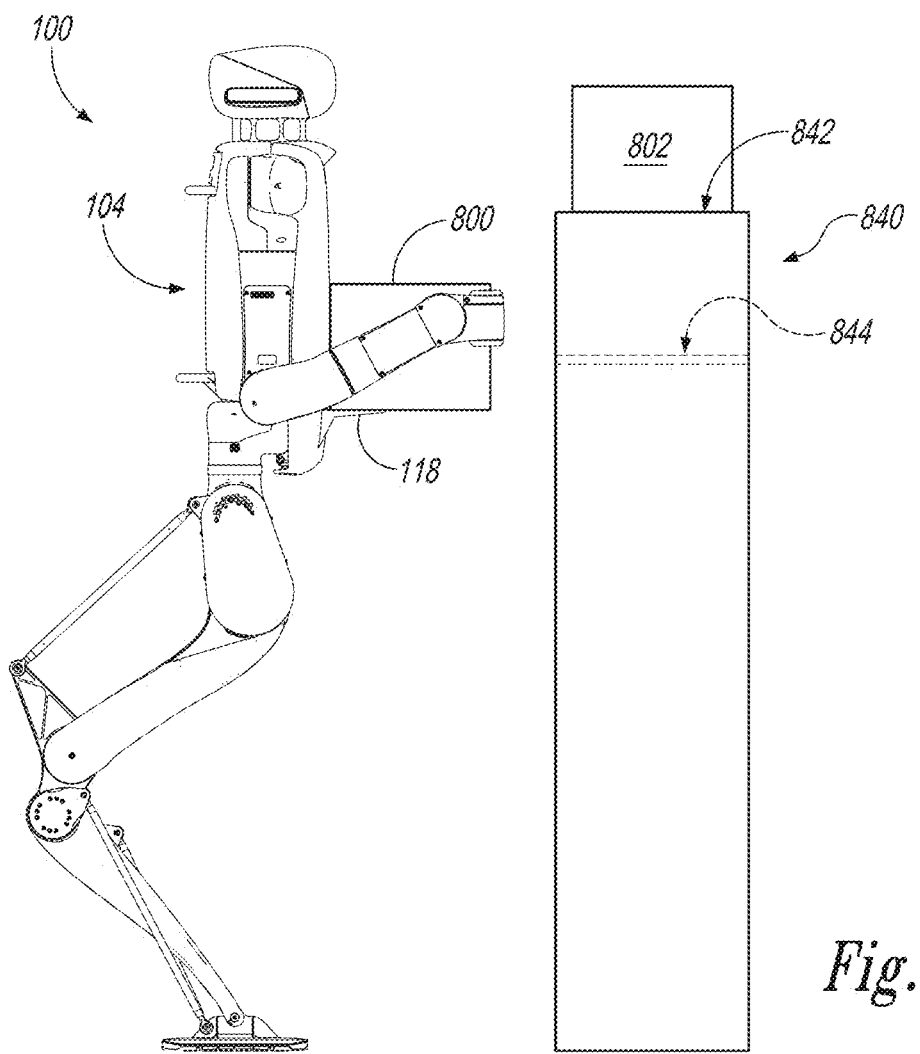
Figure 68:
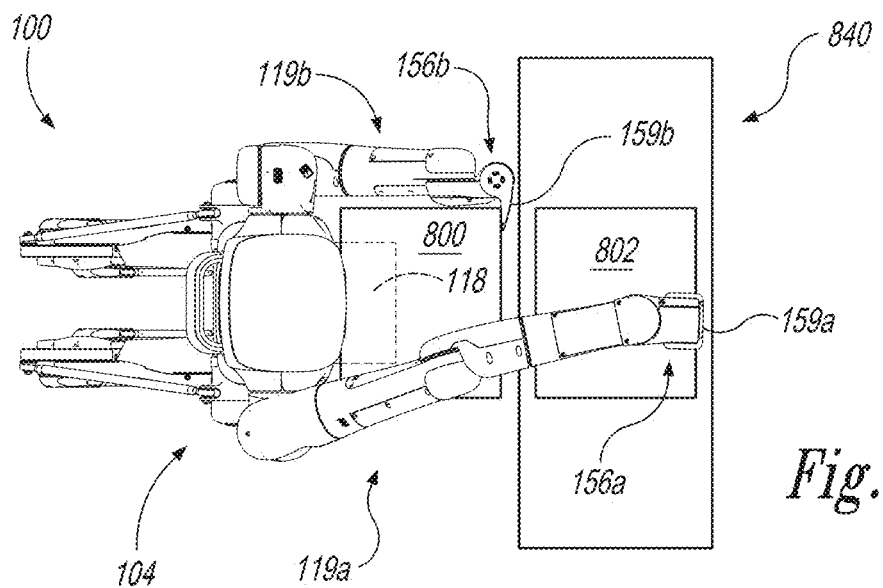
Figure 69:
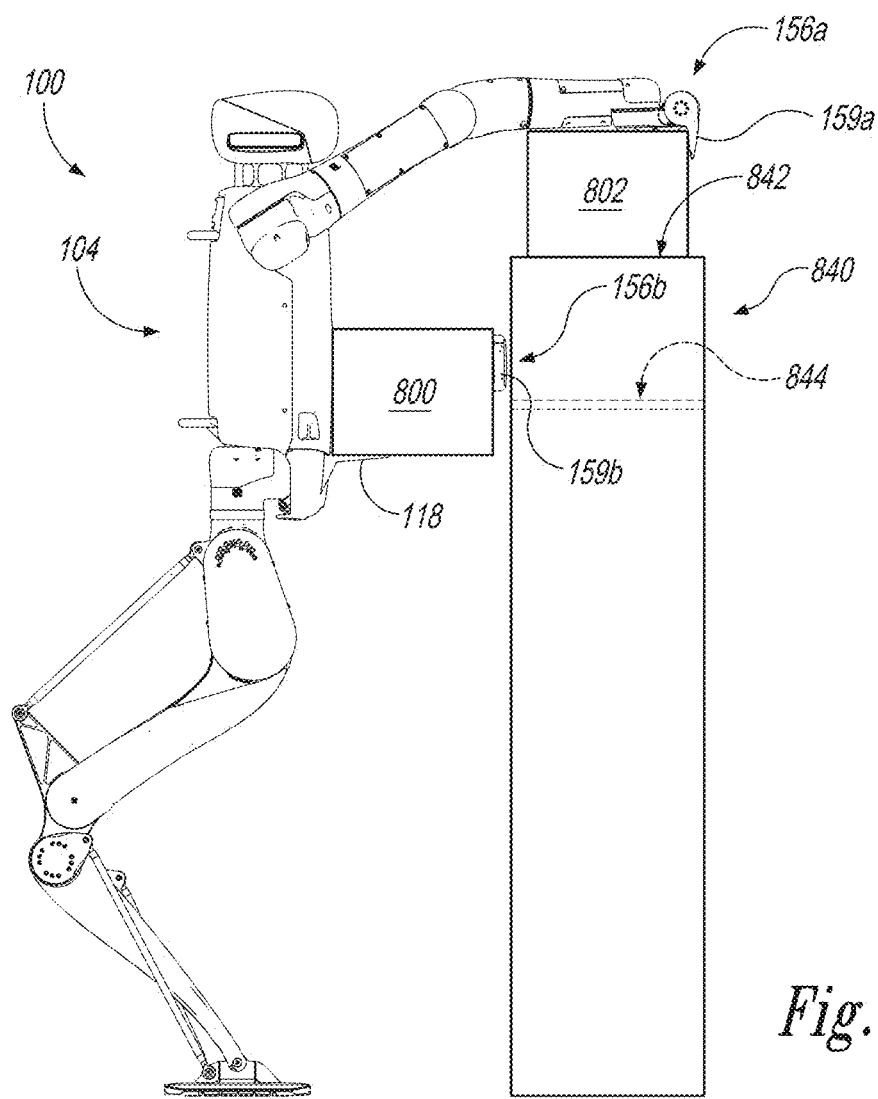
Figure 70:
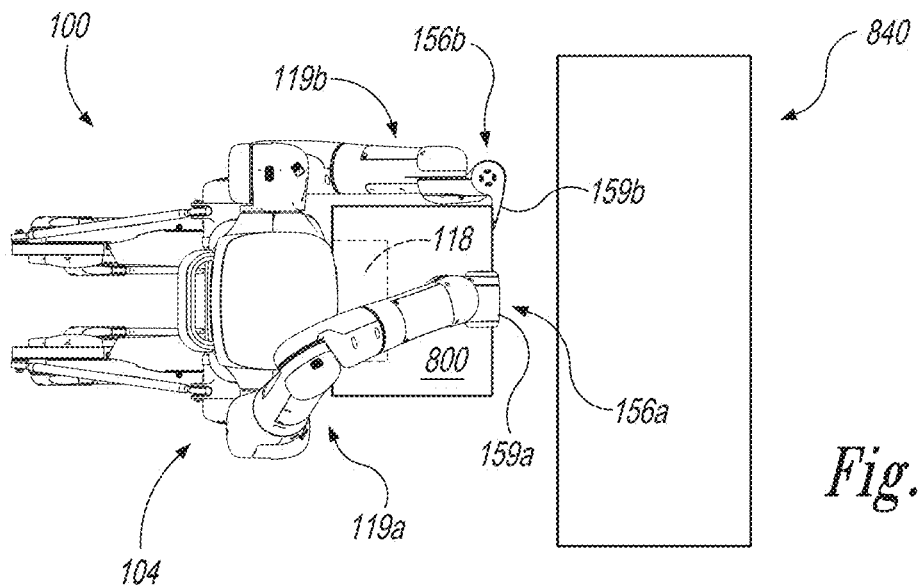
Figure 71:
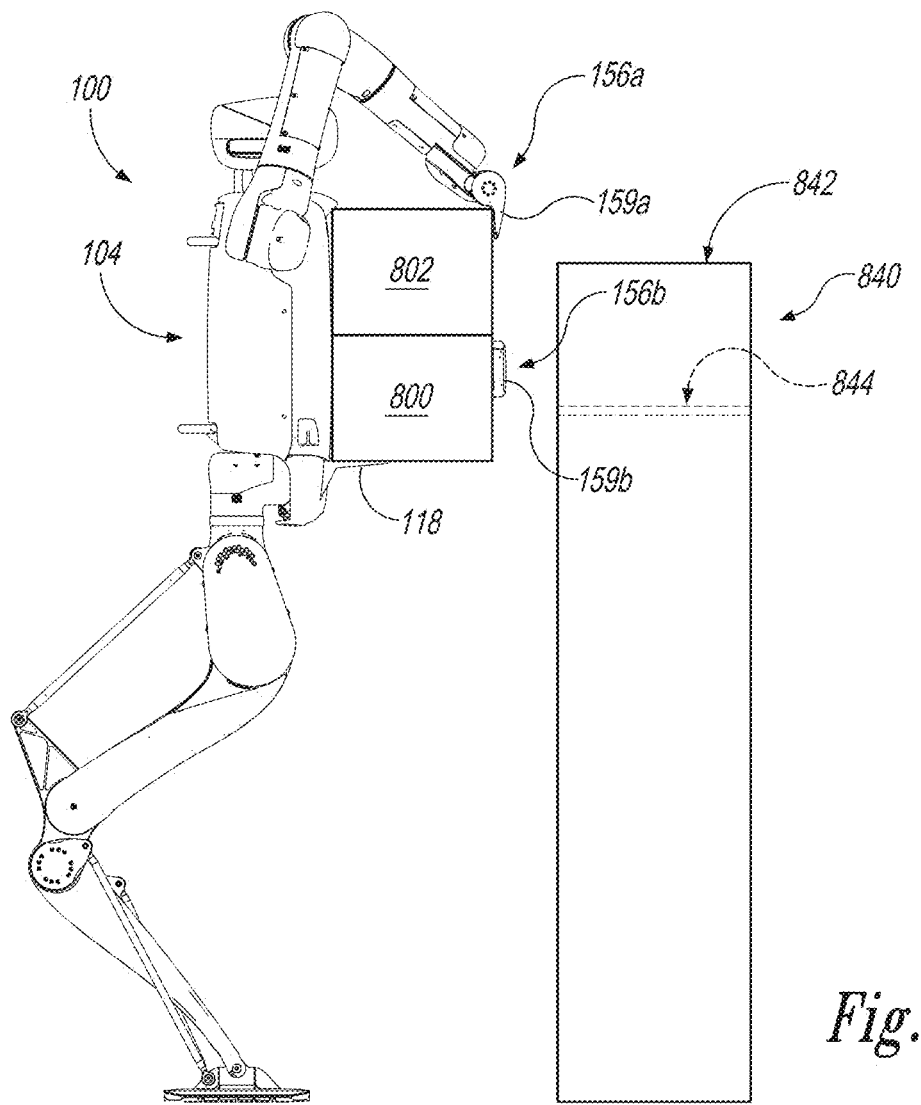

As shown in FIGS. 66 and 67, the method can further include continuing to move the first object 800 toward the torso 104 via the arms 119*a*, 119*b* until the first object 800 contacts the torso 104 and is captured between the torso 104 and the paddles 159*a*, 159*b*. In this state, the first object 800 can be relatively well supported and secure. When there is no second object 802, when a counterpart of the second object 802 is at a different location, and in other cases, the method can include moving the robot 100 bipedally while the first object 800 is in this well supported and secure state. The state of the first object 800 in FIGS. 66 and 67 can also be one in which at least one of the arms 119*a*, 119*b* can be disengaged from the first object 800 (e.g., temporarily) without unduly compromising the stability of the first object 800. Accordingly, as shown in FIGS. 68 and 69, the method can further include disengaging the arm 119*a* from the first object 800 and using the arm 119*a* to retrieve the second object 802. This can include extending the arm 119*a* along the top surface 816 of the first object 800 and, as shown in FIGS. 70 and 71, exerting force on the second object 802 via an interface between the paddle 159*a* and the rear surface 820 of the second object 802 to pull the second object 802 toward the torso 104.

Figure 72:
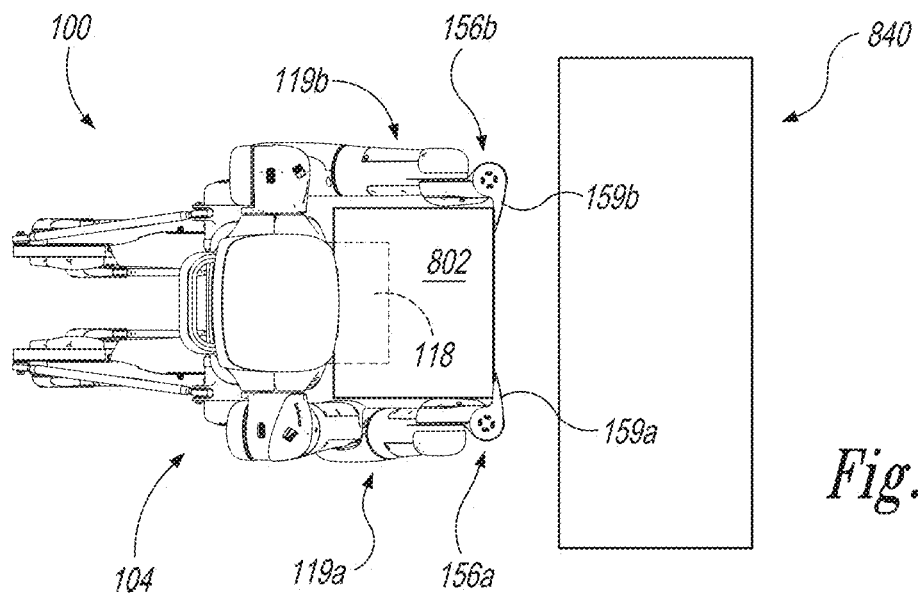
Figure 73:
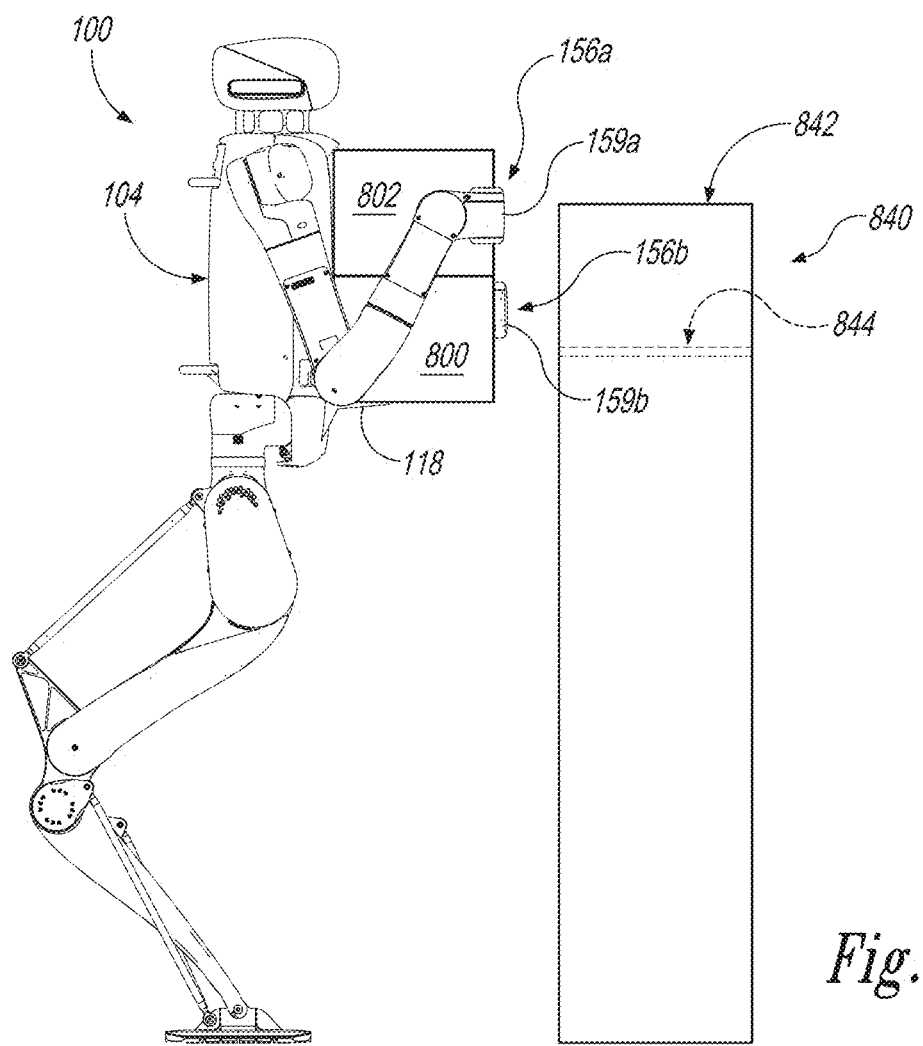

In the illustrated embodiment, the arm 119*a* is used alone to retrieve the second object 802. In other embodiments, both of the arms 119*a*, 119*b* can be used together to retrieve the second object 802. This latter approach, for example, can be suitable when a counterpart of the first object 800 is small enough to balance on the protrusion 118 without assistance from either of the arms 119a, 119b. Retrieval of the second object 802 using the arms 119a, 119b together can proceed in the same or a similar manner as retrieval of the first object 800 shown in FIGS. 58-67 albeit at a different vertical position if needed. With reference again to the illustrated embodiment, the second object 802 can be stacked on the first object 800 after the robot 100 moves the second object 802 toward the torso 104. As shown in FIGS. 72 and 73, once the first and second objects 800, 802 are stacked and in contact with the torso 104, the arm 119a can be lowered to a position at the second side surfaces 812, 830 of the first and second objects 800, 802. The paddle 159a can be in contact with the rear surface 838 of the second object 802 while the paddle 159b remains in contact with the rear surface 820 of the first object 800. In this state, the first and second objects 800, 802 can be relatively well supported and secure. The method can further include moving the robot 100 bipedally to carry the first and second objects 800, 802 away from the shelving unit 840 while the first and second objects 800, 802 are in this well supported and secure state.

In the illustrated embodiment, the first and second objects 800, 802 are at different heights and at different levels of the shelving unit 840. Furthermore, the lower of the first and second objects 800, 802 (i.e., the first object 800) is retrieved before the higher of the first and second objects 800, 802 (i.e., the second object 802). In other embodiments, counterparts of the first and second objects 800, 802 can be at the same or similar heights. In these embodiments, when a higher object is to be retrieved before a lower object, and in other embodiments, the robot 100 can retrieve one object (e.g., the higher object or one of multiple objects and the same height) and lower the torso 104 and the arms 119a, 119b via the legs 120a, 120b and then retrieve the other object (e.g., the lower object or another one of multiple objects and the same height) to achieve the same stacked arrangement of objects shown in FIG. 73. In addition or alternatively, when a counterpart of the protrusion 118 is movable superiorly and inferiorly relative to the torso 104 (e.g., the protrusion 502 shown in FIGS. 45-47), this movement can be used to reposition one object inferiorly to make room for another object with less or no need to change the height of the torso 104 and the arms 119a, 119b via the legs 120a, 120b.

Figure 74:
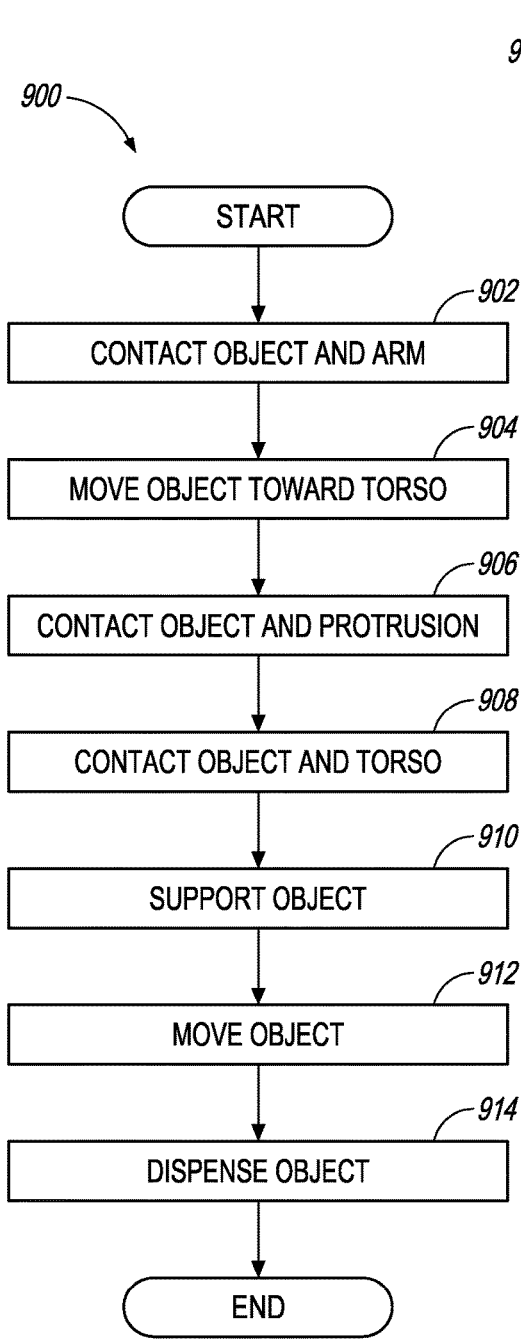
FIG. 74 is a block diagram corresponding to a method for robotically moving an object in accordance with at least some embodiments of the present technology.

FIG. 74 is a block diagram corresponding to a method 900 for using a robot to move an object (e.g., a cardboard box) in accordance with at least some embodiments of the present technology. For simplicity, aspects of the method 900 are described herein primarily in the context of the robot 100 and the object 700. It should be understood, however, that the method 900 and other methods in accordance with at least some embodiments of the present technology can likewise be practiced in other suitable contexts. With reference to FIGS. 1-74 together, the method 900 can include contacting the object 700 and at least one of the arms 119a, 119b (block 902). For example, the method 900 can include contacting at least one of the end effectors 156a, 156b and the front surface 716 of the object 700 (e.g., via at least one of the paddles 159a, 159b. The method 900 can further include moving the object 700 toward the torso 104 (block 904). This can include moving at least one of the arms 119a, 119b to at least partially cause the object 700 to move toward the torso 104 after contacting the object 700 and at least one of the arms 119a, 119b. For example, moving the arm 119a and moving the arm 119b can occur simultaneously to at least partially cause the object 700 to move toward the torso 104. In the context of the robot 300 and in other contexts, the method 900 can further include deflecting the object 700 superiorly relative to the torso 104 via contact between the object 700 and the convex anterior major surface 304 of the protrusion 302 while moving at least one of the arms 119a, 119b to at least partially cause the object 700 to move toward the torso 104.

The method 900 can further include contacting the bottom surface 712 of the object 700 and the protrusion 118 (block 906) and contacting the rear surface 718 of the object 700 and the torso 104 (block 908) after moving at least one of the arms 119a, 119b to at least partially cause the object 700 to move toward the torso 104. In the context of the robot 600 and in other contexts, the former can include contacting the object 700 and both the first protrusion 602 and the second protrusion 604. The method 900 can further include at least partially supporting a weight of the object 700 via the protrusion 118 (block 910) after contacting the object 700 and the protrusion 118. In the context of the robot 600 and in other contexts, this can include at least partially supporting the weight of the object 700 via both the first protrusion 602 and the second protrusion 604. In the context of the robot 500 and in other contexts, the method 900 can include moving the protrusion 502 relative to the torso 104 to at least partially cause the object 700 to move superiorly or inferiorly relative to the torso 104 while at least partially supporting the weight of the object 700 via the protrusion 502.

The method 900 can further include moving the object 700 (block 912) while at least partially supporting the weight of the object 700 via the protrusion 118. In at least some cases, this includes moving the object 700 by bipedal locomotion using the legs 120a, 120b. At the same or another suitable time, the method 900 can include at least partially inhibiting lateral displacement of the object 700 relative to the torso 104 via at least one of the arms 119a, 119b. Also at the same or another suitable time, the method 900 can include at least partially inhibiting forward displacement of the object 700 relative to the torso 104 via at least one of the end effectors 156a, 156b, such as via contact between the object 700 and at least one of the paddles 159a, 159b. Finally, the method 900 can include dispensing the object 700 (block 914) after moving the object 700. This can include using at least one of the arms 119a, 119b to lift, push, or pull the object 700 off the protrusion 118. Alternatively or in addition, dispensing the object 700 can include moving the torso 104 and the protrusion 118 relative to the legs 120a, 120b (e.g., bowing the torso 104) to at least partially cause the object 700 to move downward relative to the torso in response to gravity.

In the context of the robot 400, 500, dispensing the object 700 can include moving the protrusion 402, 502 relative to the torso 104 to at least partially cause the object 700 to move downward relative to the torso 104 in response to gravity. For example, in the context of the robot 400, dispensing the object 700 can include rotating the protrusion 402 relative to the torso 104 about an axis within 10 degrees of perpendicular to (e.g., within 5 degrees of perpendicular to and/or substantially perpendicular to) the midsagittal plane 102 to at least partially cause the object 700 to move downward relative to the torso 104 in response to gravity. As another example, in the context of the robot 500, dispensing the object 700 can include rotating the protrusion 502 relative to the torso 104 about an axis within 10 degrees of parallel to (e.g., within 5 degrees of parallel to and/or substantially parallel to) the midsagittal plane 102 to at least partially cause the object 700 to move downward and laterally relative to the torso 104 in response to gravity. As yet another example, in the context of the robot 600, dispensing the object 700 can include retracting the first and second protrusions 602, 604 posteriorly at least partially into the torso 104 to at least partially cause the object 700 to move downward relative to the torso 104 in response to gravity. Similarly, in the context of the robot 600, dispensing the object 700 can include retracting one of the first and second protrusions 602, 604 posteriorly at least partially into the torso 104 to at least partially cause the object 700 to move downward and laterally relative to the torso 104 in response to gravity.

Figure 75:
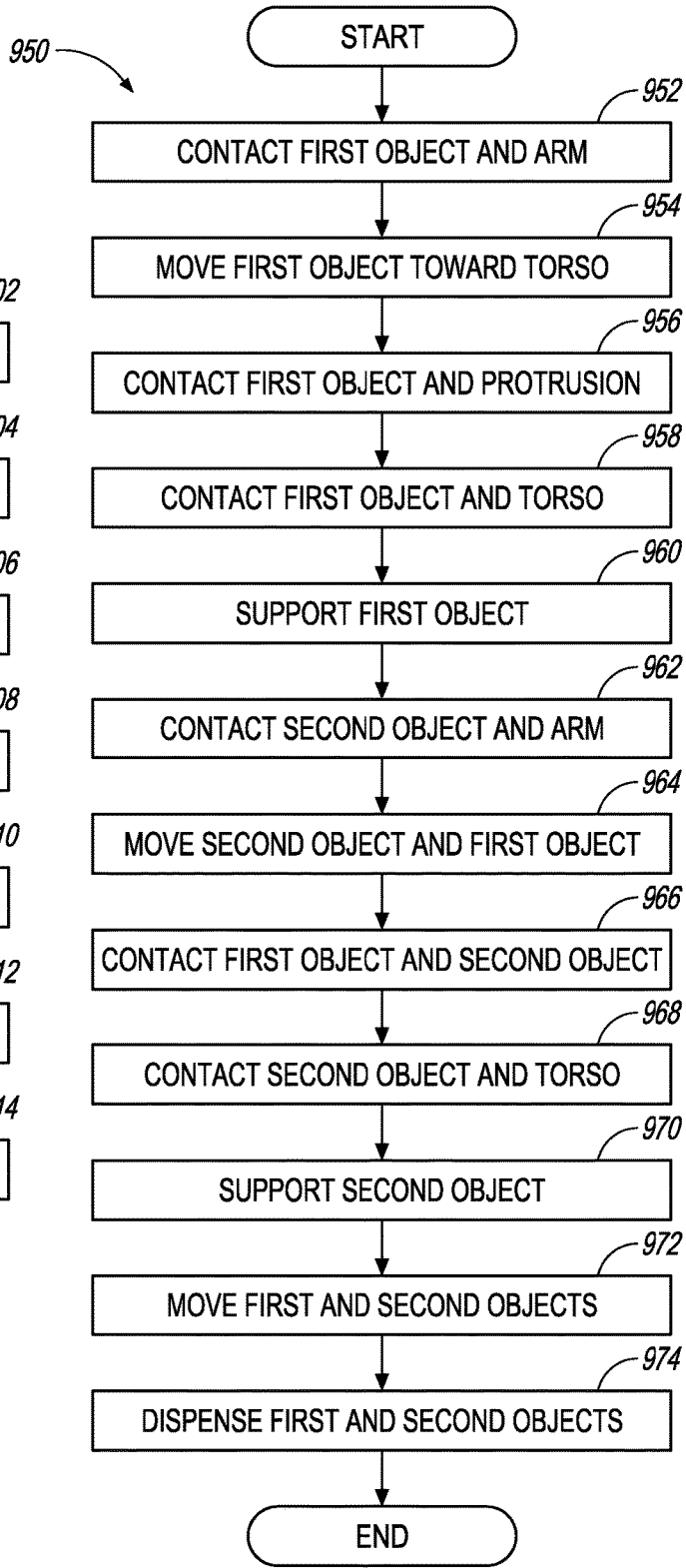
FIG. 75 is a block diagram corresponding to a method for robotically moving multiple objects in accordance with at least some embodiments of the present technology.

FIG. 75 is a block diagram corresponding to a method 950 for robotically moving multiple objects (e.g., multiple cardboard boxes) in accordance with at least some embodiments of the present technology. For simplicity, aspects of the method 950 are again described herein primarily in the context of the robot 100 and the first and second objects 800, 802. It should be understood, however, that the method 950 and other methods in accordance with at least some embodiments of the present technology can likewise be practiced in other suitable contexts. With reference to FIGS. 1-75 together, the method 950 can include contacting the first object 800 and at least one of the arms 119a, 119b (block 952), moving the first object 800 toward the torso 104 (block 954), contacting the first object 800 and the protrusion 118 (block 956), contacting the first object 800 and the torso 104 (block 958), and at least partially supporting a weight of the first object 800 via the protrusion 118 (block 960). These operations can have any suitable features, sub operations, etc. as described above for the corresponding operations in the method 900 for the object 700.

With reference again to FIGS. 1-75 together, after supporting the weight of the first object 800, the method 950 can include contacting the second object 802 and at least one of the arms 119a, 119b (block 962) and then moving the second object 802 toward the torso 104 (block 964). The method 950 can further include contacting the bottom surface 814 of the second object 802 and the top surface 834 of the first object 800 (e.g., in a stacked arrangement) (block 966) and contacting the rear surface 838 of the second object 802 and the torso 104 (block 968). Correspondingly, the method 950 can include at least partially supporting a weight of the second object 802 via the first object 800 and via the protrusion 118 (block 970). The foregoing operations for the second object 802 can have any suitable features, sub operations, alternatives, etc. as described above for the corresponding operations in the method 900 for the object 700. Furthermore, in the context of the robot 500 and in other contexts, the method 950 can include moving the protrusion 502 relative to the torso 104 to at least partially cause the first object 800 to move superiorly or inferiorly relative to the torso 104 while at least partially supporting the weight of the first object 800 via the protrusion 502. In a particular example, the method 905 includes moving the protrusion 502 relative to the torso 104 to at least partially cause the first object 800 to move inferiorly relative to the torso 104 to facilitate stacking the second object 802 onto the first object 800.

The method 950 can further include moving the first and second objects 800, 802 (block 972) while at least partially supporting the weight of the first and second objects 800, 802 via the protrusion 118 and while at least partially supporting the weight of the second object 802 via the first object 800 and the protrusion 118. In at least some cases, this includes moving the first and second objects 800, 802 by bipedal locomotion using the legs 120a, 120b. At the same or another suitable time, the method 950 can include at least partially inhibiting lateral displacement of at least one of the first and second objects 800, 802 relative to the torso 104 via at least one of the arms 119a, 119b. Also at the same or another suitable time, the method 900 can include at least partially inhibiting forward displacement of at least one of the first and second objects 800, 802 relative to the torso 104 via at least one of the end effectors 156a, 156b. Furthermore, moving the first and second objects 800, 802 can occur while the torso 104 is in contact with the rear surfaces 820, 838 of the first and second objects 800, 802. In addition or alternatively, moving the first and second objects 800, 802 can occur while the end effector 156a is in contact with the front surface 818 of the first object 800 (e.g., via the paddle 159a) and/or while the end effector 156b is in contact with the front surface 836 of the second object 802 (e.g., via the paddle 159b). Finally, the method 950 can include dispensing the first and second objects 800, 802 (block 974) after moving the first and second objects 800, 802. For the first and second objects 800, 802 individually and together, dispensing can have any suitable features, sub operations, alternatives, etc. as described above for dispensing the object 700 in the method 900.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. Similarly, terms of anatomical direction, such as "distal" and "medial," may be used herein to express and clarify the relationship between various structures. In the context of the robot 100 and in the absence of a statement to the contrary, such terms refer to the robot 100 in the first state shown in FIGS. 1-3. Furthermore, terms corresponding to anatomical parts (e.g., "wrist," "elbow," "hip," "thigh," "calf," "torso," etc.) may be assigned arbitrarily and are intended to be interpreted in the context of the described embodiments rather than in the context of a human. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method of moving an object, the method being implemented via a robot, the method comprising:
   contacting the object with an arm of the robot;
   moving the arm to cause the object to move toward a torso of the robot after contacting the object with the arm;
   contacting the object with a protrusion of the robot after moving the arm to cause the object to move toward the torso, wherein the protrusion extends anteriorly from the torso;
   supporting a weight of the object via the protrusion after contacting the object with the protrusion; and
   moving the object by bipedal locomotion using legs of the robot while supporting the weight of the object via the protrusion.

2. The method of claim 1, wherein:
   the robot defines a midsagittal plane extending through the torso;
   the arm is a first one of two arms of the robot, the two arms being connected to the torso at opposite respective sides of the midsagittal plane; and
   the method further comprises inhibiting lateral displacement of the object relative to the torso via at least one of the two arms while moving the object by bipedal locomotion using the legs.

3. The method of claim 1, further comprising moving the protrusion relative to the torso to cause the object to move superiorly relative to the torso while supporting the weight of the object via the protrusion.

4. The method of claim 1, wherein:
   the protrusion is a first protrusion;
   the robot further comprises a second protrusion extending anteriorly from the torso;
   the first protrusion and the second protrusion are laterally spaced apart from one another;
   the method further comprises:
      contacting the object with the second protrusion after moving the arm to cause the object to move toward the torso, and
      supporting the weight of the object via the second protrusion after contacting the object with the second protrusion; and
   moving the object by bipedal locomotion using the legs includes moving the object by bipedal locomotion using the legs while supporting the weight of the object via the first protrusion and the second protrusion.

5. The method of claim 1, further comprising moving the torso and the protrusion relative to the legs to cause the object to move downward relative to the torso in response to gravity.

6. The method of claim 1, wherein:
   the object is a first object;
   the arm is a first one of two arms of the robot; and
   the method further comprises:
      contacting a second object with the first one of the two arms, a second one of the two arms, or both,
      moving the first one of the two arms, the second one of the two arms, or both to cause the second object to move toward the torso after contacting the second object with the first one of the two arms, the second one of the two arms, or both,
      contacting the second object with the first object after moving the first one of the two arms, the second one of the two arms, or both to cause the object to move toward the torso,
      supporting a weight of the second object via the first object and via the protrusion after contacting the second object with the first object, and
      moving the second object by bipedal locomotion using the legs while supporting the weight of the second object via the first object and the protrusion.

7. The method of claim 6, wherein:
   the first and second objects individually define an object depth;
   the first and second objects individually include a front surface and a rear surface spaced apart from one another along the object depth; and
   moving the first and second objects by bipedal locomotion using the legs includes moving the first and second objects by bipedal locomotion using the legs while:
      the torso is in contact with the rear surfaces of the first and second objects,
      an end effector of the first one of the two arms is in contact with the front surface of one of the first and second objects, and
      an end effector of the second one of the two arms is in contact with the front surface of the other of the first and second objects.

8. The method of claim 1, wherein:
   the robot defines a midsagittal plane extending through the torso;
   the arm is a first one of two arms of the robot, the two arms being connected to the torso at opposite respective sides of the midsagittal plane; and the method further comprises:
contacting the object with a second one of the two arms,
moving the second one of the two arms to cause the object to move toward the torso after contacting the object with the second one of the two arms, and
contacting the object with the protrusion includes contacting the object with the protrusion after moving the first and second ones of the two arms to cause the object to move toward the torso.

9. The method of claim 8, wherein moving the first and second ones of the two arms to cause the object to move toward the torso includes moving the first and second ones of the two arms simultaneously to cause the object to move toward the torso.

10. The method of claim 1, wherein:
the robot defines a midsagittal plane extending through the torso;
the arm is a first one of two arms of the robot, the two arms being connected to the torso at opposite respective sides of the midsagittal plane;
the two arms individually define an arm length extending from the torso;
the two arms individually include:
a proximal end portion through which the arm is connected to the torso, and
an end effector opposite to the proximal end portion along the arm length; and
the method further comprises inhibiting forward displacement of the object relative to the torso via at least one of the end effectors while moving the object by bipedal locomotion using the legs.

11. The method of claim 10, wherein:
for the two arms individually, the end effector includes a paddle; and
inhibiting forward displacement of the object relative to the torso includes inhibiting forward displacement of the object relative to the torso via contact between the object and at least one of the paddles while moving the object by bipedal locomotion using the legs.

12. The method of claim 1, further comprising moving the protrusion relative to the torso to cause the object to move downward relative to the torso in response to gravity.

13. The method of claim 12, wherein moving the protrusion relative to the torso includes retracting the protrusion posteriorly into the torso.

14. The method of claim 12, wherein:
the robot defines a midsagittal plane extending through the torso; and
moving the protrusion relative to the torso includes rotating the protrusion relative to the torso about an axis within 10 degrees of perpendicular to the midsagittal plane.

15. The method of claim 12, wherein:
the robot defines a midsagittal plane extending through the torso;
moving the protrusion relative to the torso includes rotating the protrusion relative to the torso about an axis within 10 degrees of parallel to the midsagittal plane; and
moving the protrusion relative to the torso to cause the object to move downward relative to the torso in response to gravity includes moving the protrusion relative to the torso to cause the object to move downward and laterally relative to the torso in response to gravity.

16. The method of claim 12, wherein:
the protrusion is a first protrusion;
the robot further comprises a second protrusion extending anteriorly from the torso;
the first and second protrusions are laterally spaced apart from one another;
the method further comprises:
contacting the object with the second protrusion after moving the arm to cause the object to move toward the torso, and
supporting the weight of the object via the second protrusion after contacting the object with the second protrusion,
moving the object by bipedal locomotion using the legs includes moving the object by bipedal locomotion using the legs while supporting the weight of the object via the first and second protrusions; and
moving the first protrusion relative to the torso includes retracting the first protrusion posteriorly relative to the second protrusion and into the torso to cause the object to move downward and laterally relative to the torso in response to gravity.

17. A method of moving an object, the object defining an object depth and an object height perpendicular to the object depth, the object including a front surface, a rear surface spaced apart from the front surface along the object depth, a bottom surface, and a top surface spaced apart from the bottom surface along the object height, the method being implemented via a robot having two arms, the method comprising:
contacting an end effector of a first one of the two arms with the front surface of the object;
contacting a torso of the robot with the rear surface of the object;
contacting a protrusion of the robot with the bottom surface of the object, wherein the protrusion extends anteriorly from the torso; and
moving the object by bipedal locomotion using legs of the robot while maintaining contact between the end effector of the first one of the two arms and the front surface of the object, while maintaining contact between the torso and the rear surface of the object, and while maintaining contact between the protrusion and the bottom surface of the object.

18. The method of claim 17, wherein:
contacting the end effector of the first one of the two arms with the front surface of the object includes contacting a paddle of the end effector of the first one of the two arms with the front surface of the object; and
moving the object by bipedal locomotion using the legs includes moving the object by bipedal locomotion using the legs while maintaining contact between the paddle and the front surface of the object.

19. The method of claim 17, further comprising contacting an end effector of a second one of the two arms with the front surface of the object, wherein moving the object by bipedal locomotion using the legs includes moving the object by bipedal locomotion using the legs while maintaining contact between the end effector of the second one of the two arms and the front surface of the object.

20. The method of claim 17, wherein:
the object, the object depth, the object height, the front surface, the rear surface, the bottom surface, and the top surface are a first object, a first object depth, a first object height, a first front surface, a first rear surface, a first bottom surface, and a first top surface, respectively; and the method further comprises:
- contacting an end effector of a second one of the two arms with a second front surface of a second object, wherein the second object defines a second object depth and a second object height perpendicular to the second object depth, the second object including a second front surface, a second rear surface spaced apart from the second front surface along the second object depth, a second bottom surface, and a second top surface spaced apart from the second bottom surface along the second object height, and
- moving the second object by bipedal locomotion using the legs while moving the first object by bipedal locomotion using the legs, while maintaining contact between the end effector of the second one of the two arms with the second front surface, while maintaining contact between the torso and the second rear surface, and while the second bottom surface is in contact with the first top surface.

* * * * *